United States Patent
Andou et al.

(10) Patent No.: US 6,432,310 B1
(45) Date of Patent: Aug. 13, 2002

(54) METHODS OF RUNNING AND WASHING SPIRAL WOUND MEMBRANE MODULE

(75) Inventors: Masaaki Andou; Hajimu Hisada; Tomomi Ohara; Ichirou Kawada, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/488,633

(22) Filed: Jan. 20, 2000

(30) Foreign Application Priority Data

| Jan. 22, 1999 | (JP) | 11-014966 |
| Apr. 28, 1999 | (JP) | 11-122155 |
| May 21, 1999 | (JP) | 11-142480 |
| Jun. 15, 1999 | (JP) | 11-167931 |

(51) Int. Cl.[7] .................. B01D 61/00; B01D 63/10; B01D 65/02
(52) U.S. Cl. ............... 210/636; 210/650; 210/321.74; 210/333.1; 210/321.83
(58) Field of Search .............. 210/636, 321.74, 210/650, 333.1, 333.01, 321.83

(56) References Cited

U.S. PATENT DOCUMENTS

| 3,992,301 | A | * | 11/1976 | Shippey et al. |
| 4,046,685 | A | * | 9/1977 | Bray |
| 4,301,013 | A | * | 11/1981 | Setti et al. |
| 4,548,714 | A | * | 10/1985 | Kirwan, Jr. et al. |
| 4,670,150 | A | * | 6/1987 | Hsiung et al. |
| 4,906,372 | A | * | 3/1990 | Hopkins |
| 4,988,444 | A | * | 1/1991 | Applegate et al. |
| 5,128,037 | A | * | 7/1992 | Pearl et al. |
| 5,156,738 | A | * | 10/1992 | Dawson et al. |
| 5,192,437 | A | * | 3/1993 | Chang et al. |
| 5,230,804 | A | * | 7/1993 | Leupold et al. |
| 5,250,118 | A | * | 10/1993 | Netwig et al. |
| 5,344,565 | A | * | 9/1994 | Degen et al. |
| 5,690,829 | A | * | 11/1997 | Lauer |
| 5,690,830 | A | * | 11/1997 | Ohtani et al. |
| 5,759,283 | A | * | 6/1998 | Ekern et al. |
| 6,007,723 | A | * | 12/1999 | Ikada et al. |
| 6,139,750 | A | * | 10/2000 | Graham |

FOREIGN PATENT DOCUMENTS

| JP | 10-165780 | 6/1998 |
| JP | 10-230144 | 9/1998 |
| JP | 11-188245 | 7/1999 |

* cited by examiner

*Primary Examiner*—Ana Fortuna
(74) *Attorney, Agent, or Firm*—Akin, Gump, Strauss, Hauer & Feld, L.L.P.

(57) ABSTRACT

A spiral wound membrane element is formed by covering a spiral membrane component prepared by winding a plurality of independent or continuous envelope-like membranes around the outer peripheral surface of a water collection pipe through raw water spacers with a separation membrane and further covering the same with an outer peripheral passage forming material. In washing, permeate containing a chemical is introduced from an opening end of the water collection pipe while the permeate derived from the outer peripheral surface of the water collection pipe is discharged from at least the outer peripheral side of the spiral wound type membrane element and raw water is axially fed along the outer peripheral portion of the spiral wound type membrane element. In filtration running, the raw water in which bubbles are diffused by an air diffuser may be supplied to the spiral wound membrane element stored in a pressure vessel. Alternatively, filtration running may be temporarily stopped for holding the spiral wound type membrane element for a prescribed time in a state sealing the raw water and the permeate in the pressure vessel.

41 Claims, 21 Drawing Sheets

F I G. 9
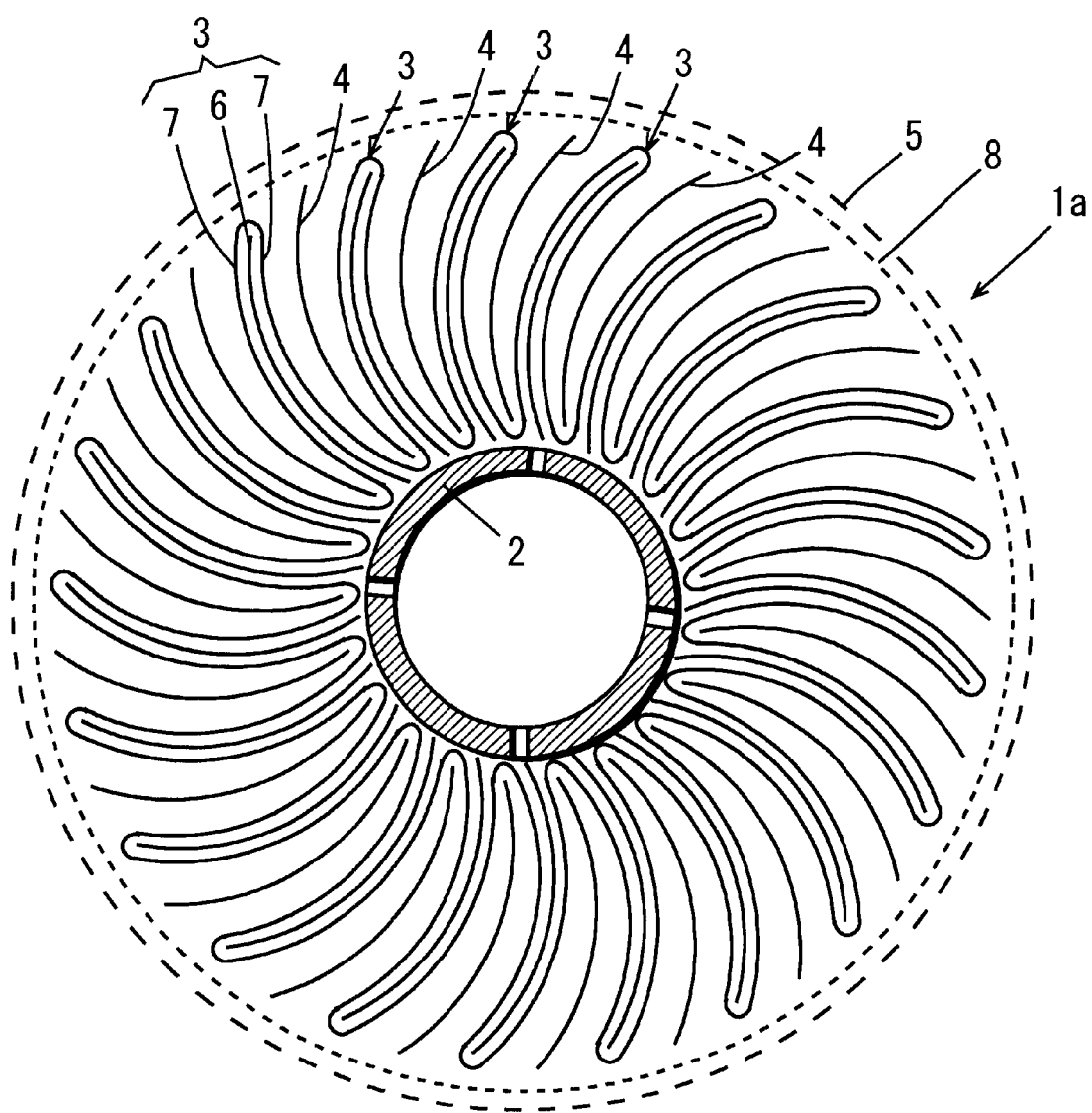

METHODS OF RUNNING AND WASHING SPIRAL WOUND MEMBRANE MODULE

BACKGROUND OF THE INVENTION

1. Field of the Invention

The present invention relates to a spiral wound type membrane element employed for a membrane separation device such as a low-pressure reverse osmosis membrane separation device, an ultrafiltration device or a microfiltration device and methods of running and washing a spiral wound type membrane module.

2. Description of the Background Art

With recent applications of the membrane separation technology to water purification, the membrane separation technology is now applied as pretreatment for reverse osmosis membrane separation systems used desalination of seawater, for example. While a microfiltration membrane and an ultrafiltration membrane attaining high permeate flow rates are generally used for such membrane separation, a reverse osmosis membrane attaining a high permeate flow rate under ultra-low pressures of not more than 10 kgf/cm$^2$ has recently been developed.

As a membrane element used for membrane separation, a hollow fiber membrane element is generally used in consideration of the membrane area (volumetric efficiency) per unit volume. However, the membranes of the hollow fiber membrane element are easy to break, and when the membranes are broken, raw water is mixed into the permeate to disadvantageously lower the separating performance.

On the other hand, a spiral wound type membrane element can provide a large membrane area. The spiral wound type membrane element, which can maintain high separating performance, is superior in reliability to the hollow fiber membrane element.

FIG. 19 is a partially fragmented perspective view of a conventional spiral wound type membrane element 21, and FIG. 20 is a perspective view showing the appearance of the conventional spiral wound type membrane element 21.

As shown in FIG. 19, the spiral wound type membrane element 21 is formed by superposing separation membranes 26 on both surfaces of a permeate spacer (permeate passage forming member) 25 and bonding three sides thereby forming an envelope-like membrane (bag-like membrane) 23, mounting an opening of the envelope-like membrane 23 on a water collection pipe 22 formed by a perforated hollow pipe and spirally winding the envelope-like membrane 23 on the outer peripheral surface of the water collection pipe 22 with a netty raw water spacer (raw water passage forming member) 24.

The raw water spacer 24 is provided for forming a passage for the raw water along the envelope-like membrane 23. If the thickness of the raw water spacer 24 is small, the separation membranes 26 are clogged with suspended substances although the charging efficiency thereof is increased. In general, therefore, the thickness of the raw water spacer 24 is set to about 0.7 to 3.0mm.

In relation to treatment of raw water such as river water containing a large quantity of suspended substances, a spiral wound type membrane element employing a zigzag corrugated sheet type raw water spacer (the so-called corrugated spacer) is already known in the art.

As shown in FIG. 20, the outer peripheral surface of the spiral wound type membrane element 21 is covered with a protective sheath 27 made of FRP (Fiber-Reinforced Plastics) or formed by a shrink tube, while packing holders 28 called anti-telescopes are mounted on both ends thereof respectively.

FIG. 21 is a sectional view showing an exemplary method of running the conventional spiral wound type membrane element 21. As shown in FIG. 21, a pressure vessel (pressure-resistant vessel) 30 is formed by a tubular case 31 and a pair of end plates 32a and 32b. The end plate 32a is provided with a raw water inlet 33, and the other plate 32b is provided with a concentrate outlet 35. The end plate 32b is provided on its center with a permeate outlet 34.

The spiral wound type membrane element 21 having a packing 37 mounted on a portion close to an end of the outer peripheral surface is introduced into the tubular case 31, and both opening ends of the tubular case 31 are sealed with the end plates 32a and 32b respectively. One opening end of the water collection pipe 22 is engaged with the permeate outlet 34 of the end plate 32b, while an end cap 36 is attached to the other opening end thereof.

In order to run the spiral wound type membrane element 21, raw water 51 is introduced into a first liquid chamber 38 from the raw water inlet 33 of the pressure vessel 30. As shown in FIG. 21, the raw water 51 is supplied from one end of the spiral wound type membrane element 21. The raw water 51 axially flows along the raw water spacer 24, and is discharged as concentrate 53 from the other end of the spiral wound type membrane element 21. The raw water 51 permeating through the separation membranes 26 along the raw water spacer 24 flows into the water collection pipe 22 as permeate 52 along the permeate spacer 25, and is discharged from the end of the water collection pipe 22.

The permeate 52 is taken out from the permeate outlet 34 of the pressure vessel 30 shown in FIG. 21. The concentrate 53 is taken out from a second liquid chamber 39 of the pressure vessel 30 through the concentrate outlet 35.

When the spiral wound type membrane element 21 is run, the membrane 23 is clogged with suspended substances contained in the raw water 51, to reduce the membrane flux. Therefore, chemical washing is performed for eliminating such clogging and recovering the membrane flux. However, such chemical washing requires much labor and a high cost. In order to prevent clogging, therefore, back wash reverse filtration is periodically performed with permeate or air in a hollow fiber membrane element, for example.

In the conventional spiral wound type membrane element 21, however, back wash reverse filtration results in the following problems:

FIG. 22 is a partially fragmented perspective view showing back wash reverse filtration in the conventional spiral wound type membrane element 21. As shown in FIG. 22, the permeate 52 is introduced from an end of the water collection pipe 22. Since the outer peripheral surface of the envelope-like membrane 23 wound around the water collection pipe 22 is covered with the protective sheath 27, the permeate 52 derived from the outer peripheral surface of the water collection pipe 22 permeates through the envelope-like membrane 23 and axially flows in the spiral wound type membrane element 21 along the raw water spacer 24, and is discharged from the end of the spiral wound type membrane element 21. Despite back wash reverse filtration, therefore, contaminants such as turbid substances causing clogging of the membrane 23 are readily captured by the raw water spacer 24 before discharged from the end of the spiral wound type membrane element 21 and insufficiently removed.

As shown in FIG. 21, further, the clearance between the inner peripheral surface of the tubular case 31 of the pressure vessel 30 and the spiral wound type membrane element 21 defines a dead space S, to cause residence of the fluid (fluid residue). When the spiral wound type membrane element 21 is used over a long period, the fluid residing in the dead space S is denatured. Particularly when the fluid contains organic matter, germs such as microorganisms may propagate to decompose the organic matter and give off a bad smell or decompose the separation membranes 26, leading to reduction of reliability.

In addition, the raw water 51 is supplied from one end of the conventional spiral wound type membrane element 21 and discharged from the other end, and hence the conventional spiral wound type membrane element 21 requires the packing holders 28 for prevent the envelope-like membrane 23 wound around the water collection pipe 22 from being deformed in the form of a bamboo shoot. Further, pressure loss caused by the raw water spacer 24 as well as by clogging results in pressure difference between the raw water inlet side and the concentrate outlet side, to deform the spiral wound type membrane element 21. In order to prevent such deformation, the outer peripheral surface of the envelope-like membrane 23 wound around the water collection pipe 22 is covered with the protective sheath 27 made of FRP or formed by a shrink tube. Thus, the component cost and the manufacturing cost are increased.

In order to prevent formation of cake with contaminants contained in the raw water 51, further, it is necessary to attain a sufficient linear velocity on the membrane surface with a sufficient flow rate on the concentrate side. When the flow rate is increased on the concentrate side, however, recovery per spiral wound type membrane element is reduced while a large pump is required for supplying the raw water 51, to remarkably increase the system cost.

SUMMARY OF THE INVENTION

An object of the present invention is to provide a highly reliable spiral wound type membrane element which can reduce the cost and is easy to wash, and a method of running a spiral wound type membrane module.

Another object of the present invention is to provide a washing method capable of readily and reliably removing contaminants captured by a spiral wound type membrane element.

(1) First Invention

In a method of running a spiral wound type membrane element according to an aspect of the first invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid having a function of separating contaminants or a bactericidal action from at least the outer peripheral side of the spiral wound type membrane element and taking out a permeated liquid from at least one opening end of the perforated hollow pipe in filtration running.

According to the method of running a spiral wound type membrane element, the raw liquid is supplied from at least the outer peripheral side of the spiral wound type membrane element in running for performing dead end filtration. In this case, contaminants are captured on at least the outer peripheral portion of the spiral wound type membrane element.

No dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, dead end filtration is performed for attaining high recovery without employing a large pump for supplying the raw liquid. Thus, the system cost is reduced.

The spiral wound type membrane element, to which pressure is applied from all directions, is not deformed also when the raw liquid is supplied under high pressure. Thus, high pressure resistance is attained.

Contaminants can be inhibited from adhering to at least the outer peripheral portion of the spiral wound type membrane element by supplying the spiral wound type membrane element with the raw liquid into which a chemical having a function of separating contaminants is injected.

Propagation of germs such as microorganisms can be suppressed on the membrane surface of the spiral wound type membrane element by supplying the spiral wound type membrane element with the raw liquid into which a chemical having a bactericidal action is injected.

Thus, the spiral wound type membrane element can be run over a long period.

The chemical may be sodium hypochlorite, chloramine, hydrogen peroxide, peracetic acid or ozone. Such a chemical having a function of separating contaminants can inhibit contaminants from adhering to at least the outer peripheral portion of the spiral wound type membrane element. Further, the chemical having a bactericidal action can suppress propagation of germs on the membrane surface.

The raw liquid may contain a flocculant. In this case, the flocculant flocculates contaminants contained in the raw liquid so that the contaminants are readily captured on at least the outer peripheral portion of the spiral wound type membrane element. Thus, loads on the envelope-like membranes are reduced to enable stable running over a long period.

The method may further comprise a step of introducing a washing liquid containing a chemical having a function of separating contaminants or a bactericidal action from at least one opening end of the perforated hollow pipe and discharging the washing liquid derived from the outer peripheral surface of the perforated hollow pipe at least through the outer peripheral portion of the spiral wound type membrane element.

When the washing liquid is introduced from at least one opening end of the perforated hollow pipe, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to at least the outer peripheral portion of the spiral wound type membrane element from the system in back wash reverse filtration. Therefore, the separated contaminants are discharged from the system with the washing liquid. Thus, the contaminants captured on at least the outer peripheral portion of the spiral wound type membrane element can be uniformly removed for regularly maintaining a stable permeate flow rate in running.

In this case, the chemical having a function of separating the contaminants contained in the washing liquid readily separates the contaminants adhering to at least the outer peripheral portion of the spiral wound type membrane element. Thus, the spiral wound type membrane element can be more effectively washed.

Further, the chemical having a bactericidal action contained in the washing liquid can more effectively suppress propagation of germs such as microorganisms on the membrane surface of the spiral wound type membrane element.

Thus, the spiral wound type membrane element can be stably run over a long period.

The washing liquid may be the permeated liquid.

The liquid-permeable material of the spiral wound type membrane element may be a separation membrane. In this case, the raw liquid is supplied from at least the outer peripheral side of the spiral wound type membrane element and the outer peripheral portion of the spiral membrane component is covered with the separation membrane, whereby contaminants are captured on the separation membrane on at least the outer peripheral portion of the spiral wound type membrane element. Therefore, the contaminants can be uniformly removed by back wash reverse filtration with permeate or the like, for example.

Further, only contaminants smaller than the pore size of the separation membrane on the outer peripheral portion infiltrate into the clearances between the envelope-like membranes forming the spiral membrane component, whereby loads on the envelope-like membranes are reduced to enable stable running over a long period.

In particular, the separation membrane may be a microfiltration membrane. In this case, contaminants larger than the pore size of the microfiltration membrane are captured on the outer peripheral portion of the spiral membrane component, not to infiltrate into the spiral membrane component.

The separation membrane may be an ultrafiltration membrane. In this case, contaminants larger than the pore size of the ultrafiltration membrane are captured on the outer peripheral portion of the spiral membrane component, not to infiltrate into the spiral membrane component.

The liquid-permeable material forming the spiral wound type membrane element may be a net. Even if contaminants captured on the outer peripheral portion of the spiral membrane component increase back pressure caused in back wash reverse filtration, the net forming the outer peripheral portion prevents the spiral membrane component from swelling, not to increase the spaces between the envelope-like membranes in this case. Thus, the envelope-like membranes are prevented from breakage resulting from swelling, so that contaminants contained in the raw liquid do not leak into the permeated liquid.

The net may be made of synthetic resin or metal.

The net preferably has at least three meshes and not more than 200 meshes. Thus, the spiral membrane component can be reliably inhibited from swelling caused by back pressure in back wash reverse filtration, and the raw liquid can be sufficiently supplied to the clearances between the envelope-like membranes forming the spiral membrane component from the outer peripheral side in running.

A prescribed portion of the net forming the outer peripheral portion of the spiral membrane component may be reinforced with resin along the circumferential direction. Thus, even if high back pressure is caused in back wash reverse filtration, the net forming the outer peripheral portion reliably prevents the spiral membrane component from swelling.

The permeate passage forming member inserted between the envelope-like membranes may extend outward from the outer peripheral side of the envelope-like membranes so that the extending portion of the permeate passage forming member is wound around the outer peripheral surface of the spiral membrane component as a net.

In this case, the spiral membrane component can be prevented from swelling caused by back pressure in back wash reverse filtration while suppressing an additional component cost.

The thickness of the outer peripheral passage forming member of the spiral wound type membrane element is preferably at least 0.6 mm and not more than 30 mm. Thus, contaminants adhering to at least the outer peripheral portion of the spiral wound type membrane element can be discharged from the system in back wash reverse filtration while keeping high volumetric efficiency of the spiral wound type membrane element with respect to the pressure vessel.

The outer peripheral passage forming member is preferably so arranged that the raw liquid substantially linearly flows substantially in parallel with the axial direction of the perforated hollow pipe. Thus, contaminants adhering to the outer peripheral portion of the spiral wound type membrane element can be substantially linearly washed away substantially in parallel with the axial direction of the perforated hollow pipe with the raw liquid with small pressure loss in back wash reverse filtration of the spiral wound type membrane element. Therefore, the contaminants adhering to the outer peripheral portion of the spiral wound type membrane element can be readily and reliably discharged from the system.

The outer peripheral passage forming member may be formed by a netty passage forming member. In this case, the netty passage forming member sufficiently protects the outer peripheral portion of the spiral wound type membrane element and prevents the spiral wound type membrane element from spreading between the envelope-like membranes on the outer peripheral portion. Further, the raw liquid can readily infiltrate into the clearances between the envelope-like membranes through the netty passage forming member from the outer peripheral portion of the spiral wound type membrane element. Thus, handleability of the spiral wound type membrane element is further improved and it is possible to efficiently supply the raw liquid between the envelope-like membranes while reliably capturing contaminants on the outer peripheral portion of the spiral wound type membrane element.

In a method of washing a spiral wound type membrane element according to another aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a washing liquid containing a chemical having a function of separating contaminants or a bactericidal action from at least one opening end of the perforated hollow pipe and discharging the washing liquid derived from the outer peripheral surface of the perforated hollow pipe from at least the outer peripheral portion of the spiral wound type membrane element.

In the aforementioned spiral wound type membrane element, at least the outer peripheral portion is not covered with a protective sheath but brought into an open state, whereby a raw liquid can be supplied from at least the outer peripheral side of the spiral wound type membrane element for performing dead end filtration. In this case, contaminants are captured on at least the outer peripheral portion of the spiral wound type membrane element.

When the washing liquid is introduced from at least one opening end of the perforated hollow pipe in washing, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on at least the outer peripheral portion of the spiral wound type membrane element are separated from the spiral wound type membrane element and discharged from the system with the washing liquid. Thus, the contaminants captured on at least the outer peripheral portion of the spiral wound type membrane element can be uniformly removed.

In this case, the contaminants adhering to at least the outer peripheral portion of the spiral wound type membrane element can be readily separated by the chemical having a function of separating contaminants contained in the washing liquid. Thus, the spiral wound type membrane element can be more effectively washed.

Further, the chemical having a bactericidal action contained in the washing liquid can more effectively suppress propagation of germs such as microorganisms on the membrane surface of the spiral wound type membrane element.

Thus, the spiral wound type membrane element can be stably run over a long period.

The discharging step may include a step of dipping the spiral wound type membrane element in the washing liquid containing the chemical.

In this case, the washing liquid containing the chemical is introduced into the spiral wound type membrane element from the perforated hollow pipe for dipping the spiral wound type membrane element in the washing liquid for a prescribed time. In a spiral wound type membrane module formed by charging the spiral wound type membrane element in a pressure vessel, for example, the pressure vessel is filled with the washing liquid for dipping the spiral wound type membrane element therein. Thereafter the washing liquid is discharged from the system. Thus, contaminants adhering to at least the outer peripheral portion of the spiral wound type membrane element are readily separated due to such dipping and contaminants adhering to the membrane surface can also be readily washed out, whereby the spiral wound type membrane element can be more effectively washed. Further, it is possible to more effectively suppress propagation of germs such as microorganisms on the membrane surface of the spiral wound type membrane element.

Thus, the spiral wound type membrane element can be stably run over a long period.

The chemical may be sodium hypochlorite, chloramine, sulfuric acid, hydrochloric acid, sodium hydroxide, peracetic acid, isopropyl alcohol, oxalic acid or citric acid. Such a chemical having a function of separating contaminants can separate contaminants adhering to at least the outer peripheral surface for more effectively washing the spiral wound type membrane element. Further, the chemical having a bactericidal action can more effectively suppress propagation of germs on the membrane surface.

The discharging step may include a step of discharging the washing liquid from at least the outer peripheral portion of the spiral wound type membrane element and thereafter axially feeding a raw liquid along the outer peripheral portion of the spiral wound type membrane element. Thus, contaminants adhering to the outer peripheral portion of the spiral wound type membrane element can be readily separated and the contaminants separated from the spiral wound type membrane element can be readily and reliably discharged from the system.

Alternatively, the discharging step may include a step of axially feeding a raw liquid along the outer peripheral portion of the spiral wound type membrane element before introducing the washing liquid from at least one opening end of the perforated hollow pipe. Also in this case, contaminants adhering to the outer peripheral portion of the spiral wound type membrane element can be readily separated and the contaminants separated from the spiral wound type membrane element can be readily and reliably discharged from the system.

Alternatively, the discharging step may include a step of regularly or periodically axially feeding a raw liquid along the outer peripheral portion of the spiral wound type membrane element in parallel with introduction of the washing liquid from at least one opening end of the perforated hollow cylindrical pipe. Also in this case, contaminants adhering to the outer peripheral portion of the spiral wound type membrane element can be readily separated and the contaminants separated from the spiral wound type membrane element can be readily and reliably discharged from the system.

In a method of running a spiral wound type membrane module according to still another aspect of this invention, the spiral wound type membrane module comprises a pressure vessel having a raw liquid inlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a raw liquid containing a chemical having a function of separating contaminants or a bactericidal action at least from the outer peripheral side of the spiral wound type membrane element through the raw liquid inlet of the pressure vessel and taking out a permeated liquid from at least one opening end of the perforated hollow pipe in filtration running.

According to this method of running a spiral wound type membrane module, dead end filtration is performed during running. In this case, contaminants are captured on at least the outer peripheral portion of the spiral wound type membrane element.

No dead space is defined in the clearance between the spiral wound type membrane element and the pressure vessel due to dead end filtration, to allow no residence of the liquid in the clearance between the spiral wound type membrane element and the pressure vessel. Also when the spiral wound type membrane module is employed for separating a fluid containing organic matter, therefore, high reliability is attained with no problems such as propagation of germs such as microorganisms, occurrence of a bad smell resulting from decomposition of the organic matter, decomposition of separation membranes and the like.

Further, the spiral wound type membrane element requires neither packing holders nor a protective sheath, whereby the component cost and the manufacturing cost are reduced. In addition, high recovery is attained without employing a large pump for supplying the raw liquid due to dead end filtration. Thus, the system cost is reduced.

Further, the spiral wound type membrane element is supplied with the raw liquid into which the chemical having a function of separating contaminants is injected, whereby it is possible to inhibit contaminants from adhering to at least the outer peripheral portion of the spiral wound type membrane element.

In addition, the spiral wound type membrane element is supplied with the raw liquid into which the chemical having a bactericidal action is injected, whereby propagation of germs such as microorganisms can be suppressed on the membrane surface of the spiral wound type membrane element.

Thus, the spiral wound type membrane module can be stably run over a long period.

In a method of washing a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of supplying a washing liquid containing a chemical having a function of separating contaminants or a bactericidal action from at least one opening end of the perforated hollow pipe and discharging the washing liquid derived from the outer peripheral surface of the perforated hollow pipe through at least the outer peripheral portion of the spiral wound type membrane element for taking out the washing liquid from the pressure vessel.

When the washing liquid is introduced from at least one opening end of the perforated hollow pipe of the spiral wound type membrane element in the method of washing a spiral wound type membrane module, the washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on at least the outer peripheral portion of the spiral wound type membrane element are separated from the spiral wound type membrane element and discharged from the pressure vessel with the washing liquid. Thus, the contaminants captured on at least the outer peripheral portion of the spiral wound type membrane element can be uniformly removed.

In this case, the chemical having a function of separating contaminants contained in the washing liquid readily separates the contaminants adhering to at least the outer peripheral portion of the spiral wound type membrane element. Thus, the spiral wound type membrane element can be more effectively washed.

Further, the chemical having a bactericidal action contained in the washing liquid can more effectively suppress propagation of germs such as microorganisms on the membrane surface of the spiral wound type membrane element.

Thus, the spiral wound type membrane module can be stably run over a long period.

(2) Second Invention

In a method of running a spiral wound type membrane element according to an aspect of the second invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of continuously or intermittently diffusing bubbles in a liquid coming into contact with the outer peripheral portion of the spiral membrane component.

According to this method of running a spiral wound type membrane element, a diffused air flow is formed on the outer peripheral portion of the spiral wound type membrane element by diffusing bubbles in the liquid coming into contact with the outer peripheral portion of the spiral wound type membrane element. Thus, it is possible to inhibit contaminants contained in the liquid from adhering to the membrane surface and at least the outer peripheral portion of the spiral wound type membrane element. Further, it is possible to separate contaminants adhering to the membrane surface and at least the outer peripheral portion of the spiral wound type membrane element.

Thus, the spiral wound type membrane element can be stably run over a long period.

In the aforementioned method of running a spiral wound type membrane element, no dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

Further, a raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid, due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

In a method of running a spiral wound type membrane element according to another aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of continuously or intermittently applying ultrasonic vibration to a liquid coming into contact with the outer peripheral portion of the spiral membrane component.

According to this method of running a spiral wound type membrane element, contaminants contained in the liquid can be dispersed by applying ultrasonic vibration to the liquid coming into contact with the outer peripheral portion of the spiral membrane component for inhibiting the contaminants from adhering to the membrane surface and at least the outer peripheral portion of the spiral wound type membrane element. The spiral wound type membrane element also vibrates and hence it is possible to separate contaminants adhering to the membrane surface and at least the outer peripheral portion of the spiral wound type membrane element.

Thus, the spiral wound type membrane element can be stably run over a long period.

In the aforementioned method of running a spiral wound type membrane element, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane element for separating a fluid containing organic matter, therefore, high reliability can be attained with no problems such as propagation of germs such as microorganisms, occurrence of a bad smell resulting from decomposition of organic matter and decomposition of separation membranes.

Further, a raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

In a method of running a spiral wound type membrane module according to still another aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of continuously or intermittently diffusing bubbles in a liquid stored in the pressure vessel.

According to the method of running a spiral wound type membrane module, a diffused air flow is formed on the outer peripheral portion of the spiral wound type membrane element by diffusing bubbles in the liquid stored in the pressure vessel. Thus, it is possible to inhibit contaminants contained in the liquid from adhering to the membrane surface and at least the outer peripheral portion of the spiral wound type membrane element. Further, it is possible to separate contaminants adhering to the membrane surface and at least the outer peripheral portion of the spiral wound type membrane element.

In the method of running a spiral wound type membrane module, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability is attained with no problems such as propagation of germs such as microorganisms, occurrence of a bad smell resulting from decomposition of the organic matter and decomposition of the separation membrane.

Further, a raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to the dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

As a first mode of the method of running a spiral wound type membrane module according to this invention, the step of diffusing bubbles may include a step of supplying a raw liquid from at least the outer peripheral side of the spiral wound type membrane element while diffusing bubbles in the raw liquid and taking out a permeated liquid from at least one opening end of the perforated hollow pipe in filtration running. In this case, contaminants contained in the raw liquid are captured on at least the outer peripheral portion of the spiral wound type membrane element.

A diffused air flow is formed on the outer peripheral portion of the spiral wound type membrane element by diffusing bubbles in the raw liquid. Thus, it is possible to inhibit contaminants contained in the raw liquid from adhering to the membrane surface and at least the outer peripheral portion of the spiral wound type membrane element and to separate contaminants adhering to the inner part of the spiral wound type membrane module, particularly to the membrane surface and at least the outer peripheral portion of the spiral wound type membrane element.

As a second mode of the method of running a spiral wound type membrane module according to this invention, the step of diffusing bubbles may include a step of introducing a washing liquid from at least one opening end of the perforated hollow pipe and discharging the washing liquid derived from the outer peripheral surface of the perforated hollow pipe through at least the outer peripheral portion of the spiral wound type membrane element while diffusing bubbles in the washing liquid in washing.

In washing, the washing liquid is introduced from at least one opening end of the perforated hollow pipe for performing back wash reverse filtration. The washing liquid derived from the outer peripheral surface of the perforated hollow pipe permeates through the envelope-like membranes and flows along the raw liquid passage forming member to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element in back wash reverse filtration. Thus, the separated contaminants are discharged outward with the washing liquid. Therefore, the contaminants captured on the membrane surface and at least the outer peripheral portion of the spiral wound type membrane element can be uniformly removed so that a constant permeate flow rate can be regularly maintained in running.

A diffused air flow is formed on the outer peripheral portion of the spiral wound type membrane element by diffusing bubbles in the washing liquid. Thus, it is possible to more effectively separate the contaminants adhering to the inner part of the spiral wound type membrane module, particularly to the membrane surface and at least the outer peripheral portion of the spiral wound type membrane element, and to inhibit the separated contaminants from adhering to the membrane surface and at least the outer peripheral portion of the spiral wound type membrane element.

As a third mode of the method of running a spiral wound type membrane module according to this invention, the step of diffusing bubbles may include a step of axially feeding a raw liquid or a washing liquid along the outer peripheral portion of the spiral wound type membrane element while diffusing bubbles in the raw liquid or the washing liquid in flushing. Thus, contaminants adhering to the inner part of the spiral wound type membrane module, particularly to the membrane surface and at least the outer peripheral portion of the spiral wound type membrane element can be readily separated and the separated contaminants can be readily and reliably discharged outward.

As a fourth mode of the method of running a spiral wound type membrane module according to this invention, the step of diffusing bubbles may include a step of diffusing bubbles in a raw liquid or a washing liquid stored in the pressure vessel when stopping running. In this case, a diffused air flow is formed on the outer peripheral portion of the spiral wound type membrane element. Thus, it is possible to inhibit contaminants contained in the raw liquid or the washing liquid from adhering to the membrane surface and at least the outer peripheral portion of the spiral wound type membrane element and to separate contaminants adhering to the inner part of the spiral wound type membrane module, particularly to the membrane surface and at least the outer peripheral portion of the spiral wound type membrane element.

The method may include a step of continuously or intermittently axially feeding a partial raw liquid along the outer peripheral portion of the spiral wound type membrane element and taking out the partial raw liquid from the pressure vessel in filtration running. In this case, it is possible to readily and reliably discharge part of contaminants contained in the raw liquid and contaminants separated from the membrane surface and at least the outer peripheral portion of the spiral wound type membrane element from the spiral wound type membrane module and to further inhibit the contaminants contained in the raw liquid from adhering to the membrane surface and at least the outer peripheral portion of the spiral wound type membrane element. Thus, the spiral wound type membrane module can be further stably run continuously over a long period.

Further, the method may include a step of returning the raw liquid taken out from the pressure vessel to the supply side again. In this case, the discharged raw liquid is circulated, whereby the supplied raw liquid can be recovered as a permeated liquid with recovery of 100% in theory.

In a method of running a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of continuously or intermittently applying ultrasonic vibration to a liquid stored in the pressure vessel.

According to this method of running a spiral wound type membrane module, it is possible to discharge contaminants contained in the liquid stored in the pressure vessel for inhibiting the contaminants from adhering to the membrane surface and at least the outer peripheral portion of the spiral wound type membrane element by applying ultrasonic vibration to the liquid. The spiral wound type membrane element also vibrates, whereby contaminants adhering to the membrane surface and at least the outer peripheral portion of the spiral wound type membrane element can be separated.

Thus, the spiral wound type membrane element can be stably run continuously over a long period.

In the aforementioned method of running a spiral wound type membrane module, no dead space is defined in the clearance between the spiral wound type membrane element and the pressure vessel due to dead end filtration, to allow no residence of a fluid in the clearance between the spiral wound type membrane element and the pressure vessel. Also when employing the spiral wound type membrane module for separating a fluid containing organic matter, therefore, high reliability is attained with no problems such as propagation of germs such as microorganisms, occurrence of a bad smell resulting from decomposition of the organic matter and decomposition of separation membranes.

Further, a raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

As a fifth mode of the method of running a spiral wound type membrane module according to this invention, the step of applying ultrasonic vibration may include a step of supplying a raw liquid from at least the outer peripheral side of the spiral wound type membrane element while applying ultrasonic vibration to the raw liquid and taking out a permeated liquid from at least one opening end of the perforated hollow pipe in filtration running. In this case, contaminants contained in the raw liquid are captured on at least the outer peripheral portion of the spiral wound type membrane element.

It is possible to disperse the contaminants contained in the raw liquid and inhibit the contaminants from adhering to the membrane surface and at least the outer peripheral portion of the spiral wound type membrane element by applying ultrasonic vibration to the raw liquid. The spiral wound type membrane element also vibrates, whereby contaminants adhering to the inner part of the spiral wound type membrane module, particularly to the membrane surface and at least the outer peripheral portion of the spiral wound type membrane element can be separated.

As a sixth mode of the method of running a spiral wound type membrane module according to this invention, the step of applying ultrasonic vibration may include a step of introducing a washing liquid from at least one opening end of the perforated hollow pipe and applying ultrasonic vibration to the washing liquid while discharging the washing liquid derived from the outer peripheral surface of the perforated hollow pipe through at least the outer peripheral portion of the spiral wound type membrane element in washing. In washing, the washing liquid is introduced from at least one opening end of the perforated hollow pipe for performing back wash reverse filtration. The washing liquid derived from the outer peripheral surface of the perforated hollow pipe permeates the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes on the outer peripheral portion, thereby ensuring a passage for discharging contaminants adhering to the membrane surface and at least the outer peripheral portion of the spiral wound type membrane element outward in back wash reverse filtration. Thus, the separated contaminants are discharged outward with the washing liquid. Therefore, the contaminants captured on the membrane surface and at least the outer peripheral portion of the spiral wound type membrane element can be uniformly removed, and it is possible to regularly maintain a stable permeate flow rate in running.

It is possible to more effectively separate contaminants adhering to the inner part of the spiral wound type membrane module, particularly to the membrane surface and at least the outer peripheral portion of the spiral wound type membrane element and to inhibit the separated contaminants from adhering to the membrane surface and at least the outer peripheral portion of the spiral wound type membrane element by applying ultrasonic vibration to the washing liquid.

As a seventh mode of the method of running a spiral wound type membrane module according to this invention, the step of applying ultrasonic vibration may include a step of axially feeding a raw liquid or a washing liquid along the outer peripheral portion of the spiral wound type membrane element and applying ultrasonic vibration to the raw liquid or the washing liquid in flushing. Thus, contaminants adhering to the inner part of the spiral wound type membrane module, particularly to the membrane surface and at least the outer peripheral portion of the spiral wound type membrane element can be readily separated and the separated contaminants can be readily and reliably discharged outward.

As an eighth mode of the method of running a spiral wound type membrane module according to this invention, the step of applying ultrasonic vibration may include a step of applying ultrasonic vibration to a raw liquid or a washing liquid stored in the pressure vessel when stopping running. Thus, it is possible to inhibit contaminants contained in the raw liquid or the washing liquid from adhering to the membrane surface and at least the outer peripheral portion of the spiral wound type membrane element and to separate contaminants adhering to the membrane surface and at least the outer peripheral portion of the spiral wound type membrane element.

The method may include a step of continuously or intermittently axially feeding a partial raw liquid along the outer peripheral portion of the spiral wound type membrane element and taking out the partial raw liquid from the pressure vessel. In this case, it is possible to readily and reliably discharge part of the contaminants contained in the raw liquid and contaminants separated from the membrane surface and at least the outer peripheral portion of the spiral wound type membrane element from the spiral wound type membrane module, and to further inhibit the contaminants contained in the raw liquid from adhering to the membrane surface and at least the outer peripheral portion of the spiral wound type membrane element. Thus, the spiral wound type membrane module can be further stably run continuously over a long period.

The method may further include a step of returning the raw liquid taken out from the pressure vessel to the supply side again. In this case, the discharged raw liquid is circulated, whereby the supplied raw liquid can be recovered as a permeated liquid with recovery of 100% in theory.

A spiral wound type membrane module according to a further aspect of this invention comprises a pressure vessel having a raw liquid inlet and a raw water outlet and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises an air diffuser diffusing bubbles in a liquid stored in the pressure vessel and a circulation system returning a raw liquid taken out from the pressure vessel through the raw liquid outlet to the raw liquid inlet.

In this spiral wound type membrane module, the air diffuser continuously or intermittently diffuses bubbles in the raw liquid or a washing liquid stored in the pressure vessel. Thus, a diffused air flow is formed on the outer peripheral portion of the spiral wound type membrane element in the spiral wound type membrane module, whereby contaminants adhering to the membrane surface and at least the outer peripheral portion of the spiral wound type membrane element can be separated. Further, it is possible to inhibit contaminants contained in the raw liquid or the washing liquid and the separated contaminants from adhering to the membrane surface and at least the outer peripheral portion of the spiral wound type membrane element.

In running, it is possible to readily and reliably discharge part of the contaminants contained in the raw liquid and the separated contaminants from the spiral wound type membrane module and to further inhibit the contaminants contained in the raw liquid and the separated contaminants from adhering to the membrane surface and at least the outer peripheral portion of the spiral wound type membrane element by axially forming a flow of the raw liquid along the outer peripheral portion of the spiral wound type membrane element.

Thus, the spiral wound type module implements stable performance.

Further, the circulation system is provided for returning the raw liquid taken out from the pressure vessel through the raw liquid outlet to the raw liquid inlet again, whereby the supplied raw liquid can be recovered as a permeated liquid with recovery of 100% in theory.

In addition, no dead space is defined in the clearance between the spiral wound type membrane element and the pressure vessel to allow no residence of a fluid in the clearance between the spiral wound type membrane element and the pressure vessel due to dead end filtration. Also when employing the spiral wound type membrane module for separating a fluid containing organic matter, therefore, high reliability is attained with no problems such as propagation of germs such as microorganisms, occurrence of a bad smell resulting from decomposition of the organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

A spiral wound type membrane module according to a further aspect of this invention comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the spiral wound type membrane module further comprises an ultrasonic oscillator applying ultrasonic vibration to a liquid stored in the pressure vessel.

In the spiral wound type membrane module, the ultrasonic oscillator continuously or intermittently applies ultrasonic vibration to a raw liquid or a washing liquid stored in the pressure vessel. Thus, the spiral wound type membrane element vibrates, whereby it is possible to separate contaminants adhering to the inner part of the spiral wound type membrane module, particularly to the membrane surface and at least the outer peripheral portion of the spiral wound type membrane element. Further, it is possible to inhibit contaminants contained in the raw liquid or the washing liquid and the separated contaminants from adhering to the membrane surface and at least the outer peripheral portion of the spiral wound type membrane element. Thus, the spiral wound type membrane module implements stable performance.

In addition, no dead space is defined in the clearance between the spiral wound type membrane element and the pressure vessel to allow no residence of a fluid in the clearance between the spiral wound type membrane element and the pressure vessel due to dead end filtration. Also when employing the spiral wound type membrane module for separating a fluid containing organic matter, therefore, high reliability is attained with no problems such as propagation of germs such as microorganisms, occurrence of a bad smell resulting from decomposition of the organic matter and decomposition of separation membranes.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained without employing a large pump for supplying the raw liquid due to dead end filtration. Thus, the system cost is reduced.

Further, pressure is applied to the spiral wound type membrane element from all directions, whereby the spiral wound type membrane element is not deformed even if the raw liquid is supplied under high pressure. Thus, high pressure resistance is attained.

(3) Third Invention

In a method of running a spiral wound type membrane element according to an aspect of this invention, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of temporarily stopping running and holding the spiral wound type membrane element in a state dipped in a liquid for a prescribed time during a running period.

In this method of running a spiral wound type membrane element, at least the outer peripheral portion of the spiral wound type membrane element is not covered with a protective sheath but brought into an open state, whereby it is possible to separate contaminants adhering to the membrane surface and at least the outer peripheral portion of the spiral wound type membrane element for recovering the membrane function of the spiral wound type membrane element by holding the spiral wound type membrane element in the state dipped in the liquid for the prescribed time. Thus, the spiral wound type membrane element can be stably run with high reliability. Such an operation can be readily performed with no requirement for particular equipment while the contaminants can be separated with no chemical for washing. Thus, the method can be carried out at a low cost.

As a first mode of the method of running a spiral wound type membrane element according to this invention, the holding step may include a step of supplying a raw liquid from at least the outer peripheral side of the spiral wound type membrane element while taking out a permeated liquid from at least one opening end of the perforated hollow pipe during filtration running in the running period and stopping the filtration running for holding the spiral wound type membrane element in the state dipped in the liquid for the prescribed time.

In this case, the raw liquid is supplied from at least the outer peripheral side of the spiral wound type membrane element while dead end filtration is performed so that contaminants are captured on at least the outer peripheral portion of the spiral wound type membrane element. Therefore, loads on the envelope-like membranes are reduced.

Further, no dead space is defined in the clearance between the spiral wound type membrane element and the pressure vessel to allow no residence of a fluid in the clearance between the spiral wound type membrane element and the pressure vessel due to dead end filtration. Also when employing the spiral wound type membrane module for separating a fluid containing organic matter, therefore, high reliability is attained with no problems such as propagation of germs such as microorganisms, occurrence of a bad smell resulting from decomposition of the organic matter and decomposition of separation membranes.

In addition, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. Further, high recovery is attained without employing a large pump for supplying the raw liquid due to dead end filtration. Thus, the system cost is reduced.

In addition, pressure is applied to the spiral wound type membrane element from all directions, whereby the spiral wound type membrane element is not deformed even if the raw liquid is supplied under high pressure. Thus, high pressure resistance is attained.

Further, it is possible to separate contaminants adhering to the membrane surface and at least the outer peripheral portion of the spiral wound membrane element following filtration running by stopping filtration running and dipping the spiral wound type membrane element in the liquid for the prescribed time.

In the aforementioned method of running a spiral wound type membrane element, a partial raw liquid may be regularly or periodically fed axially along the outer peripheral portion of the spiral wound type membrane element. Thus, it is possible to inhibit contaminants contained in the raw liquid from adhering to at least the outer peripheral portion of the spiral wound type membrane element for further stably running the spiral wound type membrane element.

As a second mode of the method of running a spiral wound type membrane element according to this invention, the holding step may include a step of introducing a washing liquid from at least one opening end of the perforated hollow pipe while discharging the washing liquid derived from the outer peripheral surface of the perforated hollow pipe through at least the outer peripheral portion of the spiral wound type membrane element in back wash reverse filtration in the running period and stopping the back wash reverse filtration for holding the spiral wound type membrane element in the state dipped in the liquid for the prescribed time.

When the washing liquid is introduced from at least one opening end of the perforated hollow pipe, the washing liquid derived from the outer peripheral surface of the perforated hollow pipe permeates through the envelope-like membranes and flows along the raw liquid passage forming member, to be discharged from at least the outer peripheral portion of the spiral wound type membrane element. Thus, contaminants captured on the membrane surface and at least the outer peripheral portion of the spiral wound type membrane element are separated from the spiral wound type membrane element. The liquid-permeable material and the outer peripheral passage forming member prevent the spiral wound type membrane element from spreading between the envelope-like membranes in the outer peripheral portion, thereby ensuring a passage for discharging contaminants adhering to the membrane surface and at least the outer peripheral portion of the spiral wound type membrane element in back wash reverse filtration. Thus, the separated contaminants are discharged with the washing liquid. Therefore, it is possible to uniformly remove contaminants captured on the membrane surface and at least the outer peripheral portion of the spiral wound type membrane element, and to regularly maintain a constant permeate flow rate in filtration running.

Further, it is possible to more effectively separate contaminants adhering to the membrane surface and at least the outer peripheral portion of the spiral wound type membrane element following filtration by stopping back wash reverse filtration and dipping the spiral wound type membrane element in the liquid for the prescribed time.

The aforementioned first mode may further comprise a step of restarting filtration running after holding the spiral wound type membrane element in the state dipped in the liquid for the prescribed time. In this case, it is possible to separate contaminants adhering to the membrane surface and at least the outer peripheral portion of the spiral wound type membrane element by dipping the spiral wound type membrane element in the liquid for the prescribed time, whereby high reliability and stability can be attained in the restarted filtration running.

Alternatively, the aforementioned first mode may further comprise a step of performing back wash reverse filtration by introducing a washing liquid from at least one opening end of the perforated hollow pipe while discharging the washing liquid derived from the outer peripheral surface of the perforated hollow pipe through at least the outer peripheral portion of the spiral wound type membrane element after holding the spiral wound type membrane element in the state dipped in the liquid for the prescribed time. In this case, back wash reverse filtration is performed after dipping the spiral wound type membrane element in the liquid for the prescribed time, whereby contaminants adhering to the membrane surface and at least the outer peripheral portion of the spiral wound type membrane element can be readily and reliably separated. Thus, reliable and stable filtration running can be performed.

The aforementioned first mode may further comprise a step of performing flushing by axially feeding a raw liquid along the outer peripheral portion of the spiral wound type membrane element after holding the spiral wound type membrane element in the state dipped in the liquid for the prescribed time. In this case, contaminants adhering to the outer peripheral portion of the spiral wound type membrane element can be readily separated by flushing, while the contaminants separated from the spiral wound type membrane element can be readily and reliably discharged.

Alternatively, the aforementioned second mode may further comprise a step of supplying a liquid containing a chemical having a bactericidal action or a function separating contaminants to the spiral wound type membrane element and dipping the spiral wound type membrane element in the liquid containing the chemical after holding the spiral wound type membrane element in the state dipped in the liquid for the prescribed time. Thus, it is possible to exterminate germs propagating on the membrane surface and at least the outer peripheral portion of the spiral wound type membrane element or to more effectively and reliably separate contaminants adhering to the membrane surface and at least the outer peripheral portion of the spiral wound type membrane element.

The aforementioned second mode may further comprise a step of restarting back wash reverse filtration after holding the spiral wound type membrane element in the state dipped in the liquid for the prescribed time. In this case, the back wash reverse filtration is performed after dipping the spiral wound type membrane element in the liquid for the prescribed time, whereby contaminants adhering to the membrane surface and at least the outer peripheral portion of the spiral wound type membrane element can be readily and reliably separated. Thus, reliable and stable filtration running can be performed.

Alternatively, the aforementioned second mode may further comprise a step of performing filtration running by supplying a raw liquid from at least the outer peripheral portion of the spiral wound type membrane element while taking out a permeated liquid from at least one opening end of the perforated hollow pipe after holding the spiral wound type membrane element in the state dipped in the liquid for the prescribed time. In this case, contaminants adhering to the membrane surface and at least the outer peripheral portion of the spiral wound type membrane element can be separated by dipping the spiral wound type membrane element in the liquid for the prescribed time, whereby high reliability and stability are attained in filtration running after the dipping.

Alternatively, the aforementioned second mode may further comprise a step of performing flushing by axially feeding a raw liquid along the outer peripheral portion of the spiral wound type membrane element after holding the spiral wound type membrane element in the state dipped in the liquid for the prescribed time. In this case, contaminants adhering to the outer peripheral portion of the spiral wound type membrane element can be readily separated by flushing, while the contaminants separated from the spiral wound type membrane element can be readily and reliably discharged outward.

Alternatively, the aforementioned second mode may further comprise a step of supplying a liquid containing a chemical having a bactericidal action or a function separating contaminants to the spiral wound type membrane element and dipping the spiral wound type membrane element in the liquid containing the chemical after holding the spiral wound type membrane element in the state dipped in the liquid for the prescribed time. Thus, it is possible to exterminate germs propagating on the membrane surface and at least the outer peripheral portion of the spiral wound type membrane element or to more effectively and reliably separate contaminants adhering to the membrane surface and at least the outer peripheral portion of the spiral wound type membrane element.

In a method of running a spiral wound type membrane module according to a further aspect of this invention, the spiral wound type membrane module comprises a pressure vessel and one or a plurality of spiral wound type membrane elements stored in the pressure vessel, the spiral wound type membrane element comprises a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component and an outer peripheral passage forming member entirely or partially covering the outer peripheral surface of the liquid-permeable material, and the method comprises a step of temporarily stopping running and holding the spiral wound type membrane module in a state sealing a liquid in the pressure vessel for a prescribed time in a running period.

In this method of running a spiral wound type membrane module, at least the outer peripheral portion of the spiral wound type membrane element stored in the pressure vessel is not covered with a protective sheath but brought into an open state. Therefore, it is possible to separate contaminants adhering to the membrane surface and at least the outer peripheral portion of the spiral wound type membrane element and recover the membrane function of the spiral wound type membrane element by sealing the liquid in the pressure vessel and dipping the spiral wound type membrane element in the liquid. Thus, the spiral wound type membrane module can be reliably and stably run. Such an operation can be readily performed with no requirement for particular equipment and the contaminants can be separated with no chemical for washing, and hence the method can be carried out at a low cost.

These and other objects, features, aspects and advantages of the present invention will become apparent from the following detailed description of the present invention when taken in conjunction with the accompanying drawings.

BRIEF DESCRIPTION OF THE DRAWINGS

FIG. 9 is a cross-sectional view showing other exemplary envelope-like membranes of the spiral wound type membrane element shown in FIG. 6(a) or 6(b);

DESCRIPTION OF THE PREFERRED EMBODIMENTS (1) First Invention

Figure 1:
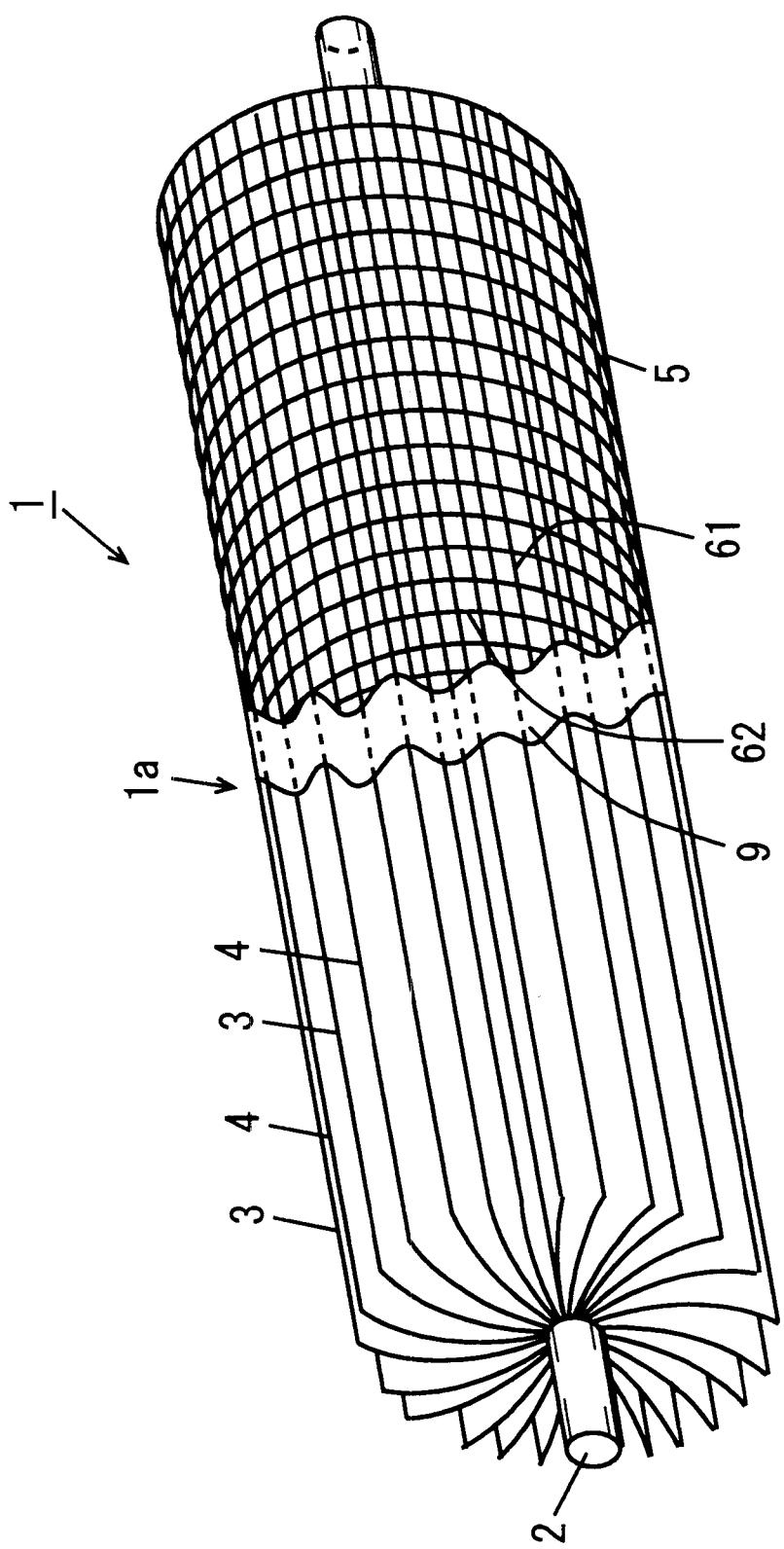
FIG. 1 is a partially fragmented perspective view showing a spiral wound type membrane element according to an embodiment of the present invention.
Figure 2:
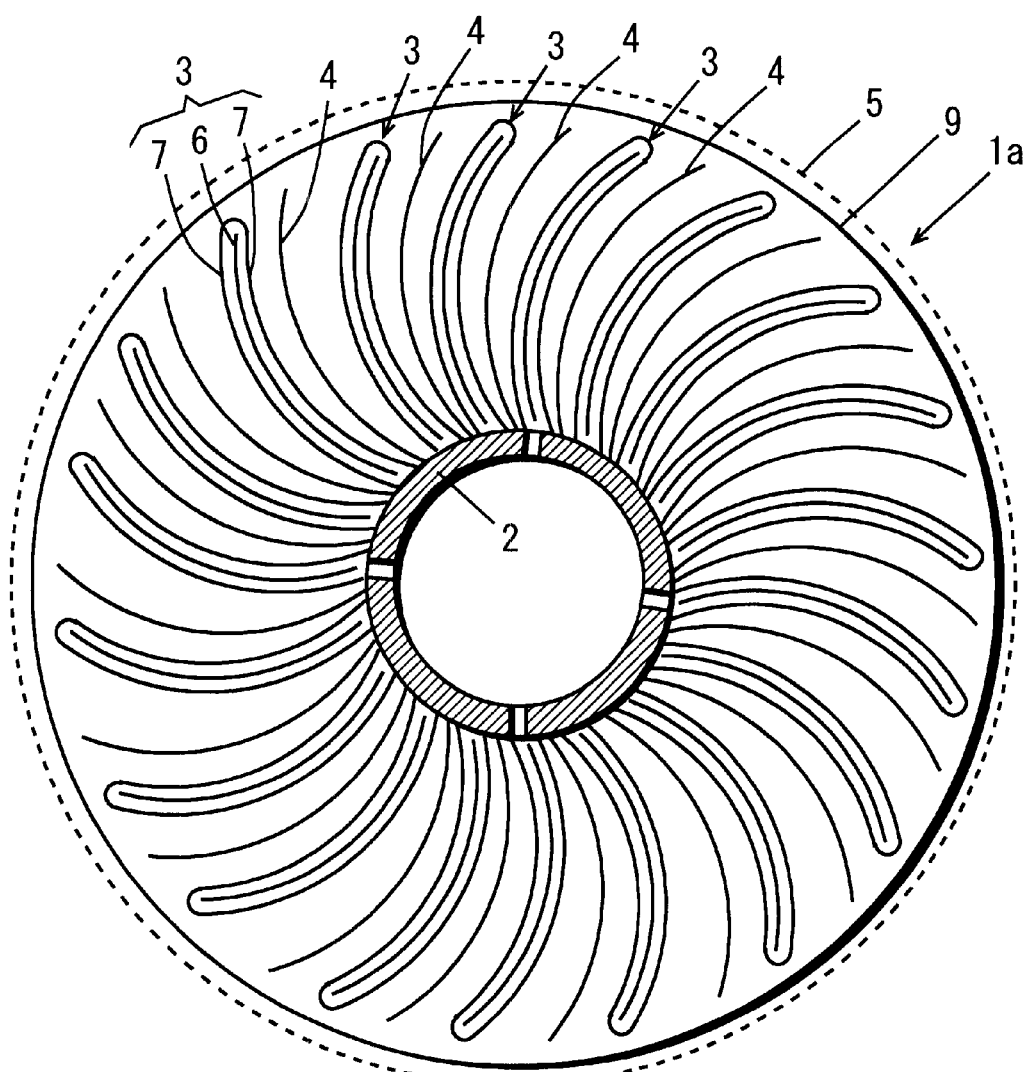
FIG. 2 is a cross-sectional view showing exemplary envelope-like membranes of the spiral wound type membrane element shown in FIG. 1.
Figure 3:
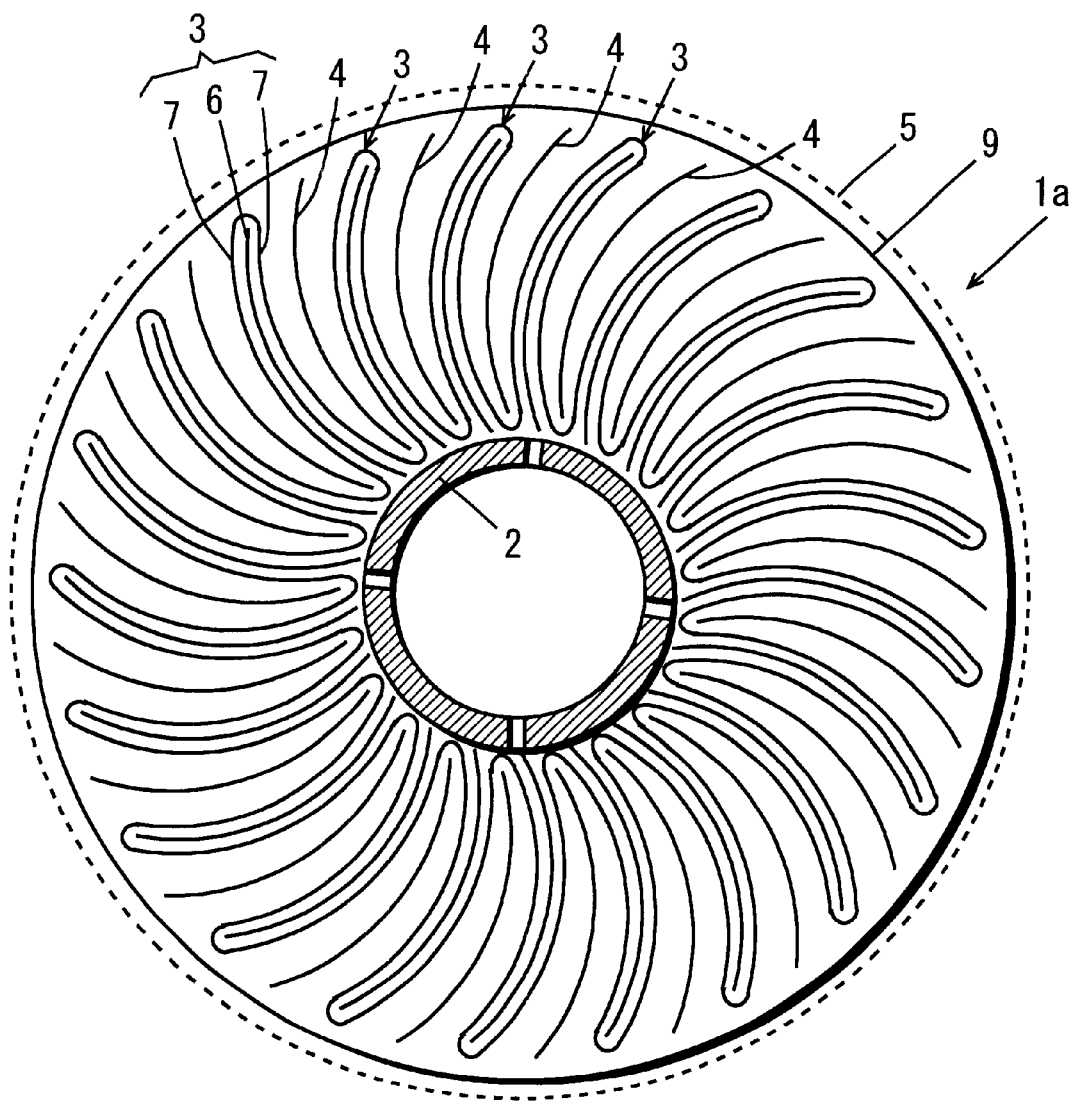
FIG. 3 is a cross-sectional view showing other exemplary envelope-like membranes of the spiral wound type membrane element shown in FIG. 1.

FIG. 1 is a partially fragmented perspective view showing a spiral wound type membrane element 1 according to an embodiment of the first invention. FIG. 2 is a cross-sectional view showing exemplary envelope-like membranes of the spiral wound type membrane element 1 shown in FIG. 1, and FIG. 3 is a cross-sectional view showing other exemplary envelope-like membranes of the spiral wound type membrane element 1 shown in FIG. 1.

The spiral wound type membrane element 1 shown in FIG. 1 includes a spiral membrane component 1a formed by winding a plurality of independent envelope-like membranes 3 or a plurality of continuous envelope-like membranes 3 around the outer peripheral surface of a water collection pipe 2 formed by a perforated hollow pipe. Raw water spacers (raw water passage forming members) 4 are inserted between the envelope-like membranes 3 for preventing the envelope-like membranes 3 from coming into close contact with each other and reducing the membrane area and for forming a passage for raw water.

The outer peripheral surface of the spiral membrane component 1a is covered with a separation membrane 9 made of a liquid-permeable material. This separation membrane 9 is formed by a microfiltration membrane or an ultrafiltration membrane.

The microfiltration membrane can be prepared from a polymer organic membrane of polyolefine, polysulfone, polypropylene, polyethylene, polystyrene, polyacrylonitrile or cellulose acetate. The ultrafiltration membrane can be prepared from a polymer organic membrane of polysulfone, polypropylene, polystyrene, polyacrylonitrile, cellulose acetate or polyethylene.

The outer peripheral surface of the separation membrane 9 is covered with an outer peripheral passage forming member 5 formed by a net. The net can be prepared from a polymer material such as polyolefine, polysulfone, polypropylene, polyethylene, polystyrene, polyacrylonitrile or cellulose acetate, an inorganic material such as ceramic, metal, synthetic rubber or fiber.

The pore size of the microfiltration membrane is preferably at least 0.01 μm and not more than 10 μm. As to the pore size of the ultrafiltration membrane, the molecular cutoff is preferably at least 20000 and the pore size is preferably not more than 0.01 μm. Further, the net employed as the outer peripheral passage forming member 5 preferably has at least four meshes and not more than 100 meshes.

The pore size of the microfiltration membrane or the ultrafiltration membrane employed as the separation membrane 9 and the number of the meshes forming the net employed as the outer peripheral passage forming member 5 are selected in response to the quality of raw water.

In the spiral wound type membrane element 1 shown in FIG. 1, the separation membrane 9 is formed by a microfiltration membrane of 0.4 μm in pore size made of polyolefine such as ethylene vinyl alcohol. Alternatively, the separation membrane 9 may be formed by an ultrafiltration membrane made of polysulfone. The outer peripheral passage forming member 5 is formed by a net of 50 meshes made of PET (polyethylene terephthalate).

The separation film 9 may also cover the end surfaces of the spiral membrane component 1a, in addition to the outer peripheral surface.

As shown in FIGS. 2 and 3, each envelope-like membrane 3 is formed by superposing two separation membranes 7 on both sides of a permeate spacer (permeate passage forming member) 6 and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm², ultrafiltration membranes or microfiltration membranes.

In the example shown in FIG. 2, the plurality of envelope-like membranes 3 are formed by independent separation membranes 7 respectively. In the example shown in FIG. 3, the plurality of envelope-like membranes 3 are formed by folding a continuous separation membrane 7.

If the thickness of the raw water spacers 4 is larger than 0.5 mm, it is difficult to capture contaminants contained in raw water on at least the outer peripheral portion of the spiral wound type membrane element 1. If the thickness of the raw water spacers 4 is smaller than 0.1 mm, the envelope-like membranes 3 readily come into contact with each other, to reduce the membrane area. Therefore, the thickness of the raw water spacers 4 is preferably at least 0.1 mm and not more than 0.5 mm.

As shown in FIG. 1, the outer peripheral passage forming member 5 is in the form of a lattice defined by a plurality of wires 61 and 62 perpendicularly intersecting with each other. The thickness of the wires 61 is set larger than that of the wires 62. Thus, raw water readily flows substantially linearly between the wires 61 in parallel with the wires 61.

As shown in FIG. 1, the outer peripheral passage forming member 5 is so arranged that the wires 61 are in parallel with the axial direction of the water collection pipe 2. Therefore, the raw water readily axially flows on the outer peripheral portion of the spiral membrane component 1a.

If the thickness of the outer peripheral passage forming member 5 is larger than 30 mm, the volumetric efficiency of the spiral wound type membrane element 1 is reduced with respect to a pressure vessel storing the spiral wound type membrane element 1. If the thickness of the outer peripheral passage forming member 5 is smaller than 0.6 mm, the flow velocity of the raw water for discharging contaminants adhering to at least the outer peripheral portion of the spiral wound type membrane element 1 from the system is reduced in back wash reverse filtration with permeate. Therefore, the thickness of peripheral passage forming member 5 is preferably at least 0.6 mm and not more than 30 mm.

The porosity of the outer peripheral passage forming member 5 along the thickness thereof is set to at least 20% and not more than 60%, for example. Thus, sufficient strength of the outer peripheral passage forming member 5 can be ensured while reducing the resistance of the raw water axially moving contaminants in back wash filtration. Further, the vertical and transverse pitches of the meshes forming the outer peripheral passage forming member 5 are set to at least 3 mm and not more than 30 mm, for example. Thus, the raw water can be sufficiently supplied between the envelope-like membranes 3 while preventing the outer peripheral surface of the spiral membrane component 1a from coming into contact with the pressure vessel and narrowing the passage for the raw water.

The separation membrane 9 covering the outer peripheral portion may be entirely or partially covered with the outer peripheral passage forming member 5.

Figure 4:
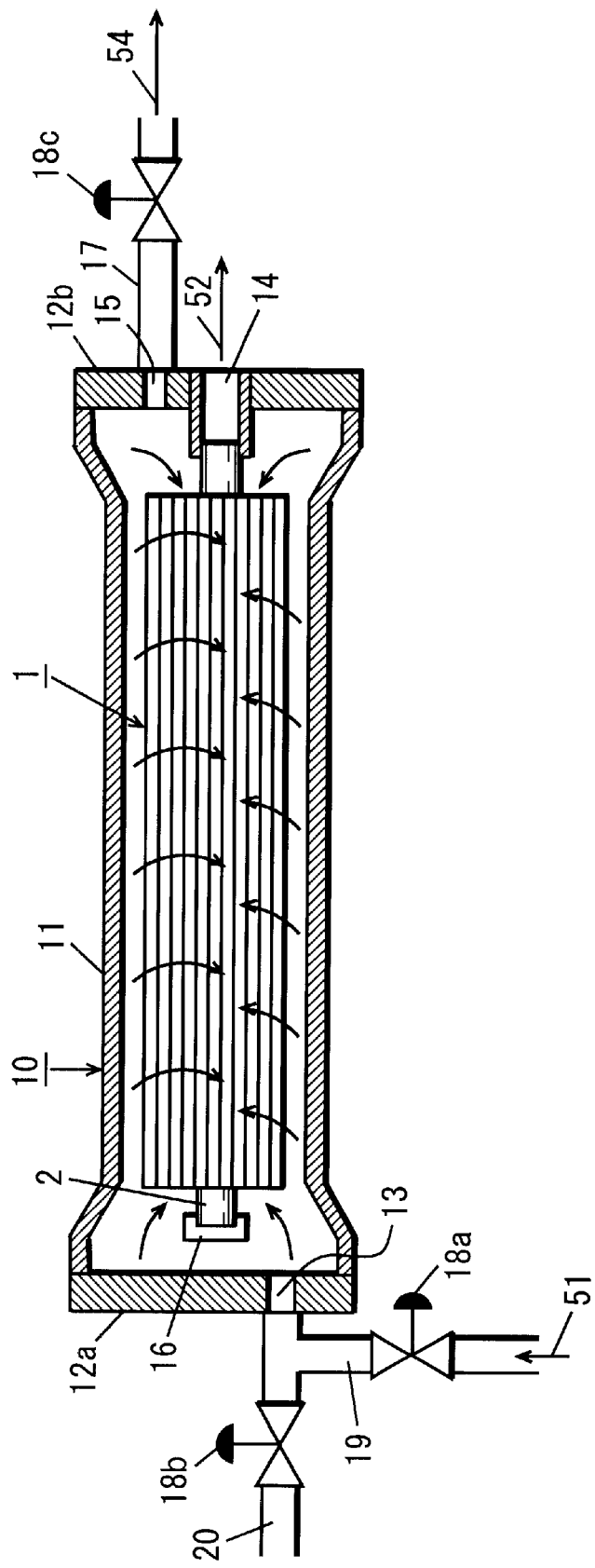
FIG. 4 is a sectional view showing an exemplary method of running the spiral wound type membrane element of FIG. 1 and a spiral wound type membrane module.

FIG. 4 is a sectional view showing an exemplary method of running the spiral wound type membrane element 1 and a spiral wound type membrane module according to this invention. As shown in FIG. 4, a pressure vessel (pressure-resistant vessel) 10 is formed by a tubular case 11 and a pair of end plates 12a and 12b. A raw water inlet 13 is formed on the end plate 12a, and a water outlet 15 is formed on the other end plate 12b. A permeate outlet 14 is formed on the center of the end plate 12b.

The tubular case 11 stores the spiral wound type membrane element 1 shown in FIG. 1, and both opening ends of the tubular case 11 are sealed with the end plates 12a and 12b respectively. One end of the water collection pipe 2 is engaged with the permeate outlet 14 of the end plate 12b, and an end cap 16 is attached to the other end. The raw water inlet 13 of the end plate 12a is connected with a pipe 19, which in turn is connected with another pipe 20. The pipes 19 and 20 are provided with valves 18a and 18b respectively. The raw water outlet 15 of the end plate 12b is connected with a pipe 17, which is provided with a valve 18c.

In filtration running of the spiral wound type membrane element 1, the valve 18a of the pipe 19 is opened and the valves 18b and 18c of the pipes 20 and 17 are closed. Raw water 51 is introduced into the pressure vessel 10 from the raw water inlet 13 thereof through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 4, the raw water 51 infiltrates into the clearances between the envelope-like membranes 3 from the outer peripheral side and both ends of the spiral wound type membrane element 1. Permeate passing through the separation membranes 7 flows into the water collection pipe 2 along the permeate spacer 6. Thus, permeate 52 is taken out from the permeate outlet 14 of the pressure vessel 10. Dead end filtration is performed in the aforementioned manner.

In this case, contaminants such as turbid substances larger than the pore size of the separation membrane 9 are captured on at least the outer peripheral portion of the spiral wound type membrane element 1 since the outer peripheral surface of the spiral membrane component 1a is covered with the separation membrane 9. In other words, only contaminants smaller than the pore size of the separation film 9 infiltrate into the clearances between the envelope-like membranes 3. Thus, loads on the separation membranes 7 forming the envelope-like membranes 3 are reduced.

Partial raw water 54 may be taken out from the raw water outlet 15 by opening the valve 18c of the pipe 17. In this case, a flow of the raw water 51 can be formed on the outer peripheral portion of the spiral wound type membrane element 1. Thus, the contaminants can be partially discharged from the pressure vessel 10 while suppressing sedimentation of contaminants contained in the raw water 51. Further, at least part of the raw water 54 taken out from the raw water outlet 15 may be returned to the supply side again.

Figure 5:
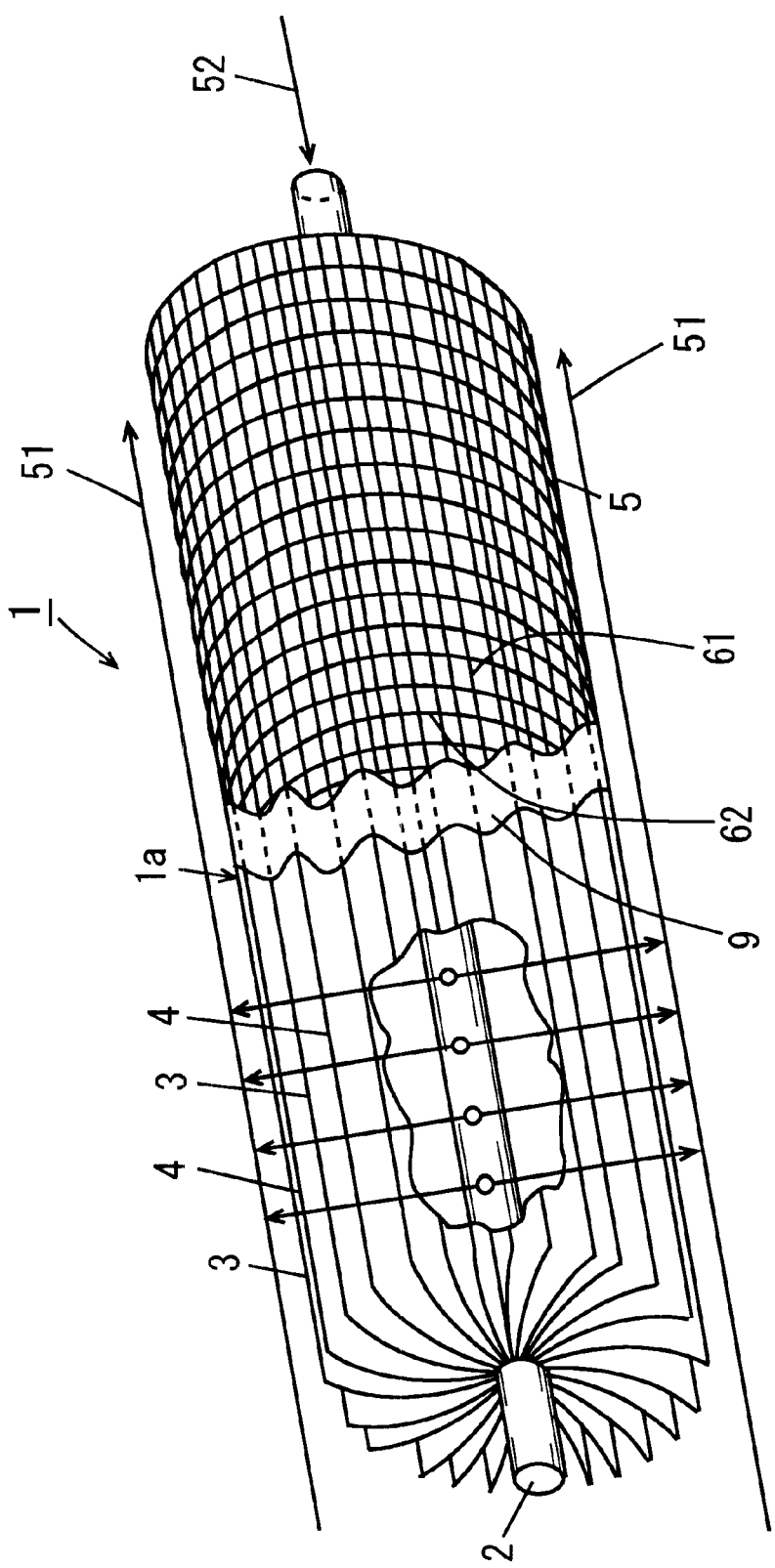
FIG. 5 is a partially fragmented perspective view showing back wash reverse filtration in the spiral wound type membrane element of FIG. 1.

After filtration is performed for a certain period, back wash reverse filtration is performed from the permeation side with the permeate 52. FIG. 5 is a partially fragmented perspective view showing back wash reverse filtration in the spiral wound type membrane element 1 shown in FIG. 1. In back wash reverse filtration, the valves 18a and 18c of the pipes 19 and 17 are closed and the valve 18b of the pipe 20 is opened for introducing the permeate 52 into the water collection pipe 2 from the permeate outlet 14 shown in FIG. 4. At this time, the permeate 52 permeates through the envelope-like membranes 3 from the water collection pipe 2, separates contaminants from the membrane surface and flows toward at least the outer peripheral portion along the raw water spacers 4. In this back wash reverse filtration, the permeate 52 readily separates contaminants captured on at least the outer peripheral portion of the spiral wound type membrane element 1. Thereafter flushing is performed with the raw water 51. The valve 18a of the pipe 19 is opened and the valve 18b of the pipe 20 is closed for opening the valve 18c of the pipe 18 while supplying the raw water 51 from the raw water inlet 13 through the pipe 19. Thus, the raw water 51 axially flows linearly along the outer peripheral passage forming member 5 for discharging the separated contaminants from the system through the raw water outlet 15 and the pipe 17 shown in FIG. 4 while separating contaminants remaining on the outer peripheral portion of the spiral wound type membrane element 1. Consequently, the membrane flux is remarkably recovered as compared with that before the back wash reverse filtration. The raw water 54 containing the contaminants discharged from the system by flushing may be returned to a raw water tank storing the raw water 51.

According to the aforementioned washing method, the contaminants adhering to the outer peripheral portion of the spiral wound type membrane element 1, particularly those adhering to the separation membrane 9 can be readily and reliably discharged from the system, whereby increase of the resistance of the separation membrane 9 can be suppressed. Thus, a stable permeate flow rate can be regularly maintained. Further, handleability is improved since the outer peripheral portion of the spiral wound type membrane element 1 is covered with the outer peripheral passage forming member 5.

Figure 21:
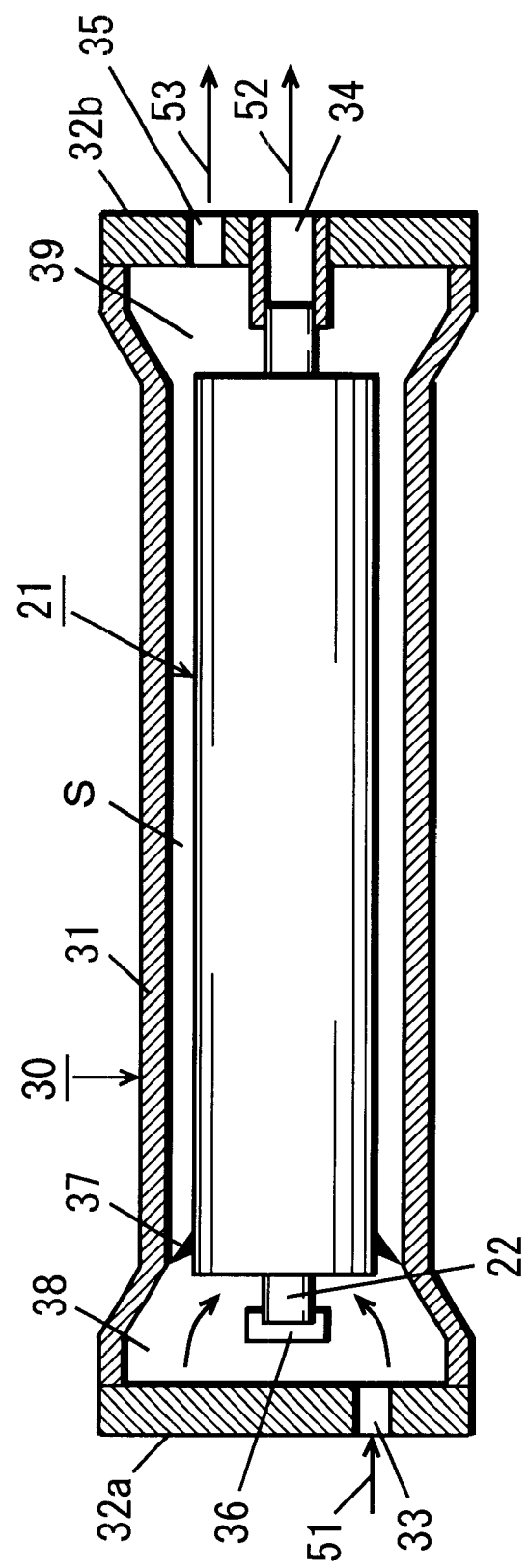
FIG. 21 is a sectional view showing an exemplary method of running the conventional spiral wound type membrane element.
Figure 22:
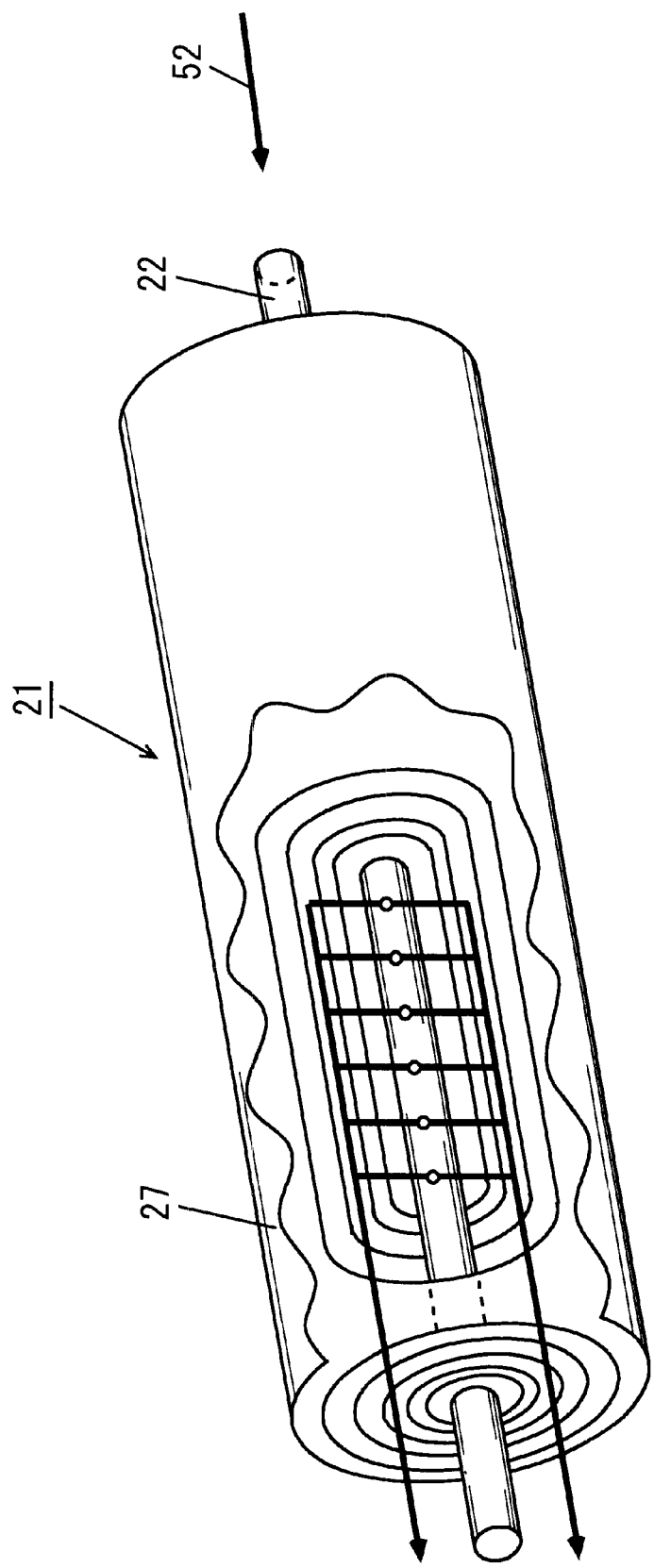
FIG. 22 is a partially fragmented perspective view showing back wash reverse filtration in the conventional spiral wound type membrane element.

In the spiral wound type membrane module, further, no dead space such as the dead space S shown in FIG. 21 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to use a large pump for supplying the raw water 51 due to dead end filtration. Thus, the system cost is reduced.

While the permeate 52 is first introduced into the water collection pipe 2 for separating the contaminants captured on the membrane surface and the outer peripheral portion of the spiral wound type membrane element 1 with the permeate 52 derived from the outer peripheral surface of the water collection pipe 2 and then performing flushing with the raw water 51 in the aforementioned back wash reverse filtration, flushing may alternatively be performed first for thereafter introducing the permeate 52 into the water collection pipe 2. In this case, most of the contaminants captured on the outer peripheral portion of the spiral wound type membrane element 1 are removed by flushing and those remaining on the membrane surface and the outer peripheral portion of the spiral wound type membrane element 1 can be removed by introducing the permeate 52. Also in this case, therefore, effects similar to those in the aforementioned back wash reverse filtration can be attained.

Alternatively, flushing may be regularly or periodically performed with the raw water 51 in parallel with introduction of the permeate 52 into the water collection pipe 2 in the aforementioned back wash reverse filtration. Also in this case, effects similar to those in the aforementioned washing method can be attained.

In this example, the supplied raw water 51 may contain sodium hypochlorite. When supplying the raw water 51 containing sodium hypochlorite having a function of separating contaminants and a bactericidal action to the spiral wound type membrane element 1, it is possible to separate contaminants adhering to the outer peripheral portion of the spiral wound type membrane element 1 for suppressing sedimentation of the contaminants and to suppress propagation of microorganisms on the membrane surface. Thus, the spiral wound type membrane element 1 can attain further stable performance over a long period.

The raw water 51 may contain ozone, hydrogen peroxide, chloramine or peracetic acid in place of sodium hypochlorite. Such a chemical having a bactericidal action can suppress propagation of microorganisms on the membrane surface of the spiral wound type membrane element 1 similarly to the case of containing sodium hypochlorite.

The chemical is injected into the raw water 51 before the raw water 51 is supplied to the spiral wound type membrane module, for example.

The chemical may be continuously and regularly or intermittently injected into the raw water 51. When the chemical is intermittently injected, injection of the chemical is controlled with a timer, for example. Alternatively, the contaminated state of the spiral wound type membrane element 1 may be examined from the operating pressure or the permeate flow rate for injecting the chemical when contaminants sediment in the spiral wound type membrane element 1, i.e., when increase of the operating pressure or reduction of the permeate flow rate is observed. In this case, a measurer such as an operating pressure gauge, a permeate flow rate meter or a transmembrane pressure difference meter is set in an apparatus into which the spiral wound type membrane module is assembled, for injecting the chemical in accordance with a signal from the measurer.

Further, a flocculant may be injected into the raw water 51 in addition to the aforementioned chemical having the function of separating contaminants and the bactericidal action. In this case, the flocculant flocculates the contaminants contained in the raw water 51 so that the contaminants are readily captured on the outer peripheral portion of the spiral wound type membrane element 1.

In this example, the permeate 52 containing a chemical having a function of separating contaminants or a bactericidal action may be employed as wash water. For example, the permeate 52 containing sodium hypochlorite of 10 to 10000 ppm in concentration, chloramine of 0.1 to 10 ppm in concentration, hydrogen peroxide of 10 to 10000 ppm in concentration, sulfuric acid of pH 1 to 3, hydrochloric acid of pH 1 to 3, sodium hydroxide of pH 10 to 13, peracetic acid of 10 to 10000 ppm in concentration, isopropyl alcohol of 0.1 to 50% in concentration, citric acid of 0.2 to 2% in concentration or oxalic acid of 0.2 to 2% in concentration is employed as the wash water. When employing wash water containing such a chemical, contaminants adhering to the membrane surface and the outer peripheral portion of the spiral wound type membrane element 1 can be effectively removed and propagation of microorganisms can be suppressed on the membrane surface.

Particularly when turbid raw water 51 containing a large quantity of contaminants is subjected to dead end filtration, turbid components (contaminants) contained in the raw water 51 are captured and sediment on the outer peripheral surface of the spiral wound type membrane element 1 in large quantities. Further, contaminants not captured on the outer peripheral surface sediment on the separation membranes 7. Therefore, it is difficult to completely remove the contaminants by back wash reverse filtration employing only the permeate 52 as the wash water. In this case, it is possible to readily separate the sedimenting contaminants and effectively wash the spiral wound type membrane element 1 by employing the permeate 52 into which the aforementioned chemical is injected.

The chemical may be continuously injected into the permeate 52, or the former may be injected into the latter after performing back wash reverse filtration with the permeate 52 several times.

In the back wash reverse filtration with the wash water containing the aforementioned chemical, the spiral wound type membrane element 1 may be dipped in the wash water for several 10 minutes to several hours after introducing the wash water from an end of the water collection pipe 2. Thus, contaminants sedimenting on the membrane surface and the outer peripheral portion of the spiral wound type membrane element 1 are further readily separated so that the spiral wound type membrane element 1 is more effectively washed. Further, propagation of microorganisms on the membrane surface and the outer peripheral portion can be more effectively suppressed. It is possible to discharge the contaminants adhering to the membrane surface and the outer peripheral portion from the spiral wound type membrane module by further performing back wash reverse filtration on the spiral wound type membrane element 1 dipped in the wash water containing the chemical.

The spiral wound type membrane element 1 is washed by such dipping once to several times a day, or in response to change of running conditions for the spiral wound type membrane module such as increase of the operation pressure, reduction of the permeate flow rate or the like.

FIGS. 6(a) and 6(b) are front elevational views showing spiral wound type membrane elements 1 according to another embodiment of this invention. Referring to FIGS. 6(a) and 6(b), peripheral passage forming members are not shown.

In the spiral wound type membrane element 1 shown in FIG. 6(a), both ends of a spiral membrane component 1a are sealed with resin layers 40. In the spiral wound type membrane element 1 shown in FIG. 6(b), an end of a spiral membrane component 1a is sealed with a resin layer 40.

Each of the spiral wound type membrane elements 1 shown in FIGS. 6(a) and 6(b) requires no space for supplying raw water to both ends or one end of the spiral wound type membrane element 1, although the number of working steps in manufacturing is increased. Therefore, a pressure vessel can be miniaturized, thereby miniaturizing a spiral wound type membrane module formed by storing the spiral wound type membrane element 1 in the pressure vessel.

Further, it is possible to prevent the end surface of the spiral wound type membrane element 1 from contamination resulting from dynamic pressure of raw water when the raw water is introduced by arranging the end of the spiral wound type membrane element 1 sealed with the resin layer 40 on the side of a raw water inlet of the pressure vessel.

Figure 7:
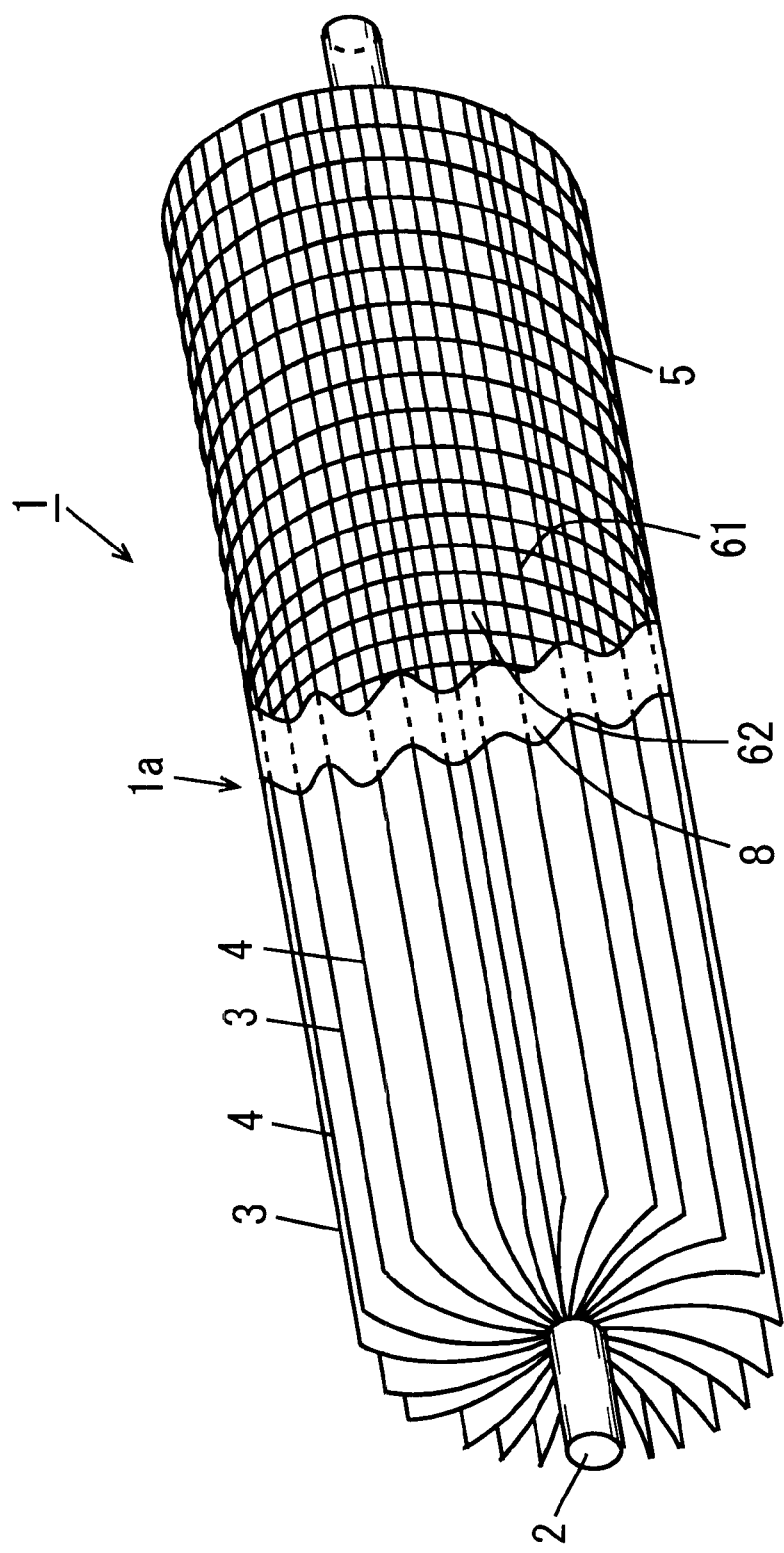
FIG. 7 is a partially fragmented perspective view showing a spiral wound type membrane element according to still another embodiment of the present invention.
Figure 8:
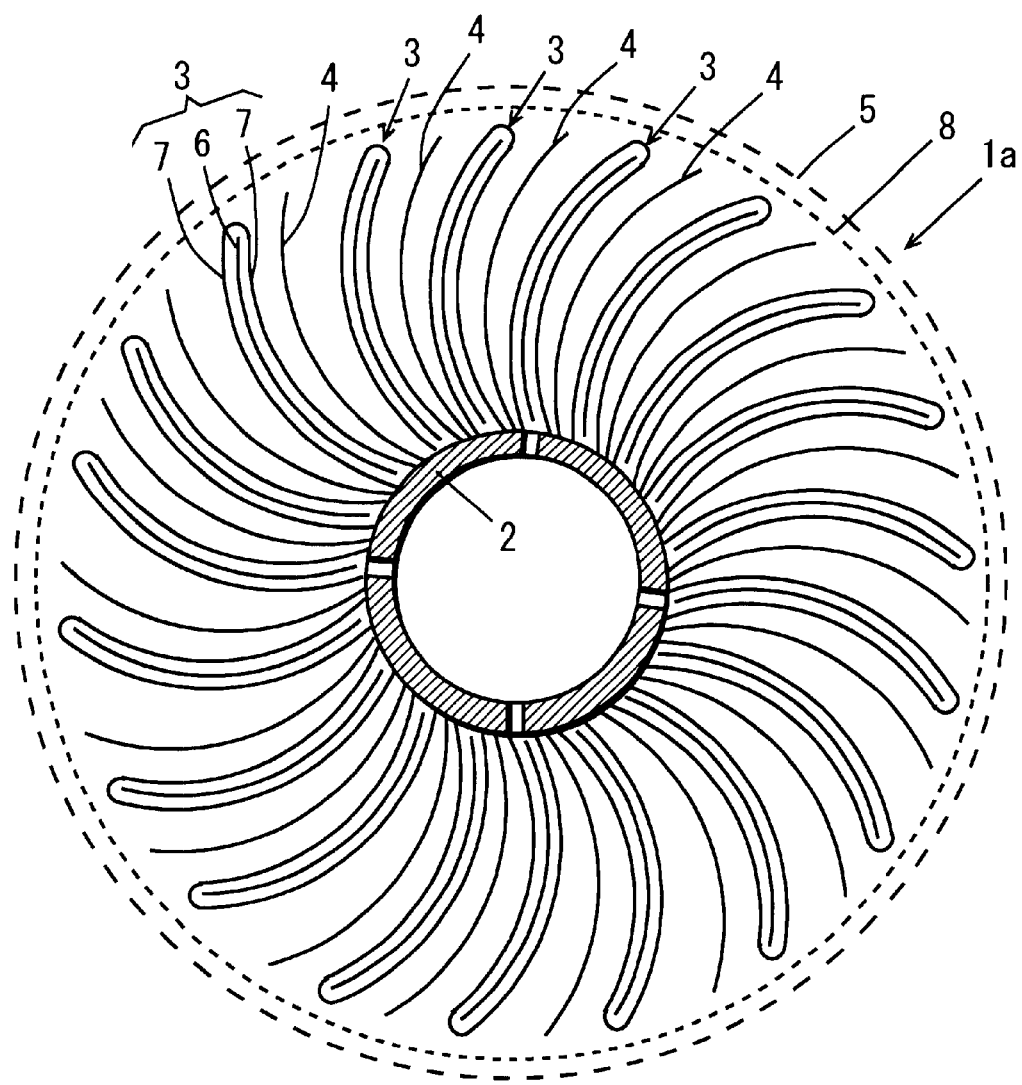
FIG. 8 is a cross-sectional view showing exemplary envelope-like membranes of the spiral wound type membrane element shown in FIG. 6(a) or 6(b)
Figure 10:
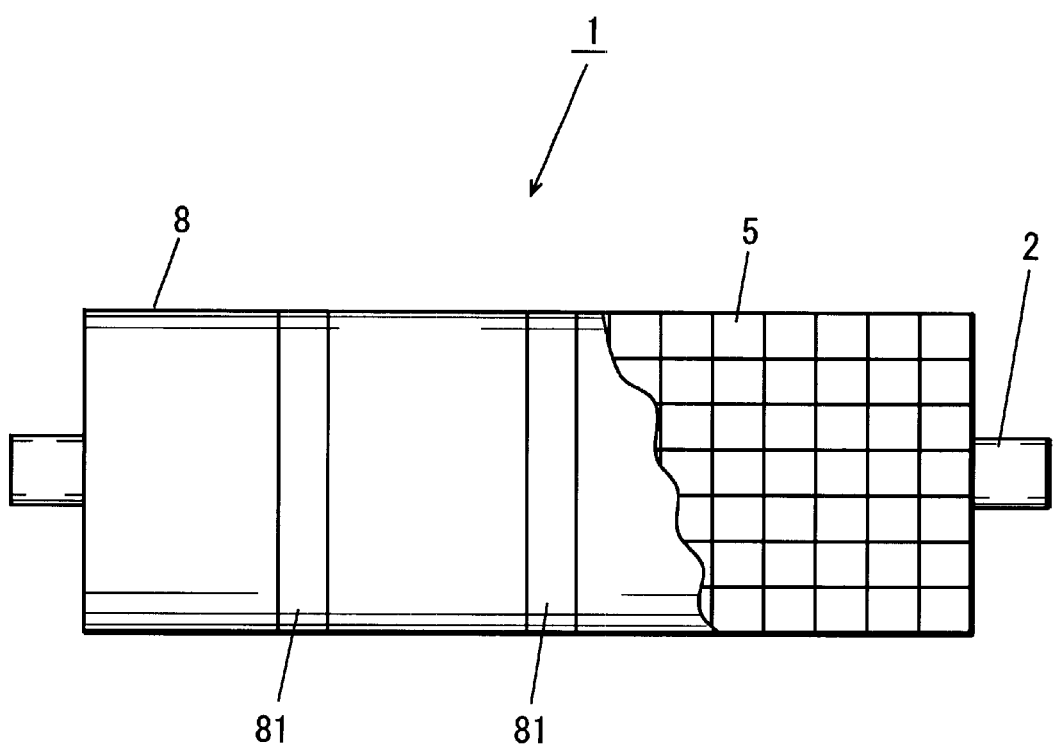
FIG. 10 is a partially fragmented front elevational view of the spiral wound type membrane element shown in FIG. 6(a) or 6(b)

FIG. 7 is a partially fragmented perspective view showing a spiral wound type membrane element 1 according to still another embodiment of this invention. FIG. 8 is a cross-sectional view showing exemplary envelope-like membranes of the spiral wound type membrane element 1 shown in FIG. 7, and FIG. 9 is a cross-sectional view showing other exemplary envelope-like membranes of the spiral wound type membrane element 1 shown in FIG. 7. FIG. 10 is a partially fragmented front elevational view of the spiral wound type membrane element 1 shown in FIG. 7.

The spiral wound type membrane element 1 shown in FIG. 7 includes a spiral membrane component 1a formed by winding a plurality of independent envelope-like membranes 3 or a plurality of continuous envelope-like membranes 3 around the outer peripheral surface of a water collection pipe 2 formed by a perforated hollow pipe. Raw water spacers (raw liquid passage forming members) 4 are inserted between the envelope-like membranes 3 for preventing the envelope-like membranes 3 from coming into close contact with each other and reducing the membrane area and for forming a passage for raw water.

As shown in each of FIGS. 8 and 9, each envelope-like membrane 3 is formed by superposing two separation membranes 7 on both surfaces of a permeate spacer (permeate passage forming member 6) and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm$^2$, ultrafiltration membranes or microfiltration membranes.

Referring to FIG. 8, the plurality of envelope-like membranes 3 are formed by independent separation membranes 7 respectively. Referring to FIG. 9, the plurality of envelope-like membranes 3 are formed by folding a continuous separation membrane 7.

The outer peripheral surface of the spiral membrane component 1a is covered with a net 8 made of a liquid-permeable material. The material for the net 8 can be prepared from synthetic resin such as polyolefine, polysulfone, polypropylene, polyester, polyethylene, polystyrene, polyacrylonitrile or polyamide, or metal such as stainless steel or iron.

The net 8 preferably has at least three meshes and not more than 200 meshes. Thus, the spiral membrane component 1a can be reliably inhibited from swelling resulting from back pressure in back wash reverse filtration, and raw water can be sufficiently supplied into the spiral membrane component 1a from the outer peripheral side in filtration running.

In the spiral wound type membrane element 1 shown in FIG. 7, the material for the net 8 is prepared by impregnating tricot cloth with epoxy resin. This net 8 has 50 meshes, pitches of the warps and the wefts are 0.5 mm, and the diameters of the warps and the wefts are 0.15 mm.

The end surfaces of the spiral membrane component 1a may also be covered with the net 8, in addition to the outer peripheral surface.

As shown in FIG. 10, resin 81 is circumferentially applied to three portions of the net 8 covering the outer peripheral surface of the spiral membrane component 1a at regular intervals, thereby fixing the net 8 to the outer peripheral surface of the spiral membrane component 1a on the three portions. While the number of the portions for applying the resin 81 dependent on the back pressure caused in back wash reverse filtration is not particularly restricted, contaminants are hardly removed from the outer peripheral portion of the spiral membrane component 1a in back wash reverse filtration if the resin 81 is applied to four or more portions. Therefore, if the length of the spiral membrane component 1a is 944 cm, for example, it is preferable to fix the net 8 with the resin 81 on about three portions.

The outer peripheral surface of the net 8 is covered with an outer peripheral passage forming member 5. The material for and the size of the outer peripheral passage forming member 5 are similar to those of the outer peripheral passage forming member 5 shown in FIG. 1.

The net 8 covering the outer peripheral portion may be entirely or partially covered with the outer peripheral passage forming member 5.

A spiral wound type membrane module having the spiral wound type membrane element 1 shown in FIG. 7 is run by the method of running a spiral wound type membrane module shown in FIG. 4, similarly to the spiral wound type membrane module having the spiral wound type membrane element 1 shown in FIG. 1. In filtration running of the spiral wound type membrane element 1, the valve 18a of the pipe 19 is opened and the valves 18b and 18c of the pipes 20 and 19 are closed. The raw water 51 is introduced into the pressure vessel 10 from the raw water inlet 13 of the pressure vessel 10 through the pipe 19. The raw water 51 flows along the outer peripheral passage forming member 5, and infiltrates into the clearances between the envelope-like membranes 3 from the sides of the outer peripheral portion and both ends of the spiral wound type membrane element 1. Permeate permeating through the separation membranes 7 flows into the water collection pipe 2 along the permeate spacer 6. Thus, the permeate 52 is taken out from the permeate outlet 14 of the pressure vessel 10. Dead end filtration is performed in such a manner.

In this case, the outer peripheral surface of the spiral membrane component 1a is covered with the net 8, whereby contaminants such as turbid substances larger than the pore size of the net 8 are captured on at least the outer peripheral portion of the spiral wound type membrane element 1. In other words, only contaminants smaller than the pore size of the net 8 infiltrate into the clearances between the envelope-like membranes 3. Thus, loads on the separation membranes 7 forming the envelope-like membranes 3 are reduced.

Partial raw water 54 may be taken out from the raw water outlet 15 by opening the valve 18c of the pipe 17. In this case, a flow of raw water can be formed on the outer peripheral portion of the spiral wound type membrane element 1. Thus, part of contaminants can be discharged from the pressure vessel 10 while suppressing sedimentation of contaminants contained in the raw water.

After performing filtration for a constant time, the back wash reverse filtration shown in FIG. 5 is performed. In the back wash reverse filtration, the valves 18a and 18c of the pipes 19 and 17 are closed and the valve 18b of the pipe 20 is opened for introducing the permeate 52 into the water collection pipe 2 from the permeate outlet 14 shown in FIG. 4. In this back wash reverse filtration, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of the spiral wound type membrane element 1. Thereafter flushing is performed with the raw water 51. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water 51 axially flows linearly along the outer peripheral passage forming member 5 so that the separated contaminants are discharged from the system through the raw water outlet 15 and the pipe 17 shown in FIG. 4 and contaminants remaining on the outer peripheral portion of the spiral wound type membrane element 1 are separated from the spiral wound type membrane element 1. Consequently, the membrane flux is remarkably recovered as compared with that before the back wash reverse filtration. The raw water 54 containing the contaminants discharged from the system by the flushing may be returned to the raw liquid tank storing the raw water 51.

According to the aforementioned washing method, contaminants adhering to the outer peripheral portion of the spiral wound type membrane element 1, particularly to the net 8 can be readily and reliably discharged from the system along the outer peripheral passage forming member 5, whereby increase of the resistance of the net 8 can be suppressed. Thus, a stable permeate flow rate can be regularly maintained. Further, handleability is improved since the outer peripheral portion of the spiral wound type membrane element 1 is covered with the outer peripheral passage forming member 5.

In the spiral wound type membrane element 1 shown in FIG. 7, the outer peripheral surface of the spiral membrane component 1a is covered with the net 8, whereby the spiral membrane component 1a is prevented from swelling by the net 8 covering the outer peripheral portion so that the clearances between the envelope-like membranes 3 are not enlarged even if the back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

In addition, no dead space is defined in the clearance between the spiral wound type membrane element 1 and the pressure vessel 10, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

While the permeate 52 is first introduced into the water collection pipe 2 for separating contaminants captured on the outer peripheral portion of the spiral wound type membrane element 1 with the permeate 52 derived from the outer peripheral surface of the water collection pipe 2 for thereafter performing flushing with the raw water 51 in the aforementioned back wash reverse filtration, flushing may be first performed with the raw water 51 for thereafter introducing the permeate 52 into the water collection pipe 2. According to this method, most of the contaminants captured on the membrane surface and the outer peripheral portion of the spiral wound type membrane element 1 are removed by the flushing and contaminants remaining on the membrane surface and the outer peripheral portion of the spiral wound type membrane element 1 can be removed by further introducing the permeate 52. Also in this case, therefore, effects similar to those of the aforementioned back wash reverse filtration can be attained.

Figure 12:
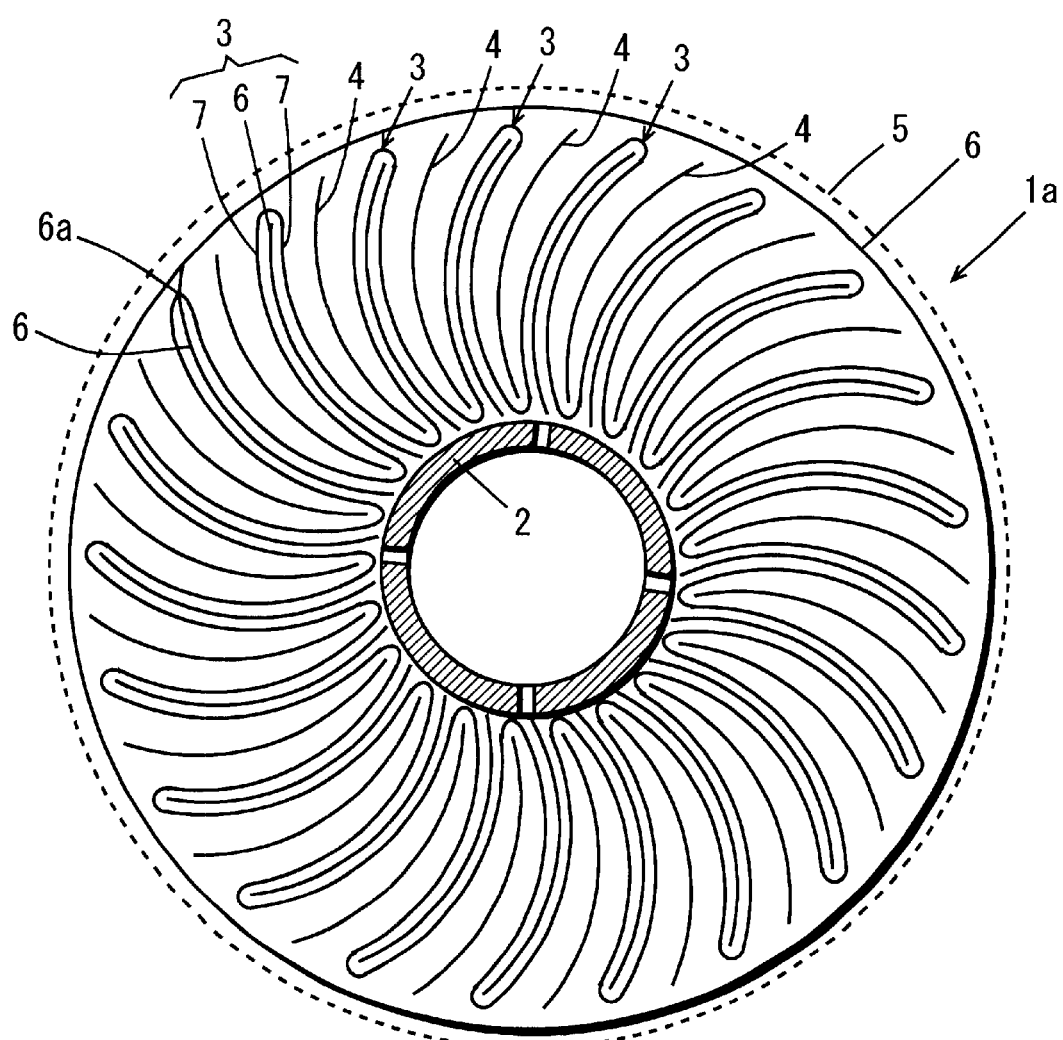
FIG. 12 is a cross-sectional view showing a permeate spacer employed as a net.

The method of running a spiral wound type membrane element according to this invention may also be applied to a spiral wound type membrane element 1 employing part of a permeate spacer 6 as a net 8 as shown in FIG. 12. In such a spiral wound type membrane element 1, the permeate spacer 6 inserted in one envelope-like membrane 3 is extended to project outward from a side portion of the envelope-like membrane 3 closer to the outer peripheral portion and the extended part of the permeate spacer 6 is wound around the outer peripheral surface of a spiral membrane component 1a as the net 8. The clearance between the permeate spacer 6 projecting outward from the side portion of the envelope-like membrane 3 closer to the outer peripheral portion and the envelope-like membrane 3 is sealed with resin 6a.

In this case, the extended permeate spacer 6 can prevent the spiral membrane component 1a from swelling resulting from back pressure in back wash reverse filtration while suppressing an additional component cost for the net 8.

Also in running of the spiral wound type membrane element 1 shown in each of FIGS. 6(a), 6(b) and 7, the supplied raw water 51 may contain a chemical such as sodium hypochlorite having a function of separating contaminants or a bactericidal action or a flocculant, similarly to that in running of the spiral wound type membrane element 1 shown in FIG. 1. Further, the permeate 52 employed as wash water in back wash reverse filtration may contain a chemical such as sodium hypochlorite having a function of separating contaminants or a bactericidal action.

While the above description has been made with reference to the spiral wound type membrane module formed by charging the pressure vessel 10 with the single spiral wound type membrane element 1 as shown in FIG. 4, the method of running a spiral wound type membrane element and a spiral wound type membrane module according to this invention is also applicable to a spiral wound type membrane module formed by charging a pressure vessel with a plurality of spiral wound type membrane elements.

Figure 13:
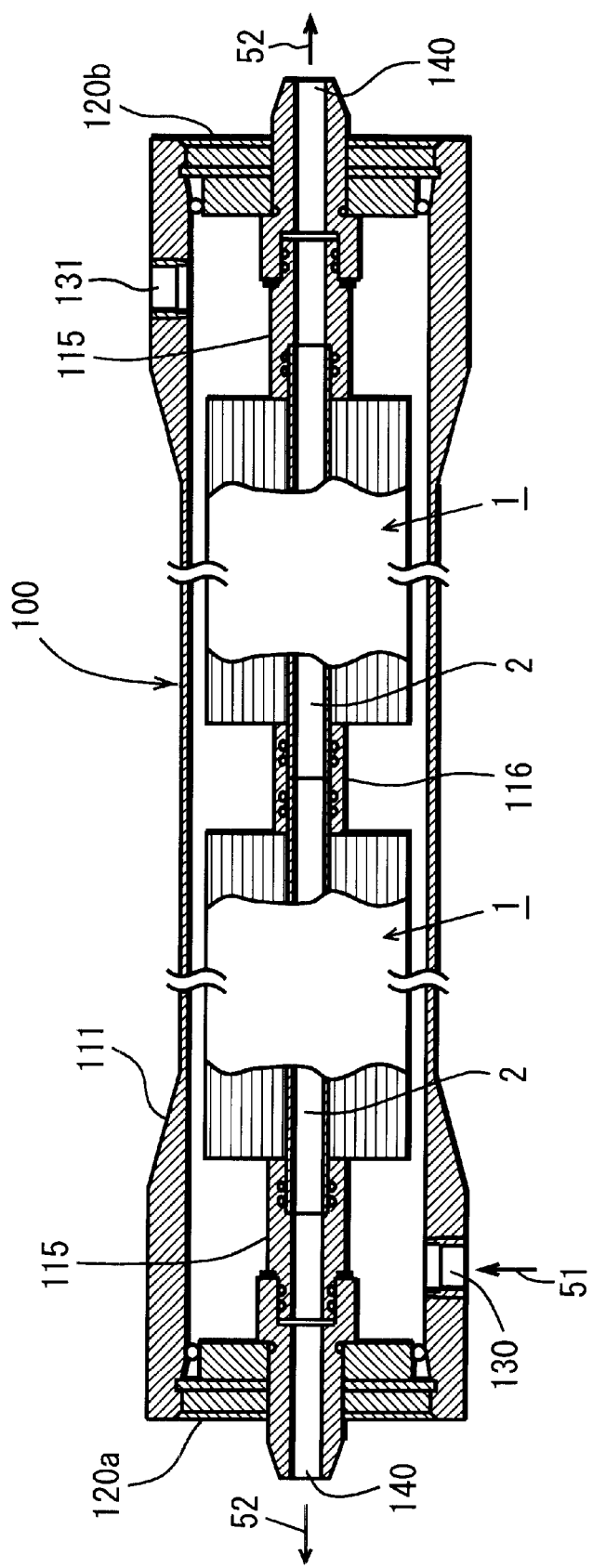
FIG. 13 is a typical sectional view showing another exemplary method of running a spiral wound type membrane element and a spiral wound type membrane module according to the present invention.

FIG. 13 is a typical sectional view showing another exemplary method of running a spiral wound type membrane element and a spiral wound type membrane module according to this invention.

As shown in FIG. 13, a pressure vessel 100 is formed by a tubular case 111 and a pair of end plates 120a and 120b. A raw water inlet 130 is formed on the bottom portion of the tubular case 111, and a raw water outlet 131 is formed on the upper portion. The raw water outlet 131 is employed also for deairing. Permeate outlets 140 are provided on the central portions of the end plates 120a and 120b.

The tubular case 111 stores a plurality of spiral wound type membrane elements 1 having water collection pipes 2 serially coupled with each other by an interconnector 116, and both opening ends of the tubular case 111 are sealed with the end plates 120a and 120b respectively. Single end portions of the water collection pipes 2 of the spiral wound type membrane elements 1 located on both end portions are engaged with the permeate outlets 140 of the end plates 120a and 120b through adapters 115 respectively. Thus, a spiral wound type membrane module is formed by charging the pressure vessel 100 with the plurality of spiral wound type membrane elements 1. Each spiral wound type membrane element 1 can be prepared from that shown in FIG. 1, 6(a), 6(b), 7 or 12. In this example, the spiral wound type membrane element 1 shown in FIG. 1 is employed.

In filtration running of the spiral wound type membrane module, the raw water outlet 131 is closed for introducing raw water 51 into the pressure vessel 100 from the raw water inlet 130 of the pressure vessel 100. The raw water 51 flows along an outer peripheral passage forming member 5 of each spiral wound type membrane element 1. In each spiral wound type membrane element 1, the raw water 51 permeates through a separation membrane 9 from at least the outer peripheral side and infiltrates into clearances between envelope-like membranes 3 along raw water spacers 4. Permeate permeating through separation membranes 7 flows into the water collection pipe 2 along a permeate spacer 6, so that permeate 52 is taken out from the permeate outlets 14 provided on both ends of the pressure vessel 100. Thus, dead end filtration is performed. Also in this case, partial raw water may be taken out by opening the raw water outlet 131, similarly to the method of running a spiral wound type membrane element and a spiral wound type membrane module shown in FIG. 4.

After performing filtration for a constant time, back wash reverse filtration is performed from the permeation side with the permeate 52. In the back wash reverse filtration, the permeate 52 is introduced into the water collection pipe 2 of each spiral wound type membrane element 1 from the permeate outlets 140 provided on both ends of the pressure vessel 100. In each spiral wound type membrane element 1, the permeate 52 permeates through the envelope-like membranes 3 from the water collection pipe 2, separates contaminants from the membrane surface and flows toward at least the outer peripheral portion along the raw water spacers 4. The permeate 52 readily separates contaminants captured on at least the outer peripheral portion of each spiral wound type membrane element 1. Thereafter the raw water outlet 131 is opened and the raw water 51 is supplied from the raw water inlet 130 for performing flushing. Thus, the separated contaminants are discharged from the spiral wound type membrane module with the raw water 51. Also in this case, flushing may be performed before or in parallel with back wash reverse filtration, similarly to the method of running a spiral wound type membrane element and a spiral wound type membrane module shown in FIG. 4.

According to the aforementioned method of running a spiral wound type membrane element and a spiral wound type membrane module, the raw water 51 is supplied from at least the outer peripheral side of each spiral wound type membrane element 1 in filtration running for performing dead end filtration in each spiral wound type membrane element 1, similarly to the method of running a spiral wound type membrane element and a spiral wound type membrane module shown in FIG. 4. In this case, contaminants are captured on at least the outer peripheral portion in each spiral wound type membrane element 1. Therefore, loads on the separation membranes 7 forming the envelope-like membranes 3 are reduced.

Further, contaminants adhering to the separation membranes 7 and the outer peripheral portion of each spiral wound type membrane element 1 can be readily discharged from the system along the outer peripheral passage forming member 5 in back wash reverse filtration, whereby a stable permeate flow rate can be maintained. In addition, the spiral wound type membrane module is charged with the plurality of spiral wound type membrane elements 1, whereby the spiral wound type membrane module has a large capacity of treatment and the permeate 52 can be efficiently obtained.

No dead space is defined in the clearance between each spiral wound type membrane element 1 and the pressure vessel 100 due to the aforementioned filtration mode, whereby high reliability is attained with no problems such as propagation of germs such as microorganisms, occurrence of a bad smell resulting from decomposition of organic matter and decomposition of the separation membranes 7.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

Also in this example, the supplied raw water 51 may contain a chemical such as sodium hypochlorite having a function of separating contaminants or a bactericidal action, similarly to the method of running a spiral wound type membrane element and a spiral wound type membrane module shown in FIG. 4. In this case, it is possible to separate contaminants adhering to the outer peripheral portion of each spiral wound type membrane element 1, suppress sedimentation of the contaminants, and to suppress propagation of microorganisms on the membrane surface. Thus, the spiral wound type membrane module attains further stable performance over a long period.

The permeate 52 containing a chemical such as sodium hypochlorite having a function of separating contaminants or a bactericidal action may be employed as wash water. In this case, it is possible to effectively remove contaminants adhering to the membrane surface and the outer peripheral portion of each spiral wound type membrane element 1 and suppress propagation of microorganisms on the membrane surface. Thus, the spiral wound type membrane module attains further stable performance over a long period.

INVENTION EXAMPLES

INVENTIVE EXAMPLE 1

In Inventive Example 1, the spiral wound type membrane element 1 (RS30-S4 by Nitto Denko Corporation) shown in FIG. 7 was run.

The raw water 51 was prepared from industrial water (pH 6 to 8 under water temperature of 10 to 30° C.). The supply pressure was adjusted to obtain a permeate flow rate of 5 L/min., and filtration was performed for 30 minutes by the running method shown in FIG. 4. Thereafter the back wash reverse filtration shown in FIG. 5 was performed. In Inventive Example 1, the permeate 52 was introduced into the water collection pipe 2 and thereafter flushing was performed with the raw water 51 for 15 seconds. In this case, the time for the back wash reverse filtration was set to 30 seconds, and the flow rate of the permeate 52 employed for the back wash reverse filtration was set to 5 L/min.

The spiral wound type membrane element 1 was continuously run for 40 days while repeating the aforementioned filtration and back wash reverse filtration.

In Inventive Example 1, the transmembrane pressure difference of the spiral wound type membrane element 1 measured after a lapse of 40 days from start of running was 0.8 kgf/cm$^2$.

INVENTIVE EXAMPLE 2

In Inventive Example 2, a spiral wound type membrane element 1 was subjected to filtration and back wash reverse filtration by a running method similar to that in Inventive Example 1, except that industrial water (pH 6 to 8 under water temperature of 10 to 13° C.) containing sodium hypochlorite of 1 ppm in concentration was employed as raw water. In Inventive Example 2, sodium hypochlorite was continuously injected into the industrial water.

The transmembrane pressure difference of the spiral wound type membrane element 1 measured after a lapse of 40 days from start of running was 0.5 kgf/cm$^2$.

INVENTIVE EXAMPLE 3

A spiral wound type membrane element 1 was run by a running method similar to that in Inventive Example 1, except that permeate 52 containing sodium hypochlorite of 5 ppm in concentration was employed as wash water. In Inventive Example 3, sodium hypochlorite was continuously injected into the permeate 52.

The transmembrane pressure difference of the spiral wound type membrane element 1 measured after a lapse of 40 days from start of running was 0.7 kgf/cm$^2$.

INVENTIVE EXAMPLE 4

A spiral wound type membrane element 1 was subjected to filtration and back wash reverse filtration by a running method similar to that in Inventive Example 2, except that permeate containing sodium hypochlorite of 10 ppm in concentration was introduced from a water collection pipe 2 as wash water and thereafter the spiral wound type membrane element 1 was dipped in the wash water for one hour. In Inventive Example 4, the aforementioned dipping was performed once in five days.

The transmembrane pressure difference of the spiral wound type membrane element 1 measured after a lapse of 40 days from start of running was 0.3 kgf/cm$^2$.

INVENTIVE EXAMPLE 5

In Inventive Example 5, a spiral wound type membrane element 1 was subjected to filtration and back wash reverse filtration by a running method similar to that in Inventive Example 1, except that industrial water (pH 6 to 8 under water temperature of 10 to 13° C.) containing ozone of 10 ppm in concentration was employed as raw water. In Inventive Example 5, ozone was continuously injected into the industrial water.

The transmembrane pressure difference of the spiral wound type membrane element 1 measured after a lapse of 40 days from start of running was 0.7 kgf/cm$^2$.

COMPARATIVE EXAMPLE

In comparative example, the spiral wound type membrane element 1 (RS30-S4 by Nitto Denko Corporation) shown in FIG. 7 was run similarly to Inventive Example 1.

The raw water 51 was prepared from industrial water (pH 6 to 8 under water temperature of 10 to 30° C.), similarly to Inventive Example 1. The supply pressure was adjusted to obtain a permeate flow rate of 5 L/min., and filtration was performed for 30 minutes by the running method shown in FIG. 4. Thereafter back wash reverse filtration was performed. In comparative example, however, no flushing was performed with the raw water 51 but only back wash reverse filtration was performed with the permeate 52.

Figure 18:
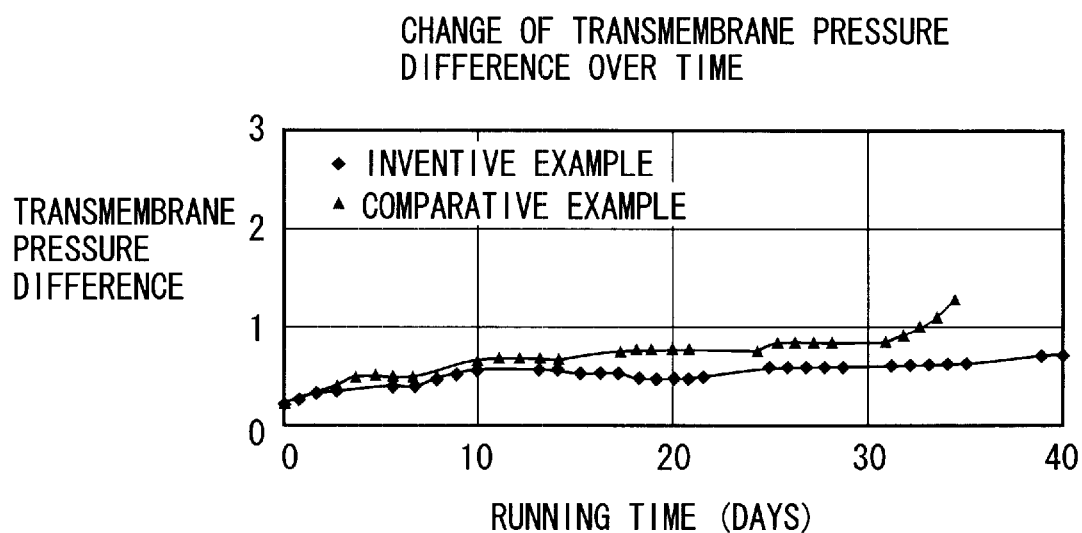
FIG. 18 illustrates changes of transmembrane pressure difference over time in Inventive Example and comparative example.
Figure 19:
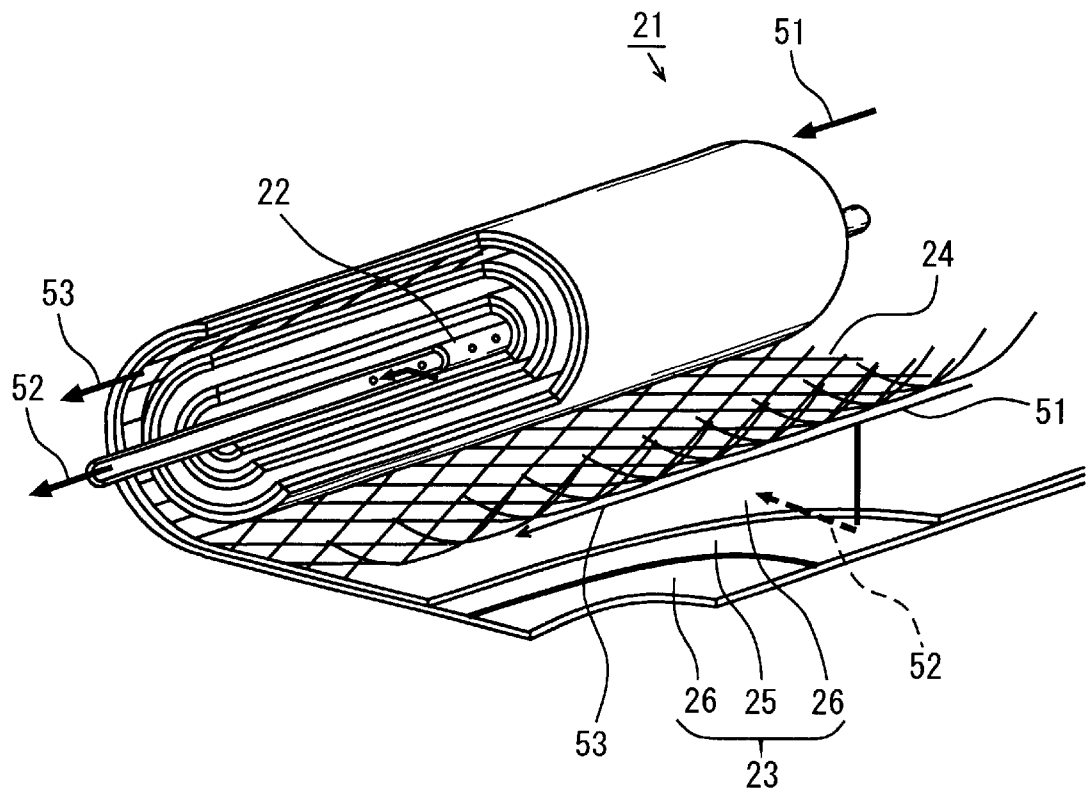
FIG. 19 is a partially fragmented perspective view showing a conventional spiral wound type membrane element.
Figure 20:
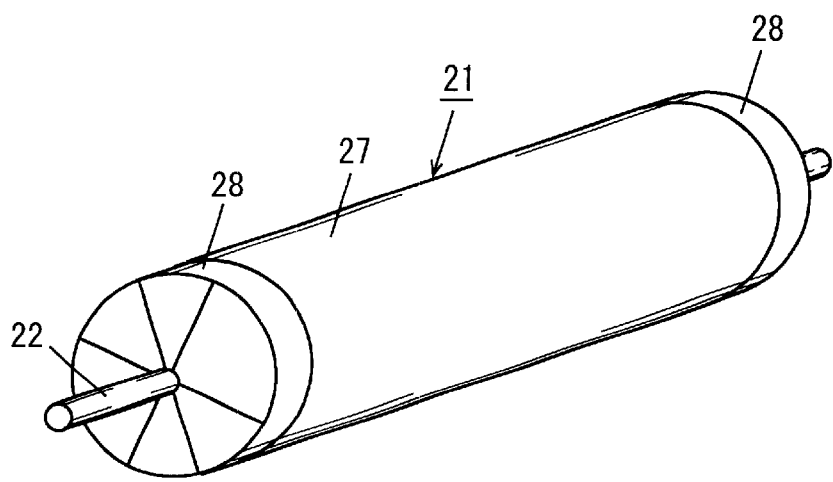
FIG. 20 is a perspective view showing the appearance of the conventional spiral wound type membrane element.

FIG. 18 shows changes of the transmembrane pressure differences of the spiral wound type membrane elements 1 in Inventive Example 1 and comparative example over time. As shown in FIG. 18, contaminants adhering to the net 8 can be reliably removed in Inventive Example 1 since flushing is performed with the raw water 51 while introducing the permeate 52 into the spiral wound type membrane element 1. Thus, the change of the transmembrane pressure difference in the spiral wound type membrane element 1 was small and it was possible to stably run the spiral wound type membrane element 1 continuously over a long period. In comparative example, no flushing is performed with the raw water 51 and hence contaminants adhere to the net 8 to increase the resistance thereof if the spiral wound type membrane element 1 is run over a long period. Thus, the transmembrane pressure difference in the spiral wound type membrane element 1 is increased.

In Inventive Example 2, it is possible to more effectively prevent the envelope-like membranes 3 of the spiral wound type membrane element 1 and the net 8 from sedimentation of contaminants and effectively suppress propagation of microorganisms on the membrane surface by injecting sodium hypochlorite having a function of separating contaminants and a bactericidal action into the raw water 51. Thus, the spiral wound type membrane element 1 can be further stably run over a longer period as compared with Inventive Example 1 employing the raw water 51 into which no sodium hypochlorite is injected.

In Inventive Example 3 employing the wash water into which sodium hypochlorite is injected, it is possible to separate contaminants sedimenting on the envelope-like membranes 3 and the net 8 for performing further effective washing, and to more effectively suppress propagation of microorganisms on the membrane surface. Thus, the spiral wound type membrane element 1 can be further stably run continuously over a longer period as compared with Inventive Example 1 employing only the permeate 52 as the wash water. In Inventive Example 4 dipping the spiral wound type membrane element 1 in the wash water containing sodium hypochlorite, further, it is possible to more effectively separate contaminants, whereby the spiral wound type membrane element 1 can be more stably run continuously over a longer period.

In Inventive Example 5, it is possible to more effectively prevent the envelope-like membranes 3 of the spiral wound type membrane element 1 and the net 8 from sedimentation of contaminants and effectively suppress propagation of microorganisms on the membrane surface by injecting ozone having a function of separating contaminants and a bactericidal action into the raw water 51. Thus, the spiral wound type membrane element 1 can be more stably run continuously over a longer period as compared with Inventive Example 1 employing the raw water 51 into which no ozone is injected.

(2) Second Invention

Figure 14:
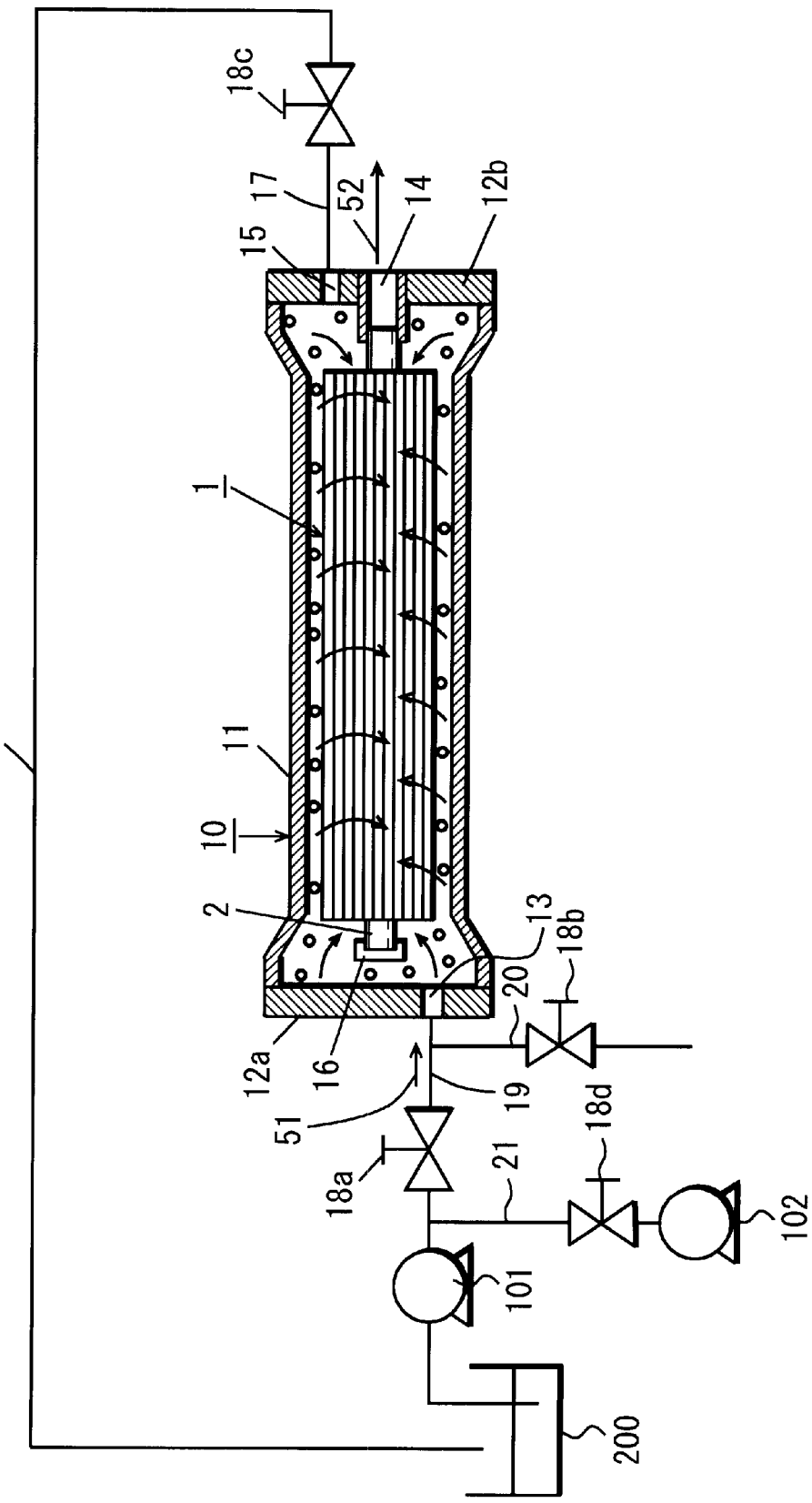
FIG. 14 is a typical sectional view showing still another exemplary method of running a spiral wound type membrane element and a spiral wound type membrane module according to the present invention.

FIG. 14 is a typical sectional view showing an exemplary method of running a spiral wound type membrane element and a spiral wound type membrane module according to the second invention.

The spiral wound type membrane module shown in FIG. 14 is similar in structure to the spiral wound type membrane module of FIG. 4 described with reference to the first invention, and comprises the aforementioned spiral wound type membrane element 1 shown in FIG. 1. In this case, a pipe 19 is connected to the raw water inlet 13 provided on the end plate 12a of the pressure vessel 10 of the spiral wound type membrane module, and pipes 20 and 21 are further connected to the pipe 19, which is further connected to a raw water tank 200. The pipe 19 is connected to a pressure pump 101 through a valve 18a. The pipe 20 is provided with a valve 18b. The pipe 21 is connected to an air diffuser 102 through a valve 18d. In this case, the air diffuser 102 is formed by an air supplier such as a compressor. A pipe 17 as well as a pipe 17a are connected to the raw water outlet 15 of the end plate 12b. The pipe 17 is provided with a valve 18c. The pipe 17a is connected to the raw water tank 200.

As shown in FIG. 14, the valves 18a and 18c of the pipes 19 and 17 are opened and the valve 18b of the pipe 20 is closed in filtration running of the spiral wound type membrane element 1. Raw water 51 collected from the raw water tank 200 is pressurized with the pressure pump 101 and thereafter introduced into the pressure vessel 10 from the raw water inlet 13 of the pressure vessel 10. Then, the valve 18d of the pipe 21 is opened for introducing bubbles (air) diffused by the air diffuser 102 into the pressure vessel 10. Thus, air bubbling is performed in the spiral wound type membrane module.

Part of the raw water 51 supplied into the pressure vessel 10 axially flows along the outer peripheral portion of the spiral wound type membrane element 1, and is discharged from the raw water outlet 15 through the pipe 17. The partial raw water is then returned into the raw water tank 200 through the pipe 17a.

The remaining raw water 51 flows along the outer peripheral passage forming member 5 of the spiral wound type membrane element 1, permeates through the separation membrane 9 from at least the outer peripheral side of the spiral wound type membrane element 1 and infiltrates into the clearances between the envelope-like membranes 3 along the raw water spacers 4. In the example shown in FIG. 14, the raw water 51 infiltrates into the clearances between the envelope-like membranes 3 from the outer peripheral side and both ends of the spiral wound type membrane element 1. The permeate permeating through the separation membrane 7 flows into the water collection pipe 2 along the permeate spacer 6. Thus, the permeate 52 is taken out from the permeate outlet 14 of the pressure vessel 10.

In this case, the outer peripheral surface of the spiral membrane component 1a is covered with the separation membrane 9 as shown in FIG. 1, whereby contaminants such as turbid substances larger than the pore size of the separation membrane 9 are captured on at least the outer peripheral portion of the spiral wound type membrane element 1. In other words, only contaminants smaller than the pore size of the separation membrane 9 infiltrate into the clearances between the envelope-like membranes 3. Therefore, loads on the separation membranes 7 forming the envelope-like membranes 3 are reduced.

In this example, air bubbling is performed in the spiral wound type membrane module while partial raw water is axially fed along the outer peripheral portion of the spiral wound type membrane element 1, whereby a diffused air flow (mixed gas-liquid flow) is formed around the spiral wound type membrane element 1. Thus, it is possible to inhibit contaminants from sedimenting and adhering to the membrane surface and at least the outer peripheral portion of the spiral wound type membrane element 1 and separate contaminants adhering to the membrane surface and at least the outer peripheral portion of the spiral wound type membrane element 1. Further, it is possible to readily and reliably discharge part of contaminants contained in the raw water 51 and the contaminants separated from the membrane surface and at least the outer peripheral portion of the spiral wound type membrane element 1 from the spiral wound type membrane element 1 by axially forming a flow of the raw water. Thus, the spiral wound type membrane module can be stably run continuously over a long period.

Since partial raw water discharged from the raw outer outlet 15 is circulated, the permeate 52 can be obtained from the supplied raw water 51 with recovery of 100% in theory.

The valve 18d of the pipe 21 may be continuously or intermittently opened. Thus, air bubbling can be continuously or intermittently performed in the spiral wound type membrane module.

When intermittently performing air bubbling, switching of the valve 18d may be controlled with a timer. Alternatively, a measurer such as an operating pressure gauge, a transmembrane pressure difference gauge, a permeate flow meter or the like may be set in a membrane separation device into which the spiral wound type membrane module is assembled, for controlling switching of the valve 18d in accordance with a signal from such a measurer.

For example, the permeate flow rate of the spiral wound type membrane element 1 is reduced following adhesion of contaminants to the membrane surface, the outer peripheral portion etc. of the spiral wound type membrane element 1. Therefore, the permeate flow rate is measured with a permeate flow meter for sending a signal when a change is observed on the permeate flow rate and opening the valve 18d. Thus, the contaminants adhering to the membrane surface, the outer peripheral portion etc. of the spiral wound type membrane element 1 can be separated and a stable permeate flow rate can be maintained.

The valve 18c may be switched following switching of the valve 18d, for intermittently forming a flow of the raw water in association with the air bubbling.

After performing filtration for a constant time, back wash reverse filtration is performed with the permeate 52 from the permeation side. In this case, the back wash reverse filtration in the spiral wound type membrane element 1 of FIG. 1 is performed as shown in FIG. 5. In the back wash reverse filtration, the valves 18a, 18c and 18d of the pipes 19, 17 and 21 are closed and the valve 18b of the pipe 20 is opened. In this state, the permeate 52 is introduced into the water collection pipe 2 from the permeate outlet 14 as wash water. The permeate 52 permeates through the envelope-like membranes 3 from the water collection pipe 2, separates contaminants adhering to the membrane surface, the raw water spacers 4 and the like, and flows toward at least the outer peripheral portion along the raw water spacers 4. The permeate 52 readily separates contaminants captured on at least the outer peripheral portion of the spiral wound type membrane element 1. The separated contaminants are discharged with the permeate 52 from the raw water inlet 13 through the pipe 20.

After the aforementioned back wash reverse filtration, flushing is performed with the raw water 51. The valve 18b of the pipe 20 is closed and the valve 18a of the pipe 19 is opened, for opening the valve 18c of the pipe 17 while supplying the raw water 51 from the raw water inlet 13 through the pipe 19. Thus, the raw water 51 axially flows linearly along the outer peripheral passage forming member 5 for discharging the separated contaminants and the permeate from the raw water outlet 15 through the pipe 17. Further, contaminants remaining on the membrane surface, the raw water spacers 4, the outer peripheral portion etc. of the spiral wound type membrane element 1 are separated from the spiral wound type membrane element 1 and discharged. Consequently, the membrane flux is remarkably recovered as compared with that before the back wash reverse filtration. In this case, the raw water discharged by the flushing is returned to the raw water tank 200 through the pipe 17a.

According to the aforementioned washing method, it is possible to readily and reliably discharge the contaminants adhering to the membrane surface, the raw water spacers 4, the outer peripheral portion etc., particularly to the separation membrane 9 of the spiral wound type membrane element 1 along the outer peripheral passage forming member 5 and suppress increase of the resistance of the separation membrane 9. Thus, a stable permeate flow rate can be regularly maintained.

In the aforementioned spiral wound type membrane element 1 shown in FIG. 1, handleability is improved since the outer peripheral portion is covered with the outer peripheral passage forming member 5.

Further, no dead space such as the dead space S shown in FIG. 21 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to form the pressure pump 101 by a large pump for supplying the raw water 51. Thus, the system cost is reduced.

While the permeate 52 is first introduced into the water collection pipe 2 for performing flushing with the raw water 51 after separating the contaminants captured on the outer peripheral portion, the membrane surface, the raw water spacers 4 etc. of the spiral wound type membrane element 1 with the permeate 52 derived from the outer peripheral surface of the water collection pipe 2 in the aforementioned back wash reverse filtration, the permeate 52 may alternatively be introduced into the water collection pipe 2 after performing flushing with the raw water 51. According to this washing method, most of contaminants captured on the outer peripheral portion of the spiral wound type membrane element 1 are removed by flushing, and contaminants remaining on the outer peripheral portion, the membrane surface, the raw water spacers 4 etc. of the spiral wound type membrane element 1 can be removed by further introducing the permeate 52. Also in this case, therefore, a washing effect similar to the above can be attained. Alternatively, flushing may be performed with the raw water 51 in parallel with introduction of the permeate 52 into the water collection pipe 2. Also in this case, a washing effect similar to the above can be attained.

While the above description has been made with reference to the spiral wound type membrane module formed by charging the pressure vessel 10 with the single spiral wound type membrane element 1 as shown in FIG. 14, the method of running a spiral wound type membrane element and a spiral wound type membrane module according to this invention is also applicable to a spiral wound type membrane module formed by charging a pressure vessel with a plurality of spiral wound type membrane elements. Such application is now described.

Figure 15:
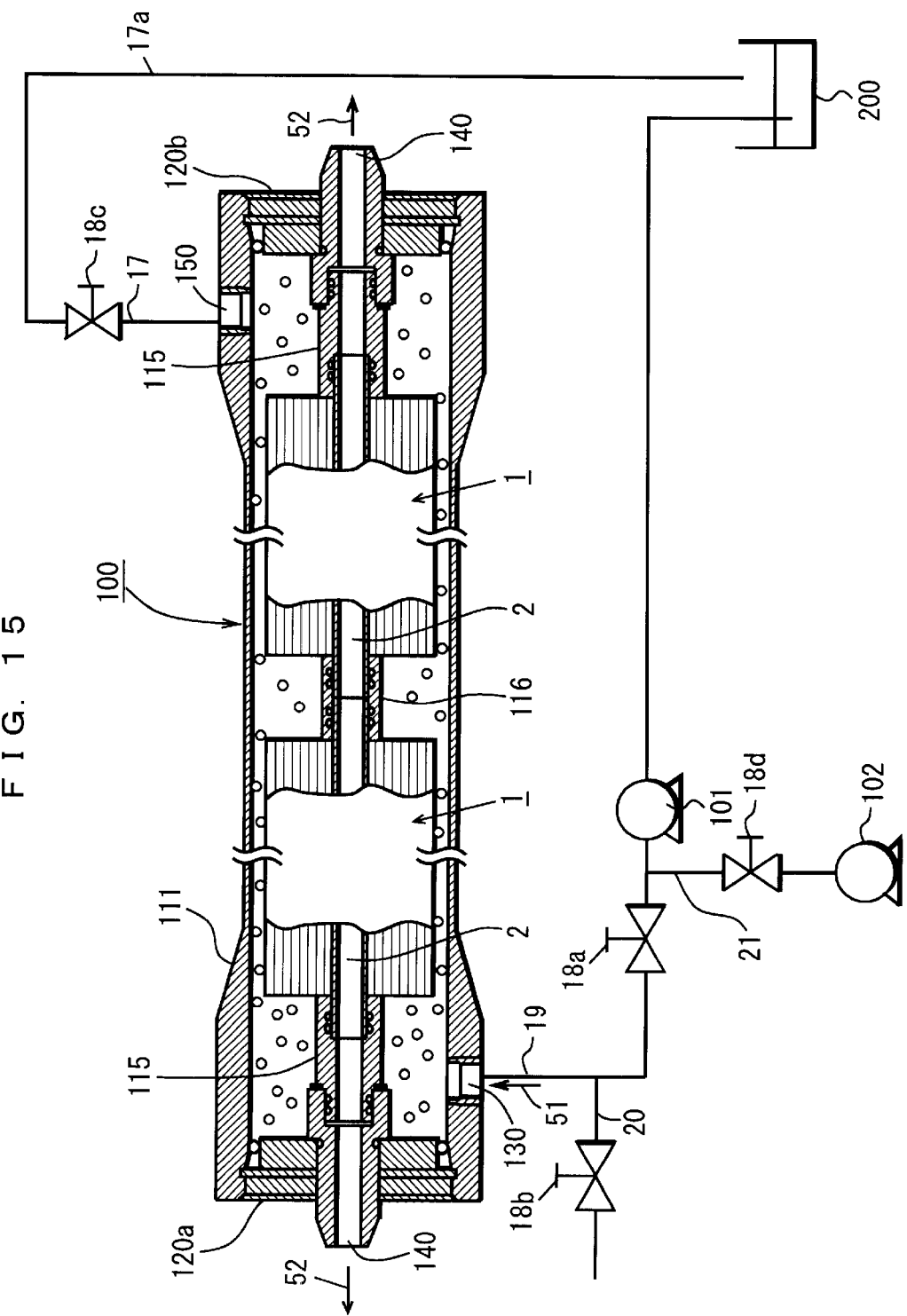
FIG. 15 is a typical sectional view showing a further exemplary method of running a spiral wound type membrane element and a spiral wound type membrane module according to the present invention.

FIG. 15 is a typical sectional view showing another exemplary method of running a spiral wound type membrane element and a spiral wound type membrane module according to this invention.

The spiral wound type membrane module shown in FIG. 15 is similar in structure to the spiral wound type membrane module shown in FIG. 13 described with reference to the first invention, and comprises the aforementioned spiral wound type membrane element 1 as each spiral wound type membrane element. A piping system connected to the spiral wound type membrane module shown in FIG. 15 is similar to that connected to the spiral wound type membrane module shown in FIG. 14, and a pipe 19 is connected to a raw water inlet 130 while a pipe 17 is connected to a concentrate outlet 150. Thus, the raw water inlet 130 of the spiral wound type membrane module shown in FIG. 15 is connected with a pressure pump 101, an air diffuser 102 and a raw water tank 200, and the concentrate outlet 150 is connected to the raw water tank 200.

As shown in FIG. 15, valves 18a and 18c of the pipes 19 and 17 are opened and a valve 18b of a pipe 20 is closed in filtration running of the spiral wound type membrane module, similarly to the filtration running of the spiral wound type membrane module shown in FIG. 14. Raw water 51 collected from the raw water tank 200 is pressurized with the pressure pump 101 and thereafter introduced into a pressure vessel 100 from a raw water inlet 13 of the pressure vessel 100. Then, a valve 18d of a pipe 21 is opened for introducing bubbles (air) diffused by the air diffuser 102 into the pressure vessel 100. Thus, air bubbling is performed in the spiral wound type membrane module.

Part of the raw water 51 supplied into the pressure vessel 100 axially flows along the outer peripheral portions of a plurality of spiral wound type membrane elements 1, and is discharged from a raw water outlet 15 through the pipe 17. The partial raw water is then returned into the raw water tank 200 through a pipe 17a.

The remaining raw water 51 flows along the outer peripheral passage forming member 5 of each spiral wound type membrane element 1, permeates through the separation membrane 9 from at least the outer peripheral side and infiltrates into the clearances between the envelope-like membranes 3 along the raw water spacers 4. The permeate permeating through the separation membranes 7 flows into the water collection pipe 2 along the permeate spacer 6, and the permeate 52 is taken out from permeate outlets 140 provided on both ends of the pressure vessel 100.

In this case, the outer peripheral surface of the spiral membrane component 1a of each spiral wound type membrane element 1 is covered with the separation membrane 9 as shown in FIG. 1, whereby contaminants larger than the pore size of the separation membrane 9 are captured on at least the outer peripheral portion of each spiral wound type membrane element 1. Therefore, loads on the separation membranes 7 forming the envelope-like membranes 3 of each spiral wound type membrane element 1 are reduced.

Further, air bubbling is performed in the spiral wound type membrane module while a flow of the raw water is axially formed along the outer peripheral portion of each spiral wound type membrane element 1, whereby a diffused air flow is formed around each spiral wound type membrane element 1. Thus, it is possible to inhibit contaminants from sedimenting and adhering to the membrane surface and at least the outer peripheral portion of each spiral wound type membrane element 1 and separate contaminants adhering to the membrane surface and at least the outer peripheral portion of each spiral wound type membrane element 1.

Further, it is possible to readily and reliably discharge part of contaminants contained in the raw water 51 and the contaminants separated from the membrane surface and at least the outer peripheral portion of each spiral wound type membrane element 1 from the spiral wound type membrane module due to the flow of the raw water. Thus, the spiral wound type membrane module can be stably run continuously over a long period.

Since partial raw water discharged from the raw outer outlet 15 is circulated by a circulation system formed by the pipe 17a, the permeate 52 can be obtained from the raw water 51 with recovery of 100% in theory.

In this case, the spiral wound type membrane module charged with the plurality of spiral wound type membrane elements 1 has a large capacity of treatment, whereby the permeate 52 can be efficiently obtained.

After performing filtration for a constant time, back wash reverse filtration is performed with the permeate 52 from the permeation side. In the back wash reverse filtration, the valves 18a, 18c and 18d of the pipes 19, 17 and 21 are closed and the valve 18b of the pipe 20 is opened. In this state, the permeate 52 is introduced into the water collection pipe 2 of each spiral wound type membrane element 1 from the permeate outlets 140 provided on both ends of the pressure vessel 100 as wash water. As shown in FIG. 5, the permeate 52 permeates through the envelope-like membranes 3 from the water collection pipe 2 in each spiral wound type membrane element 1, separates contaminants adhering to the membrane surface, the raw water spacers 4 and the like, and flows toward at least the outer peripheral portion along the raw water spacers 4. The permeate 52 readily separates contaminants captured on at least the outer peripheral portion of each spiral wound type membrane element 1. The separated contaminants are discharged with the permeate 52 through the pipe 20.

After the aforementioned back wash reverse filtration, valves 18a and 18c of the pipes 19 and 17 are opened for performing flushing with the raw water 51. Thus, the separated contaminants and the remaining permeate 52 are discharged with the raw water 51 from the raw water outlet 15 through the pipe 17. Also in this case, flushing is performed with the raw water 51 before, after or in parallel with the back wash reverse filtration, similarly to that in the running method shown in FIG. 14. The raw water discharged by the flushing is returned to the raw water tank 200 through the pipe 17a.

According to the aforementioned washing method, it is possible to readily and reliably discharge contaminants adhering to the membrane surface, the raw water spacers 4, the outer peripheral portion etc., particularly the separation membrane 9 of each spiral wound type membrane element 1 along the outer peripheral passage forming member 5 and suppress increase of the resistance of the separation membrane 9. Thus, a stable permeate flow rate can be regularly maintained.

In the aforementioned spiral wound type membrane module, no dead space is defined in the clearance between each spiral wound type membrane element 1 and the pressure vessel 100 due to the aforementioned filtration mode, whereby high reliability is attained with no problems such as propagation of germs such as microorganisms, occurrence of a bad smell resulting from decomposition of organic matter and decomposition of the separation membranes 7 and 9.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to form the pressure pump 101 from a large pump for supplying the raw water 51. Thus, the system cost is reduced.

While the partial raw water taken out from the raw water outlet 15 in filtration running and the raw water 51 employed for flushing in washing are returned to the raw water tank 200 through the pipe 17a in each of the running methods shown in FIGS. 14 and 15, the raw water may be discharged with no such circulation.

Further, the air bubbling performed in filtration running in each of the running methods shown in FIGS. 14 and 15 may alternatively be performed in an operation other than filtration running.

For example, air bubbling may be performed in back wash reverse filtration. Alternatively, air bubbling may be performed when running is stopped while sealing the spiral wound type membrane module with the raw water 51 or the wash water (permeate 52). Further, air bubbling may be performed when stopping running and flushing the membrane surface with the raw water 51 or the wash water (permeate 52). Effects similar to the above can be attained also in this case.

Figure 16:
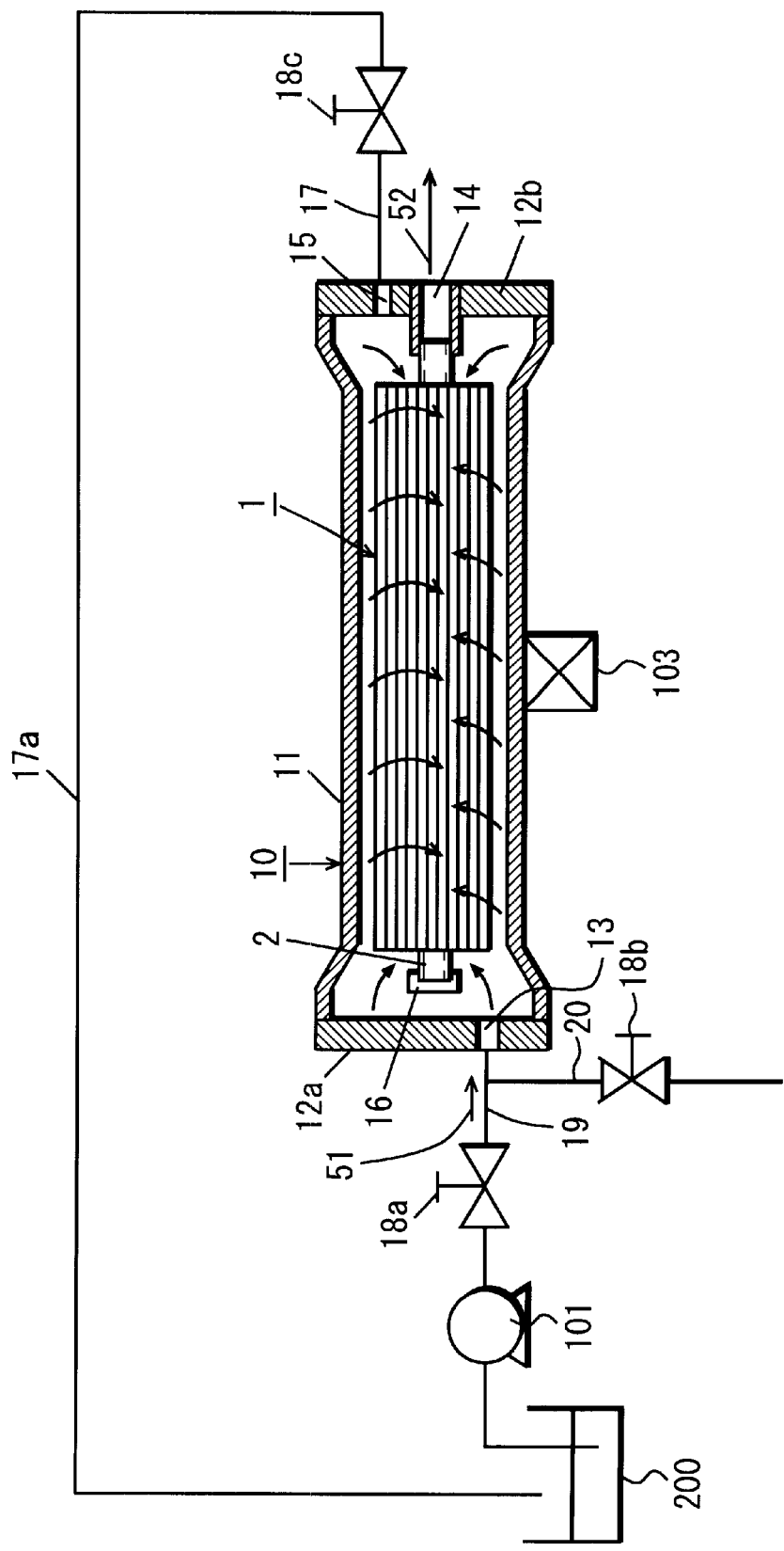
FIG. 16 is a typical sectional view showing a further exemplary method of running a spiral wound type membrane element and a spiral wound type membrane module according to the present invention.

FIG. 16 is a typical sectional view showing still another exemplary method of running a spiral wound type membrane element and a spiral wound type membrane module according to this invention. The spiral wound type membrane module shown in FIG. 16 is similar in structure to that shown in FIG. 14 except the following points, and comprises the spiral wound type membrane element 1 shown in FIG. 1.

In the spiral wound type membrane module shown in FIG. 16, an ultrasonic oscillator 103 is provided on the outer peripheral portion of a tubular case 11 of a pressure vessel 10. In this case, the spiral wound type membrane module is not provided with the air diffuser 102, the pipe 21 and the valve 18d dissimilarly to the spiral wound type membrane module shown in FIG. 14.

As shown in FIG. 16, a valve 18a of a pipe 19 is opened and valves 18b and 18c of pipes 20 and 17 are closed in filtration running of the spiral wound type membrane module. Raw water 51 collected from a raw water tank 200 is pressurized with a pressure pump 101 and thereafter introduced into the pressure vessel 10 from a raw water inlet 13 of the pressure vessel 10. The ultrasonic oscillator 103 provided on the tubular case 11 of the pressure vessel 10 applies ultrasonic vibration to the raw water 51 and the spiral wound type membrane element 1 stored in the pressure vessel 10 through the pressure vessel 10.

The raw water 51 introduced into the pressure vessel 10 flows along the outer peripheral passage forming member 5 of the spiral wound type membrane element 1, permeates through the separation membrane 9 from at least the outer peripheral side of the spiral wound type membrane element 1 and infiltrates into the clearances between the envelope-like membranes 3 along the raw water spacers 4. In the example shown in FIG. 16, the raw water 51 infiltrates into the clearances between the envelope-like membranes 3 from the outer peripheral side and both ends of the spiral wound type membrane element 1. The permeate permeating through the separation membranes 7 flows into the water collection pipe 2 along the permeate spacer 6. Thus, the permeate 52 is taken out from the permeate outlet 14 of the pressure vessel 10.

In this case, the outer peripheral surface of the spiral membrane component 1a is covered with the separation membrane 9 and hence contaminants larger than the pore size of the separation membrane 9 are captured on at least the outer peripheral portion of the spiral wound type membrane element 1. In other words, only contaminants smaller than the pore size of the separation membrane 9 infiltrate into the clearances between the envelope-like membranes 3. Thus, loads on the separation membranes 7 forming the envelope-like membranes 3 are reduced.

Further, the ultrasonic oscillator 103 applies ultrasonic vibration to the raw water 51 in the spiral wound type membrane module, thereby diffusing contaminants contained in the raw water 51. Thus, it is possible to inhibit the contaminants contained in the raw water 51 from adhering to the inner part of the spiral wound type membrane module, particularly to the membrane surface and at least the outer peripheral portion of the spiral wound type membrane element 1. The ultrasonic vibration is applied also to the spiral wound type membrane element 1, whereby it is possible to separate contaminants adhering to the membrane surface and at least the outer peripheral portion of the spiral wound type membrane element 1. Thus, the spiral wound type membrane module can be stably run continuously over a long period.

After filtration is performed for a constant time, back wash reverse filtration is performed with the permeate 52 from the permeation side. At this time, the ultrasonic oscillator 103 is stopped for performing back wash reverse filtration and flushing with the raw water 51 by a method similar to that shown in FIG. 14. Also in this case, the flushing with the raw water 51 is performed before, after or in parallel with the back wash reverse filtration as described above.

According to the aforementioned washing method, it is possible to readily and reliably discharge contaminants adhering to the membrane surface, the raw water spacers 4, the outer peripheral portion etc., particularly the separation membrane 9 of the spiral wound type membrane element 1 along the outer peripheral passage forming member 5 and suppress increase of the resistance of the separation membrane 9. Thus, a stable permeate flow rate can be regularly maintained.

Further, no dead space is defined in the clearance between the spiral wound type membrane element 1 and the pressure vessel 10 as shown in FIG. 16 due to the aforementioned filtration mode, whereby high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to form the pressure pump 101 by a large pump for supplying the raw water 51 due to dead end filtration. Thus, the system cost is reduced.

In filtration running of the aforementioned spiral wound type membrane module, partial raw water may be taken out from the raw water outlet 15 by opening the valve 18c of the pipe 17. In this case, a flow of the raw water can be formed on the outer peripheral portion of the spiral wound type membrane element 1. Thus, part of the contaminants contained in the raw water 51 and the separated contaminants can be discharged from the pressure vessel 10 while suppressing sedimentation of the contaminants contained in the raw water 51. The discharged partial raw water may be returned to the raw water tank 200 through the pipe 17a, to be circulated. The ultrasonic oscillator 103, which is provided on the outer peripheral portion of the tubular case 11 of the pressure vessel 10 in the above description, may alternatively be provided on the end plate 12a or 12b of the pressure vessel 10. Also in this case, ultrasonic vibration can be applied to the raw water 51 and the spiral wound type membrane element 1 through the pressure vessel 10. Alternatively, ultrasonic vibration may be directly applied to the raw water 51 or the spiral wound type membrane element 1.

While the above description has been made with reference to the spiral wound type membrane module formed by charging the pressure vessel 10 with the single spiral wound type membrane element 1 as shown in FIG. 16, the method of running a spiral wound type membrane element and a spiral wound type membrane module according to this invention is also applicable to a spiral wound type membrane module formed by charging a pressure vessel with a plurality of spiral wound type membrane elements. This application is now described.

Figure 17:
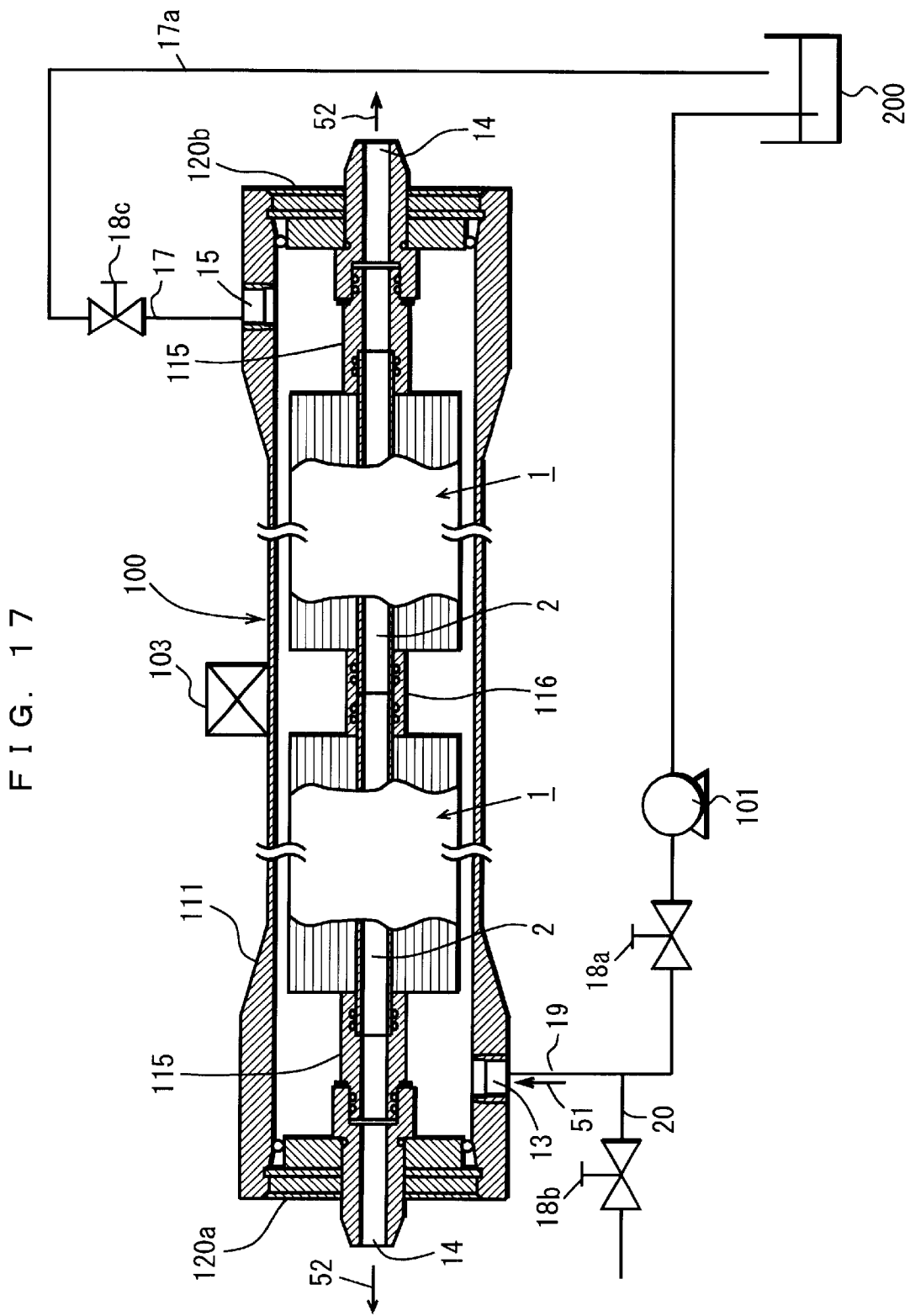
FIG. 17 is a typical sectional view showing a further exemplary method of running a spiral wound type membrane element and a spiral wound type membrane module according to the present invention.

FIG. 17 is a typical sectional view showing a further exemplary method of running a spiral wound type membrane element and a spiral wound type membrane module according to this invention.

The spiral wound type membrane module shown in FIG. 17 is similar in structure to that shown in FIG. 15 except the following points, and comprises the spiral wound type membrane element 1 shown in FIG. 1 as each spiral wound type membrane element.

In the spiral wound type membrane module shown in FIG. 17, an ultrasonic oscillator 103 is provided on the outer peripheral portion of a tubular case 111 of a pressure vessel 100. In this case, the spiral wound type membrane module is not provided with the air diffuser 102, the pipe 21 and the valve 18d dissimilarly to the spiral wound type membrane module shown in FIG. 15. As described above with reference to FIG. 16, the ultrasonic oscillator 103 may be provided on an end plate 120a or 120b of the pressure vessel 100. Alternatively, ultrasonic vibration may be directly applied to raw water 51 or each spiral wound type membrane element 1 without through the pressure vessel 100.

As shown in FIG. 17, a valve 18a of a pipe 19 is opened and valves 18b and 18c of pipes 20 and 17 are closed in filtration running of the spiral wound type membrane module. The raw water 51 collected from a raw water tank 200 is pressurized with a pressure pump 101 and thereafter introduced into the pressure vessel 100 from a raw water inlet 13 of the pressure vessel 100. The ultrasonic oscillator 103 applies ultrasonic vibration to the raw water 51 and each spiral wound type membrane element 1 stored in the pressure vessel 100 through the pressure vessel 100.

In each spiral wound type membrane element 1, the raw water 51 flows along the outer peripheral passage forming member 5, permeates through the separation membrane 9 from at least the outer peripheral side and infiltrates into the clearances between the envelope-like membranes 3 along the raw water spacers 4. The permeate permeating through the separation membranes 7 flows into the water collection pipe 2 through the permeate spacer 6, so that the permeate 52 is taken out from permeate outlets 14 provided on both ends of the pressure vessel 100.

In this case, the outer peripheral surface of the spiral membrane component 1a of each spiral wound type membrane element 1 is covered with the separation membrane 9 as shown in FIG. 1, and hence contaminants larger than the pore size of the separation membrane 9 are captured on at least the outer peripheral portion of each spiral wound type membrane element 1. Thus, loads on the separation membranes 7 forming the envelope-like membranes 3 of each spiral wound type membrane element 1 are reduced. Further, the ultrasonic oscillator 103 applies ultrasonic vibration to the raw water 51 in the spiral wound type membrane module, thereby diffusing contaminants contained in the raw water 51. Thus, it is possible to inhibit the contaminants contained in the raw water 51 from adhering to the inner part of the spiral wound type membrane module, particularly to the membrane surface and at least the outer peripheral portion of each spiral wound type membrane element 1. The ultrasonic vibration is applied also to each spiral wound type membrane element 1, whereby it is possible to separate contaminants adhering to the membrane surface and at least the outer peripheral portion of each spiral wound type membrane element 1.

Thus, the spiral wound type membrane module can be stably run continuously over a long period.

Further, the spiral wound type membrane module charged with the plurality of spiral wound type membrane elements 1 has a large capacity of treatment, and the permeate 52 can be efficiently obtained.

After filtration is performed for a constant time, back wash reverse filtration is performed with the permeate 52 from the permeation side. At this time, the ultrasonic oscillator 103 is stopped for performing back wash reverse filtration and flushing with the raw water 51 by a method similar to that shown in FIG. 15.

According to the aforementioned washing method, it is possible to readily and reliably discharge contaminants adhering to the membrane surface, the raw water spacers 4, the outer peripheral portion etc., particularly the separation membrane 9 of each spiral wound type membrane element 1 along the outer peripheral passage forming member 5 and suppress increase of the resistance of the separation membrane 9. Thus, a stable permeate flow rate can be regularly maintained.

In the aforementioned spiral wound type membrane module, no dead space is defined in the clearance between each spiral wound type membrane element 1 and the pressure vessel 100 due to the aforementioned filtration mode, whereby high reliability is attained with no problems such as propagation of germs such as microorganisms, occurrence of a bad smell resulting from decomposition of organic matter and decomposition of the separation membranes 7 and 9.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to form the pressure pump 101 by large pump for supplying the raw water 51 due to dead end filtration. Thus, the system cost is reduced.

In filtration running of the aforementioned spiral wound type membrane module, partial raw water may be taken out from a raw water outlet 15 by opening the valve 18c of the pipe 17. In this case, a flow of the raw water can be formed on the outer peripheral portion of each spiral wound type membrane element 1. Thus, part of the contaminants contained in the raw water 51 and the separated contaminants can be discharged from the pressure vessel 100 while suppressing sedimentation of the contaminants contained in the raw water 51. The discharged partial raw water may be returned to the raw water tank 200 through a pipe 17a, to be circulated.

The ultrasonic vibration is applied in filtration running of the spiral wound type membrane element 1 and the spiral wound type membrane module in each of the running methods shown in FIGS. 16 and 17 may alternatively be applied in an operation other than filtration running.

For example, ultrasonic vibration may be applied in back wash reverse filtration. Alternatively, ultrasonic vibration may be applied when stopping running while sealing the spiral wound type membrane module with the raw water 51 or wash water (permeate 52). Further, ultrasonic vibration may be applied when stopping running and flushing the membrane surface with the raw water 51 or the wash water (permeate 52). Also in this case, effects similar to the above can be attained.

Figure 6:
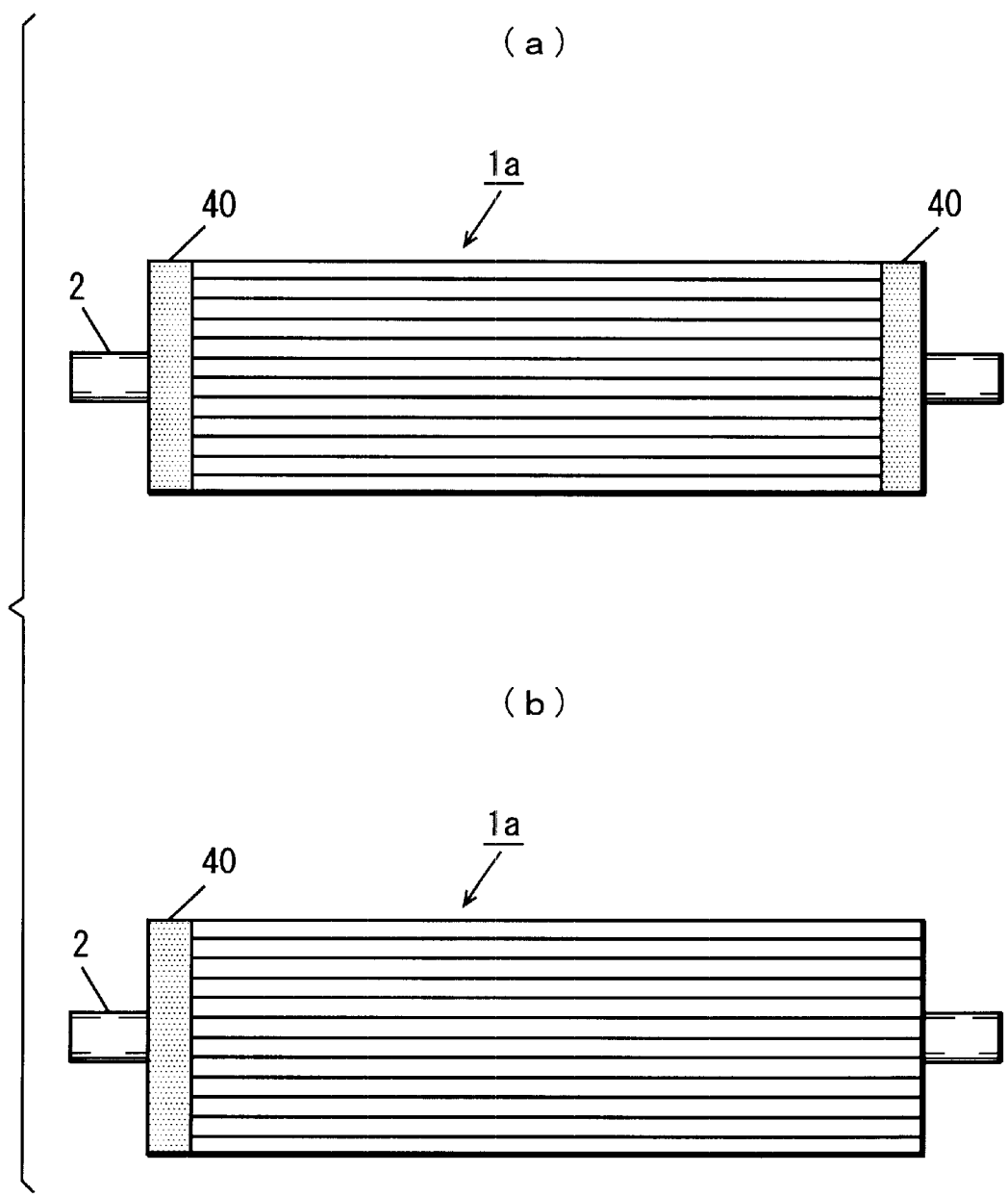
FIGS. 6(a) and 6(b) are front elevational views showing spiral wound type membrane elements according to another embodiment of the present invention.

While the method of running a spiral wound type membrane element and a spiral wound type membrane module according to this invention is applied to the spiral wound type membrane element 1 shown in FIG. 1 in each of FIGS. 14 to 17, the method of running a spiral wound type membrane element and a spiral wound type membrane module according to this invention is also applicable to other spiral wound type membrane elements such as the spiral wound type membrane elements 1 shown in FIGS. 6, 7 and 12 described with reference to the first invention, for example. Also in this case, effects similar to those for the spiral wound type membrane element 1 shown in FIG. 1 are attained. Description is now made on application of the method of running a spiral wound type membrane element and a spiral wound type membrane module according to this invention to the spiral wound type membrane element 1 shown in FIG. 7.

When running the spiral wound type membrane element 1 shown in FIG. 7 by any of the aforementioned running methods shown in FIGS. 14 to 17 in place of the spiral wound type membrane element 1 shown in FIG. 1, contaminants larger than the pore size of the net 8 are captured on at least the outer peripheral portion of the spiral wound type membrane element 1 since the outer peripheral surface of the spiral membrane component 1a is covered with the net 8 as shown in FIG. 7. In other words, only contaminants smaller than the pore size of the net 8 infiltrate into the clearances between the envelope-like membranes 3. Thus, loads on the separation membranes 7 forming the envelope-like membranes 3 are reduced.

When applying the running method shown in FIG. 14 or 15 to the spiral wound type membrane element 1 shown in FIG. 7, air bubbling is performed in the spiral wound type membrane module with bubbles diffused into the raw water 51 from the air diffuser 102. Thus, it is possible to inhibit contaminants contained in the raw water 51 from sedimenting and adhering to the membrane surface and at least the outer peripheral portion of the spiral wound type membrane element 1 and separate contaminants adhering to the membrane surface and at least the outer peripheral portion of the spiral wound type membrane element 1.

When applying the running method shown in FIG. 16 or 17 to the spiral wound type membrane element 1 shown in FIG. 7, the ultrasonic oscillator 103 applies ultrasonic vibration to the raw water 51 and the spiral wound type membrane element 1 in the spiral wound type membrane module. Thus, it is possible to inhibit contaminants contained in the raw water 51 from adhering to the inner part of the spiral wound type membrane module, particularly to the membrane surface and at least the outer peripheral portion of the spiral wound type membrane element 1 and separate contaminants adhering to the membrane surface and at least the outer peripheral portion of the spiral wound type membrane element 1.

Figure 11:
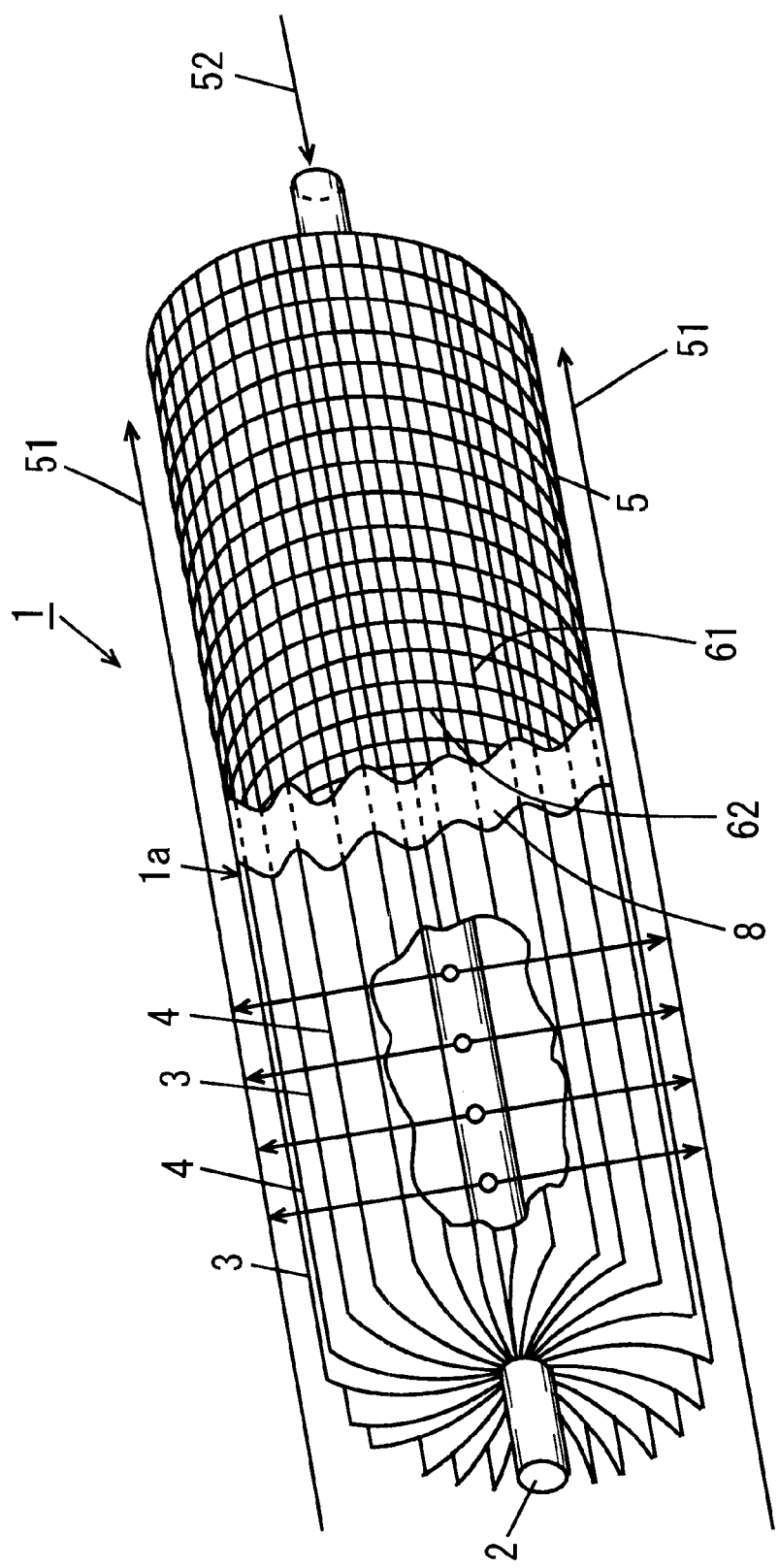
FIG. 11 is a partially fragmented perspective view showing back wash reverse filtration in the spiral wound type membrane element shown in FIG. 6(a) or 6(b)

When applying each of the running methods shown in FIGS. 14 to 17 to the spiral wound type membrane element 1 shown in FIG. 1, back wash reverse filtration of the spiral wound type membrane element 1 is performed in washing as shown in FIG. 11. As shown in FIG. 11, back wash reverse filtration and flushing with the raw water 51 are performed by a method similar to the washing method for the spiral wound type membrane element 1 shown in FIG. 1 in washing of the spiral wound type membrane element 1 shown in FIG. 7. Also in this case, the flushing with the raw water 51 is performed before, after or in parallel with the back wash reverse filtration, as described above.

According to this washing method, it is possible to readily and reliably discharge contaminants adhering to the membrane surface, the raw spacers 4, the outer peripheral portion etc., particularly to the net 8 of the spiral wound type membrane element 1 shown in FIG. 7 along the outer peripheral passage forming member 5 and suppress increase of the resistance of the net 8. Thus, a stable permeate flow rate can be regularly maintained.

In the spiral wound type membrane element 1 shown in FIG. 7, the outer peripheral portion is covered with the outer peripheral passage forming member 5, whereby handleability is improved.

Further, the outer peripheral surface of the spiral membrane component 1*a* is covered with the net 8, whereby the spiral membrane component 1*a* is prevented from swelling by the net 8 covering the outer peripheral portion so that the clearances between the envelope-like membranes 3 are not enlarged even if the back pressure caused in the back wash reverse filtration is increased by contaminants captured on the outer peripheral portion of the spiral membrane component 1*a*. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1*a* on a plurality of portions, whereby the spiral membrane component 1*a* is reliably prevented from swelling even if the back wash reverse filtration is performed under high back pressure.

In addition, no dead space is defined in the clearance between the spiral wound type membrane element 1 and the pressure vessel 10, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to form the pressure pump 101 by a large pump for supplying the raw water 51. Thus, the system cost is reduced.

Also in the method of running a spiral wound type membrane module comprising the spiral wound type membrane element 1 shown in FIG. 7 as described above, air bubbling or application of ultrasonic vibration may be performed in an operation other than filtration running such as back wash reverse filtration, stopping of running or flushing, similarly to the case of employing the spiral wound type membrane element 1 shown in FIG. 1.

(3) Third Invention

The spiral wound type membrane module shown in FIG. 4 is employed also in a running method according to the third invention. In this case, the spiral wound type membrane element 1 shown in FIG. 1 is employed.

In this example, the valve 18*a* of the pipe 19 is opened and the valves 18*b* and 18*c* of the pipes 20 and 17 are closed in filtration running of the spiral wound type membrane module. The raw water 51 is introduced into the pressure vessel 10 from the raw water inlet 13 of the pressure vessel 10 through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 4, the raw water 51 infiltrates into the clearances between the envelope-like membranes 3 from the outer peripheral side and both ends of the spiral wound type membrane element 1. The permeate permeating through the separation membranes 7 flows into the water collection pipe 2 through the permeate spacer 6. Thus, the permeate 52 is taken out from the permeate outlet 14 of the pressure vessel 10. Dead end filtration is performed in the aforementioned manner.

In this case, the outer peripheral surface of the spiral membrane component 1*a* is covered with the separation membrane 9 as shown in FIG. 1, whereby contaminants such as turbid substances larger than the pore size of the separation membrane 9 are captured on at least the outer peripheral portion of the spiral wound type membrane element 1. In other words, only contaminants smaller than the pore size of the separation membrane 9 infiltrate into the clearances between the envelope-like membranes 3. Thus, loads on the separation membranes 7 forming the envelope-like membranes 3 are reduced.

In filtration running of the aforementioned spiral wound type membrane element 1, partial raw water 54 may be taken out from the raw water outlet 15 by opening the valve 18*c* of the pipe 17. In this case, a flow of the raw water 51 can be formed on the outer peripheral portion of the spiral wound type membrane element 1. Thus, part of contaminants can be discharged from the pressure vessel 10 while suppressing sedimentation of contaminants contained in the raw water 51. At least part of the discharged raw water 54 may be returned to the supply side again.

In filtration running of the aforementioned spiral wound type membrane module, the valve 18*a* of the pipe 19 is temporarily closed for stopping supply of the raw water 51 while stopping extraction of the permeate 52 from the permeate outlet 14. Thus, filtration running is temporarily stopped and the pressure vessel 10 is held for a prescribed time in the state sealing the raw water 51 and the permeate 52 therein (liquid seal stopping). After such liquid seal stopping is performed for a prescribed time, the valve 18*a* of the pipe 19 is opened again for supplying the raw water 51 to the spiral wound type membrane element 1 and the permeate 52 is taken out from the permeate outlet 14 for restarting filtration running. When filtration running is performed while opening the valve 18*c* of the pipe 17 for taking out the partial raw water 54 as described above, the valve 18*c* of the pipe 17 is opened/closed in association with the valve 18*a* of the pipe 19.

As described above, the aforementioned filtration running and liquid seal stopping are repeated during a running period for the spiral wound type membrane module.

In the spiral wound type membrane module subjected to liquid seal stopping after filtration running, pressure on the raw water side and that on the permeate side of the separation membrane 9 of the spiral wound type membrane element 1 are held substantially at the atmospheric pressure, to form no flow of liquids on the raw water side and the permeate side. It is possible to separate contaminants adhering to the membrane surface and at least the outer peripheral portion of the spiral wound type membrane element 1 following continuous filtration running of the spiral wound type membrane module due to such liquid seal stopping. Thus, the membrane function of the spiral wound type membrane element 1 reduced by adhesion of the contaminants is recovered.

The aforementioned liquid seal stopping in filtration running may be periodically or non-periodically performed. In the latter case, liquid seal stopping is performed when reduction of the permeate flow rate is observed in the spiral wound type membrane module, for example.

After performing the aforementioned filtration running for a constant time during the running period, back wash reverse filtration is performed with the permeate 52 from the permeation side. The back wash reverse filtration in the spiral wound type membrane element 1 is performed as shown in FIG. 5. In the back wash reverse filtration, the valves 18*a* and 18*c* of the pipes 19 and 17 are closed and the valve 18*b* of the pipe 20 is opened, for introducing the permeate 52 into the water collection pipe 2 from the permeate outlet 14 shown in FIG. 4. The permeate 52 permeates through the envelope-like membranes 3 from the water collection pipe 2, separates contaminants adhering to the membrane surface, the raw water spacers 4 etc. and flows toward at least the outer peripheral portion along the raw water spacers 4. In this back wash reverse filtration, the permeate 52 readily separates contaminants captured on at least the outer peripheral portion of the spiral wound type membrane element 1. The contaminants separated in such a manner are discharged with the permeate 52 through the pipe 20.

Liquid seal stopping may be performed in the aforementioned back wash reverse filtration. In this case, the valve 18*b* of the pipe 20 is closed for stopping discharge of the permeate 52 while introduction of the permeate 52 into the water collection pipe 2 is stopped for holding the pressure vessel 10 in the state sealed with the permeate 52 for a prescribed time. After performing liquid seal stopping for the prescribed time in such a manner, the valve 18*b* of the pipe 20 is opened to discharge the permeate 52 while the permeate 52 is introduced into the water collection pipe 2 for restarting back wash reverse filtration.

In the spiral wound type membrane module subjected to liquid seal stopping in back wash reverse filtration, pressure on the raw water side and that on the permeate side of the separation membrane 9 of the spiral wound type membrane element 1 are held substantially at the atmospheric pressure, to form no flow of liquids on the raw water side and the permeate side. It is possible to more effectively separate contaminants adhering to the membrane surface and at least the outer peripheral portion of the spiral wound type membrane element 1 due to such liquid seal stopping.

After the aforementioned back wash reverse filtration, flushing is performed with the raw water 51. The valve 18*a* of the pipe 19 is opened and the valve 18*b* of the pipe 20 is closed, for supplying the raw water 51 from the raw water inlet 13 through the pipe 19 and opening the valve 18*c* of the pipe 17. Thus, the raw water 51 axially flows linearly along the outer peripheral passage forming member 5 for discharging the separated contaminants through the raw water outlet 15 and the pipe 17 shown in FIG. 4 while contaminants remaining on the outer peripheral portion of the spiral wound type membrane element 1 are separated from the spiral wound type membrane element 1. Consequently, the membrane flux is remarkably recovered as compared with that before washing.

At least part of the raw water 51 containing the contaminants discharged by flushing may be returned to a raw water tank storing the raw water 51. The flushing, which is performed after back wash reverse filtration in the above description, may alternatively be performed before or simultaneously with back wash reverse filtration. Also in this case, effects similarly to those in the case of performing flushing after back wash reverse filtration can be attained.

According to the aforementioned washing method, contaminants adhering to the outer peripheral portion, particularly the separation membrane 9 of the spiral wound type membrane element 1 can be readily and reliably discharged along the outer peripheral passage forming member 5, whereby increase of the resistance of the separation membrane 9 can be suppressed. Thus, a stable permeate flow rate can be regularly maintained.

Further, it is possible to separate contaminants adhering to the membrane surface and at least the outer peripheral portion of the spiral wound type membrane element 1 and more reliably and stably run the spiral wound type membrane element 1 by performing liquid seal stopping of the spiral wound type membrane module in filtration running or back wash reverse filtration. Such liquid seal stopping, performed by opening/closing the valves 18*a* and 18*b* of the pipes 19 and 20, can be readily performed with no requirement for particular equipment. Further, the contaminants can be separated with a liquid containing no chemical for washing, whereby the cost for such a chemical for washing can be reduced and the method can be carried out at a low cost.

The time for liquid seal stopping in the aforementioned filtration running or back wash reverse filtration of the spiral wound type membrane module is preferably at least one minute and not more than 24 hours. If the time for the liquid seal stopping is less than one minute, contaminants cannot be sufficiently separated from the membrane surface and at least the outer peripheral portion of the spiral wound type membrane element 1 since the sealing time is insufficient. If the time for the liquid seal stopping exceeds 24 hours, the effect of separating contaminants is not improved beyond a certain degree and the time for the essential object, i.e., filtration running is improperly compressed. Further, germs and the like unpreferably propagate due to residence of the liquid.

In the aforementioned liquid seal stopping in filtration running and back wash reverse filtration of the spiral wound type membrane module, the liquid sealed in the pressure vessel 10 is not restricted to the raw water 51 or the permeate 52. A liquid other than the raw water 51 or the permeate 52, such as pure water, may be employed. In this case, pure water is supplied into the pressure vessel 10 in filtration running and back wash reverse filtration for sealing the pure water in the pressure vessel 10. Also when sealing pure water in the pressure vessel 10, contaminants can be separated from the membrane surface and at least the outer peripheral portion of the spiral wound type membrane element 1, similarly to the case of employing the raw water 51 or the permeate 52.

The spiral wound type membrane element 1 of the aforementioned spiral wound type membrane module is improved in handleability since the outer peripheral portion is covered with the outer peripheral passage forming member 5.

As shown in FIG. 4, further, no dead space such as the dead space S shown in FIG. 21 is defined in the clearance between the spiral wound type membrane element 1 and the pressure vessel 10 due to the aforementioned filtration mode, whereby high reliability is attained with no problems such as propagation of germs such as microorganisms, occurrence of a bad smell resulting from decomposition of organic matter and decomposition of the separation membranes 7 and 9.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to use a large pump for supplying the raw water 51 due to dead end filtration. Thus, the system cost is reduced.

While the liquid seal stopping is performed during filtration running or back wash reverse filtration in the aforementioned spiral wound type membrane module, the period for performing the liquid seal stopping is not particularly restricted but liquid seal stopping may be performed in a period other than the above during the running period.

For example, liquid seal stopping may be performed after filtration running for performing back wash reverse filtration immediately after this liquid seal stopping. Alternatively, liquid seal stopping may be performed after filtration running, for performing flushing with the raw water after this liquid seal stopping and thereafter restarting filtration running. Flushing is performed in back wash reverse filtration by a method similar to the above. Alternatively, liquid seal stopping may be performed after back wash reverse filtration for restarting filtration running immediately after this liquid seal stopping.

Alternatively, liquid seal stopping may be performed in filtration running or back wash reverse filtration for thereafter supplying raw water 51 or permeate 52 containing a chemical to the spiral wound type membrane module and dipping the spiral wound type membrane element 1 in the liquid containing the chemical (chemical dipping). In this case, a chemical having a bactericidal action or a function of separating contaminants such as sodium hypochlorite of 10 to 10000 ppm in concentration, chloramine of 0.1 to 10 ppm in concentration, hydrogen peroxide of 10 to 10000 ppm in concentration, sulfuric acid of pH 1 to 3, hydrochloric acid of pH 1 to 3, sodium hydroxide of pH 10 to 30, peracetic acid of 10 to 10000 ppm in concentration, isopropyl alcohol of 0.1 to 50% in concentration, citric acid of 0.2 to 2% in concentration or oxalic acid of 0.2 to 2% in concentration is employed, for example. Due to such chemical dipping of the spiral wound type membrane element 1, it is possible to more effectively separate contaminants adhering to the inner part of the spiral wound type membrane module, particularly the membrane surface and at least the outer peripheral portion of the spiral wound type membrane element 1 and more effectively suppress propagation of germs. Filtration running or back wash reverse filtration is performed after such chemical dipping. While the method of running a spiral wound type membrane element and a spiral wound type membrane module according to this invention is applied to the spiral wound type membrane element 1 shown in FIG. 1 in the above description, the method of running a spiral wound type membrane element and a spiral wound type membrane module according to this invention is also applicable to a spiral wound type membrane element other than that shown in FIG. 1 such as the spiral wound type membrane element 1 shown in FIG. 6(*a*), 6(*b*), 7 or 12 described with reference to the first invention, for example. In this case, effects similar to those in the spiral wound type membrane element 1 shown in FIG. 1 are attained. Another exemplary method of running a spiral wound type membrane element and a spiral wound type membrane module according to this invention is now described with reference to the spiral wound type membrane element 1 shown in FIG. 7.

A spiral wound type membrane module comprising the spiral wound type membrane element 1 shown in FIG. 7 is run by the running method shown in FIG. 4 similarly to the spiral wound type membrane module comprising the spiral wound type membrane element 1 shown in FIG. 1, and dead end filtration is performed in filtration running.

The outer peripheral surface of the spiral membrane component 1*a* is covered with the net 8 as shown in FIG. 7, whereby contaminants such as turbid substances larger than the pore size of the net 8 are captured on at least the outer peripheral portion of the spiral wound type membrane element 1. In other words, only contaminants smaller than the pore size of the net 8 infiltrate into the clearances between the envelope-like membranes 3. Thus, loads on the separation membranes 7 forming the envelope-like membranes 3 are reduced.

As described above with reference to the case of employing the spiral wound type membrane element 1 shown in FIG. 1, the partial raw water 54 may be taken out from the raw water outlet 15 by opening the valve 18*c* of the pipe 17 in running of the spiral wound type membrane element 1 shown in FIG. 7. Thus, effects similar to those described above with reference to the case of employing the spiral wound type membrane element 1 shown in FIG. 1 can be attained.

Also in this case, liquid seal stopping is performed in filtration running of the spiral wound type membrane module similarly to the case of employing the spiral wound type membrane element 1 shown in FIG. 1. Thus, it is possible to separate contaminants adhering to the membrane surface and at least the outer peripheral portion of the spiral wound type membrane element 1 shown in FIG. 7 following continuous filtration running of the spiral wound type membrane module and recover the membrane function of the spiral wound type membrane element 1 reduced by adhesion of the contaminants.

After performing filtration running for a constant time during the running period, the spiral wound type membrane element 1 shown in FIG. 7 is subjected to back wash reverse filtration by a washing method similar to that in the case of employing the spiral wound type membrane element 1 shown in FIG. 1. The back wash reverse filtration of the spiral wound type membrane element 1 is performed as shown in FIG. 11.

As shown in FIG. 11, the permeate 52 permeates through the envelope-like membranes 3 from the water collection pipe 2, separates contaminants adhering to the membrane surface, the raw water spacers 4 etc. and flows toward at least the outer peripheral portion along the raw water spacers 4. In this back wash reverse filtration, the permeate 52 readily separates contaminants captured on at least the outer peripheral portion, particularly the net 8 of the spiral wound type membrane element 1.

Also in the aforementioned back wash reverse filtration of the spiral wound type membrane element 1 shown in FIG. 7, liquid seal stopping may be performed with the permeate 52, as described above with reference to the case of employing the spiral wound type membrane element 1 shown in FIG. 1. Thus, contaminants adhering to the membrane surface and at least the outer peripheral portion of the spiral wound type membrane element 1 can be more effectively separated.

After the aforementioned back wash reverse filtration, flushing is performed with the raw water 51. Thus, the raw water 51 axially flows linearly along the outer peripheral passage forming member 5 to discharge the separated contaminants through the raw water outlet 15 and the pipe 17 while separating contaminants remaining on the outer peripheral portion of the spiral wound type membrane element 1 from the spiral wound type membrane element 1. Consequently, the membrane flux is remarkably recovered as compared with that before washing. Also in this case, at least part of the raw water 51 containing the contaminants discharged by flushing may be returned to the raw water tank storing the raw water 51, similarly to the above. Flushing may be performed before or simultaneously with the back wash reverse filtration.

According to the aforementioned washing method, contaminants adhering to the outer peripheral portion, particularly the net 8 of the spiral wound type membrane element 1 shown in FIG. 7 can be readily and reliably discharged along the outer peripheral passage forming member 5, whereby increase of the resistance of the net 8 can be suppressed. Thus, a stable permeate flow rate can be regularly maintained.

Further, it is possible to separate contaminants adhering to the membrane surface and at least the outer peripheral portion of the spiral wound type membrane element 1 for more reliably and stably running the spiral wound type membrane module by performing liquid seal stopping of the spiral wound type membrane module in filtration running or back wash reverse filtration. Such liquid seal stopping performed by opening/closing the valves of the pipes can be readily performed with no requirement for particular equipment. Further, the contaminants can be separated with a liquid containing no chemical for washing, whereby the cost for such a chemical for washing can be reduced and the method can be carried out at a low cost. The time for liquid seal stopping in filtration running or back wash reverse filtration, the timing for liquid seal stopping and the sealed liquid are identical to those described above with reference to the case of employing the spiral wound type membrane element 1 shown in FIG. 1.

Also in the spiral wound type membrane element 1 shown in FIG. 1, handleability is improved similarly to the spiral wound type membrane element 1 shown in FIG. 1 since the outer peripheral portion is covered with the outer peripheral passage forming member 5.

In the spiral wound type membrane element 1 shown in FIG. 7, the outer peripheral surface of the spiral membrane component 1*a* is covered with the net 8, whereby the spiral membrane component 1*a* is prevented from swelling by the net 8 covering the outer peripheral portion so that the clearances between the envelope-like membranes 3 are not enlarged even if back pressure caused in back wash reverse filtration is increased by contaminants captured on the outer peripheral portion of the spiral membrane component 1*a*. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1*a* on a plurality of portions, whereby the spiral membrane component 1*a* is reliably prevented from swelling even if the back wash reverse filtration is performed under high back pressure.

Further, no dead space is defined in the clearance between the spiral wound type membrane element 1 and the pressure vessel, whereby high reliability is attained with no problems such as propagation of germs such as microorganisms, occurrence of a bad smell resulting from decomposition of organic matter and decomposition of the separation membranes 7.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to employ a large pump for supplying the raw water 51 due to dead end filtration. Thus, the system cost is reduced.

The method of running a spiral wound type membrane element and a spiral wound type membrane module according to this invention is also applicable to a spiral wound type membrane module formed by charging a pressure vessel with a plurality of spiral wound type membrane elements. In this case, the running method is applied to the spiral wound type membrane module shown in FIG. 13. The spiral wound type membrane element 1 shown in FIG. 1, 6, 7 or 12 can be employed as each spiral wound type membrane element. In this case, the spiral wound type membrane element 1 shown in FIG. 1 is employed.

As shown in FIG. 13, the raw water outlet 131 is closed for introducing the raw water 51 into the pressure vessel 100 from the raw water inlet 130 of the pressure vessel 100 in filtration running of the spiral wound type membrane module in this example. The raw water 51 flows along the outer peripheral passage forming member 5 of each spiral wound type membrane element 1. In each spiral wound type membrane element 1, the raw water 51 permeates through the separation membrane 9 from at least the outer peripheral side and infiltrates into the clearances between the envelope-like membranes 3 along the raw water spacers 4. Permeate permeating through the separation membranes 7 flows into the water collection pipe 2 along the permeate spacer 6, so that the permeate 52 is taken out from the permeate outlets 140 provided on both ends of the pressure vessel 100. Dead end filtration is performed in the aforementioned manner. Also in this case, partial raw water may be taken out by opening the raw water outlet 131, similarly to the case of the spiral wound type membrane module formed by charging the single spiral wound type membrane element 1 shown in FIG. 4.

In the aforementioned filtration running of the spiral wound type membrane module, supply of the raw water 51 is temporarily stopped while stopping extraction of the permeate 52 from the permeate outlets 140. Thus, the filtration running is temporarily stopped and the pressure vessel 100 is held for a prescribed time in the state sealing the raw water 51 and the permeate 52 therein. After such liquid seal stopping is performed for the prescribed time, the raw water 51 is supplied again and the permeate 52 is taken out from the permeate outlets 140 for restarting filtration running.

As described above, filtration running and liquid seal stopping are repeated in the running period for the spiral wound type membrane module similarly to the case of FIG. 4 employing the single spiral wound type membrane element 1.

In each spiral wound type membrane element 1 of the spiral wound type membrane module subjected to liquid seal stopping during filtration running, pressure on the raw water side and that on the permeate side of the separation membranes 7 are held substantially at the atmospheric pressure, to form no flow of liquids on the raw water side and the permeate side. It is possible to separate contaminants adhering to the membrane surface and at least the outer peripheral portion of each spiral wound type membrane element 1 following continuous filtration running of the spiral wound type membrane module due to such liquid seal stopping. Thus, the membrane function of each spiral wound type membrane element 1 reduced by adhesion of the contaminants is recovered.

After performing filtration running for a constant time during the running period, back wash reverse filtration is performed with the permeate 52 from the permeation side. In back wash reverse filtration, the permeate 52 is introduced into the water collection pipe 2 of each spiral wound type membrane element 1 from the permeate outlets 140 provided on both ends of the pressure vessel 100. As shown in FIG. 1, the permeate 52 permeates through the envelope-like membranes 3 from the water collection pipe 2, separates contaminants adhering to the membrane surface, the raw water spacers 4 etc. and flows toward at least the outer peripheral portion along the raw water spacers 4 in each spiral wound type membrane element 1. The permeate 52 readily separates contaminants captured on at least the outer peripheral portion of each spiral wound type membrane element 1. The contaminants separated in the aforementioned manner are discharged with the permeate 52 from the raw water outlet 131.

Liquid seal stopping may be performed in the aforementioned back wash reverse filtration. In this case, introduction of the permeate 52 into the water collection pipe 2 is stopped while stopping discharge of the permeate 52, and the pressure vessel 100 is held in the state sealing the permeate 52 therein for a prescribed time. After performing such liquid seal stopping for the prescribed time, the permeate 52 is introduced into the water collection pipe 2 again and discharged for restarting back wash reverse filtration.

In each spiral wound type membrane element 1 of the spiral wound type membrane module subjected to liquid seal stopping during back wash reverse filtration, pressure on the raw water side and that on the permeate side of the separation membranes 7 are held substantially at the atmospheric pressure, to form no flow of liquids on the raw water side and the permeate side. Contaminants adhering to the membrane surface and at least the outer peripheral portion of the spiral wound type membrane element 1 can be more effectively separated due to such liquid seal stopping.

After the aforementioned back wash reverse filtration, the raw water outlet 131 is opened and the raw water 51 is supplied from the raw water inlet 130 for performing flushing. Thus, the separated contaminants are discharged from the spiral wound type membrane module with the raw water 51. Also in this case, flushing may be performed before or in parallel with back wash reverse filtration, as described above with reference to FIG. 4.

According to the method of running a spiral wound type membrane element and a spiral wound type membrane module shown in FIG. 13, the raw water 51 is supplied from at least the outer peripheral side of each spiral wound type membrane element 1 in filtration running for performing dead end filtration in each spiral wound type membrane element 1 similarly to the case of FIG. 4. In this case, contaminants are captured on at least the outer peripheral portion in each spiral wound type membrane element 1. Therefore, loads on the separation membranes 7 forming the envelope-like membranes 3 are reduced.

In back wash reverse filtration, contaminants adhering to the separation membrane 7 and the outer peripheral portion of each spiral wound type membrane element 1 can be readily discharged along the outer peripheral passage forming member 5, whereby a stable permeate flow rate can be maintained.

Further, the spiral wound type membrane module charged with the plurality of spiral wound type membrane elements 1 has a large capacity of treatment and the permeate 52 can be efficiently obtained.

In addition, it is possible to separate contaminants adhering to the membrane surface and at least the outer peripheral portion of each spiral wound type membrane element 1 and more reliably and stably run the spiral wound type membrane module by performing liquid seal stopping of the spiral wound type membrane module in filtration running or back wash reverse filtration. The timing for liquid seal stopping in filtration running or washing, the time for liquid seal stopping and the sealed liquid are identical to those described above with reference to FIGS. 4 and 5. Such liquid seal stopping requires no particular equipment and easy to perform. Further, the contaminants can be separated with a liquid containing no chemical for washing, whereby the cost for such a chemical for washing can be reduced and the method can be carried out at a low cost.

In the aforementioned spiral wound type membrane module, no dead space is defined in the clearance between each spiral wound type membrane element 1 and the pressure vessel 100 due to the aforementioned filtration mode, whereby high reliability is attained with no problems such as propagation of germs such as microorganisms, occurrence of a bad smell resulting from decomposition of organic matter and decomposition of the separation membranes 7 and 9.

Further, pressure is applied to each spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the raw water 51 due to dead end filtration. Thus, the system cost is reduced.

INVENTIVE EXAMPLE

In each of Inventive Example and comparative example, the spiral wound type membrane element 1 (RS30-S4. by Nitto Denko Corporation) shown in FIG. 7 was run. The raw water 51 was prepared from industrial water (pH 6 to 8 under water temperature of 10 to 30° C. with turbidity of 0.5 NTU), and the supply pressure was adjusted to obtain a permeate flow rate of 1.0 m$^3$/m$^2$/day.

INVENTIVE EXAMPLE A

In Inventive Example A, a spiral wound type membrane module was subjected to filtration running for 24 hours by the method of running a spiral wound type membrane module shown in FIG. 4. Thereafter filtration running was stopped (liquid seal stopping) for one hour while sealing the raw water 51 and the permeate 52 in the pressure vessel 10, and flushing was performed with the raw water 51 after a lapse of one hour from stopping filtration running. After performing flushing in this manner, filtration running was restarted under the same conditions.

The transmembrane pressure difference of the spiral wound type membrane element 1 measured when restarting filtration running was 0.7 kg/cm$^2$.

COMPARATIVE EXAMPLE A

In comparative example A, a spiral wound type membrane module was subjected to filtration running for 24 hours by the method of running a spiral wound type membrane module shown in FIG. 4.

The transmembrane pressure difference of the spiral wound type membrane element 1 measured when restarting filtration running was 1.1 kg/cm$^2$.

As understood from the aforementioned Inventive Example A and comparative example A, it is possible to separate contaminants adhering to the membrane surface and at least the outer peripheral portion of the spiral wound type membrane element 1 and suppress increase of the transmembrane pressure difference by performing liquid seal stopping in the spiral wound type membrane module. Thus, the spiral wound type membrane module can be reliably and stably run.

While the invention has been described in detail, the foregoing description is in all aspects illustrative and not restrictive. It is understood that numerous other modifications and variations can be devised without departing from the scope of the invention.

What is claimed is:

1. A method of running a spiral wound membrane element for dead-end filtration, said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said method comprising steps of:
   supplying a raw liquid containing an amount of contaminants and a chemical having a function of separating contaminants or a bactericidal action, from at least an outer peripheral side of said spiral wound membrane element;
   flowing the raw liquid through the outer peripheral passage forming member to the outer peripheral portion of the spiral membrane component;
   separating contaminants from the raw liquid with the spiral membrane component by dead-end filtration, thereby producing a captured contaminants component and a permeate liquid;
   routing the permeate liquid from the spiral membrane component to the perforated hollow pipe; and
   removing the permeate liquid from at least one opening end of said perforated hollow pipe.

2. The method of running a spiral wound membrane element according to claim 1, wherein
   said chemical is sodium hypochlorite, chloramine, hydrogen peroxide, peracetic acid or ozone.

3. The method of running a spiral wound membrane element according to claim 1, wherein
   said raw liquid contains a flocculant.

4. The method of running a spiral wound membrane element, according to claim 1, further comprising a step of introducing a washing liquid containing a chemical having a function of separating contaminants or a bactericidal action from at least one opening end of said perforated hollow pipe and discharging said washing liquid derived from the outer peripheral surface of said perforated hollow pipe through at least the outer peripheral portion of said spiral wound membrane element in washing.

5. The method of running a spiral wound membrane element according to claim 4, wherein
   said washing liquid is said permeated liquid.

6. A method of washing a spiral wound membrane element for dead end filtration, said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said method comprising steps of:
   supplying a raw liquid containing an amount of contaminants from at least an outer peripheral side of said spiral wound membrane element;
   flowing the raw liquid through the outer peripheral passage forming member to the outer peripheral portion of the spiral membrane component;
   separating contaminants from the raw liquid with the spiral membrane component by dead-end filtration, thereby producing a captured contaminants component and a permeate liquid;
   routing the permeate liquid from the spiral membrane component to the perforated hollow pipe; and
   removing the permeate liquid from at least one opening end of said perforated hollow pipe;
   supplying a washing liquid containing a chemical having a function of separating contaminants or a bactericidal action from at least one opening end of said perforated hollow pipe; and
   discharging said washing liquid derived from the outer peripheral surface of said perforated hollow pipe from at least the outer peripheral portion of said spiral wound membrane element.

7. The method of washing a spiral wound membrane element according to claim 6, wherein
   said discharging step further comprises a step of dipping said spiral wound membrane element in said washing liquid containing said chemical.

8. The method of washing a spiral wound membrane element according to claim 6, wherein
   said chemical is sodium hypochlorite, chloramine, hydrogen peroxide, sulfuric acid, hydrochloric acid, sodium hydroxide, peracetic acid, isopropyl alcohol, oxalic acid or citric acid.

9. The method of washing a spiral wound membrane element according to claim 6, wherein
   said discharging step further comprises a step of discharging said washing liquid from at least the outer peripheral portion of said spiral wound membrane element and thereafter axially feeding a raw liquid along the outer peripheral portion of said spiral wound membrane element.

10. The method of washing a spiral wound membrane element according to claim 6, wherein said discharging step further comprises a step of axially feeding a raw liquid along the outer peripheral portion of said spiral wound membrane element before introducing said washing liquid from at least one opening end of said perforated hollow pipe.

11. The method of washing a spiral wound membrane element according to claim 6, wherein
said discharging step further comprises a step of regularly or periodically feeding a raw liquid axially along the outer peripheral portion of said spiral wound membrane element in parallel with introduction of said washing liquid from at least one opening end of said perforated hollow cylindrical pipe.

12. A method of running a spiral wound membrane module for dead-end filtration comprising a pressure vessel having a raw liquid inlet and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said method comprising steps of:
supplying a raw liquid containing an amount of contaminants and a chemical having a function of separating contaminants or a bactericidal action, from at least the outer peripheral side of said spiral wound membrane element through said raw water inlet of said pressure vessel;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe.

13. A method of washing a spiral wound membrane module comprising a pressure vessel and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said method comprising steps of:
supplying a raw liquid containing an amount of contaminants from at least an outer peripheral side of said spiral wound membrane element;
flowing raw liquid through the outer peripheral forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe;
removing the permeate liquid from at least one opening end of said perforated hollow pipe;
supplying a washing liquid containing a chemical having a function of separating contaminants or a bactericidal action from at least one opening end of said perforated hollow pipe; and
discharging said washing liquid derived from the outer peripheral surface of said perforated hollow pipe through at least the outer peripheral portion of said spiral wound membrane element for taking out said washing liquid from said pressure vessel.

14. A method of running a spiral wound membrane element,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
diffusing bubbles continuously or intermittently in a liquid coming into contact with the outer peripheral portion of said spiral membrane component.

15. A method of running a spiral wound membrane element,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
applying ultrasonic vibration continuously or intermittently to a liquid coming into contact with the outer peripheral portion of said spiral membrane component.

16. A method of running a spiral wound membrane module comprising a pressure vessel and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid permeable material covering the outer peripheral portion of said spiral membrane component and an outer peripheral passage forming member entirely or partially covering the outer peripheral surface of said liquid-permeable material,
said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
diffusing bubbles continuously or intermittently in a liquid stored in said pressure vessel.

17. The method of running a spiral wound membrane module according to claim 16, wherein
said step of diffusing bubbles includes a step of supplying a raw liquid from at least the outer peripheral side of said spiral wound membrane element while diffusing bubbles in said raw liquid and a permeate liquid from at least one opening end of said perforated hollow pipe in filtration running.

18. The method of running a spiral wound membrane module according to claim 17, wherein
said supplying step further comprises a step of continuously or intermittently feeding a partial raw liquid axially along the outer peripheral portion of said spiral wound membrane element and removing said partial raw liquid from said pressure vessel in filtration running.

19. The method of running a spiral wound membrane module according to claim 18, wherein
said supplying step further comprises a step of returning said raw liquid removed from said pressure vessel to a supply side of the spiral wound membrane element.

20. The method of running a spiral wound membrane module according to claim 16, wherein
said step of diffusing bubbles further comprises a step of introducing a washing liquid from at least one opening end of said perforated hollow pipe and discharging said washing liquid derived from the outer peripheral surface of said perforated hollow pipe through at least the outer peripheral portion of said spiral wound membrane element while diffusing bubbles in said washing liquid in washing.

21. The method of running a spiral wound membrane module according to claim 16, wherein
said step of diffusing bubbles further comprises a step of axially feeding a raw liquid or a washing liquid along the outer peripheral portion of said spiral wound membrane element while diffusing bubbles in said raw liquid or said washing liquid in flushing.

22. The method of running a spiral wound membrane module according to claim 16, wherein
said step of diffusing bubbles further comprises a step of diffusing bubbles in a raw liquid or a washing liquid stored in said pressure vessel when stopping running.

23. A method of running a spiral wound membrane module comprising a pressure vessel and one or a plurality of spiral wound membrane elements stored in said pressure vessel,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
applying ultrasonic vibration continuously or intermittently to a liquid stored in said pressure vessel.

24. The method of running a spiral wound membrane module according to claim 23, wherein
said applying step includes a step of supplying a raw liquid from at least the outer peripheral side of said spiral wound membrane while applying ultrasonic vibration to said raw liquid and removing the permeate liquid from at least one opening end of said perforated hollow pipe in filtration running.

25. The method of running a spiral wound membrane module according to claim 23, wherein
said applying step further comprises a step of introducing a washing liquid from at least one opening end of said perforated hollow pipe and applying ultrasonic vibration to said washing liquid while discharging said washing liquid derived from the outer peripheral surface of said perforated hollow pipe from at least the outer peripheral portion of said spiral wound membrane element in washing.

26. The method of running a spiral wound membrane module according to claim 23, wherein
said applying step further comprises a step of axially feeding a raw liquid or a washing liquid along the outer peripheral portion of said spiral wound membrane element and applying ultrasonic vibration to said raw liquid or said washing liquid in flushing.

27. The method of running a spiral wound membrane module according to claim 23, wherein
said applying step further comprises a step of applying ultrasonic vibration to a raw liquid or a washing liquid stored in said pressure vessel when stopping running.

28. The method of running a spiral wound membrane module according to claim 23, wherein
said applying step further comprises a step of continuously or intermittently feeding a partial raw liquid axially along the outer peripheral portion of said spiral wound membrane element and removing said partial raw liquid from said pressure vessel in filtration running.

29. The method of running a spiral wound membrane module according to claim 28, wherein
said applying step further comprises a step of returning said raw liquid removed from the pressure vessel to the supply side of said spiral wound membrane element.

30. A method of running a spiral wound membrane element,
said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane,
said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
stopping running for a prescribed time period and holding said spiral wound membrane element in a state dipped in a liquid for the prescribed time during a running period.

31. The method of running a spiral wound membrane element according to claim 30, wherein
said holding step further comprises a step of supplying a raw liquid from at least the outer peripheral side of said spiral wound membrane element while removing the permeate liquid from at least one opening end of said perforated hollow pipe during filtration running in said running period and stopping said filtration running for holding said spiral wound membrane element in said state dipped in said liquid for the prescribed time.

32. The method of running a spiral wound membrane element according to claim 31, wherein
said holding step further comprises a step of introducing a washing liquid from at least one opening end of said perforated hollow pipe while discharging said washing liquid derived from the outer peripheral surface of said perforated hollow pipe through at least the outer peripheral portion of said spiral wound membrane element in back wash reverse filtration during said running period and stopping said back wash reverse filtration for holding said spiral wound membrane element said state dipped in said liquid for the prescribed time.

33. The method of running a spiral wound membrane element according to claim 32, further comprising a step of restarting said back wash reverse filtration after holding said spiral wound membrane element in said state dipped in said liquid for the prescribed time.

34. The method of running a spiral wound membrane element according to claim 32, further comprising a step of performing filtration running by supplying a raw liquid from at least the outer peripheral side of said spiral wound membrane element while removing a permeated liquid from at least one opening end of said perforated hollow pipe after holding said spiral wound membrane element in said state dipped in said liquid for the prescribed time.

35. The method of running a spiral wound membrane element according to claim 32, further comprising a step of performing flushing by axially feeding a raw liquid along the outer peripheral portion of said spiral wound membrane element after holding said spiral wound membrane element in said state dipped in said liquid for the prescribed time.

36. The method of running a spiral wound membrane element according to claim 32, further comprising a step of supplying a liquid containing a chemical having a bactericidal action or a function of separating contaminants to said spiral wound membrane element and dipping said spiral wound membrane element in said liquid containing said chemical after holding said spiral wound membrane element in said state dipped in said liquid for the prescribed time.

37. The method of running a spiral wound membrane element according to claim 31, further comprising a step of restarting said filtration running after holding said spiral wound membrane element in said state dipped in said liquid for the prescribed time.

38. The method of running a spiral wound membrane element according to claim 31, further comprising a step of performing back wash reverse filtration by introducing a washing liquid from at least one opening end of said perforated hollow pipe while discharging said washing liquid derived from the outer peripheral surface of said perforated hollow pipe through at least the outer peripheral portion of said spiral wound membrane element after holding said spiral wound membrane element in said state dipped in said liquid for the prescribed time.

39. The method of running a spiral wound membrane element according to claim 31, further comprising a step of performing flushing by axially feeding a raw liquid along the outer peripheral portion of said spiral wound membrane element after holding said spiral wound membrane element in said state dipped in said liquid for the prescribed time.

40. The method of running a spiral wound membrane element according to claim 31, further comprising a step of supplying a liquid containing a chemical having a bactericidal action or a function of separating contaminants to said spiral wound membrane element and dipping said spiral wound membrane element in said liquid containing said chemical after holding said spiral wound membrane element in said state dipped in said liquid for the prescribed time.

41. A method of running a spiral wound membrane module comprising a pressure vessel having a raw liquid inlet and one or a plurality of spiral wound membrane elements stored in said pressure vessel, said spiral wound membrane element comprising a spiral membrane component including a perforated hollow pipe, a plurality of independent or continuous envelope-like membranes wound around the outer peripheral surface of said perforated hollow pipe and a raw liquid passage forming member interposed between said plurality of envelope-like membranes, a liquid-permeable membrane covering the outer peripheral portion of said spiral membrane component and an outer peripheral passage forming member entirely or partially covering the outer peripheral surface of said liquid-permeable membrane, said method comprising steps of:
supplying a raw liquid containing an amount of contaminants from at least an outer peripheral side of said spiral wound membrane element;
flowing the raw liquid through the outer peripheral passage forming member to the outer peripheral portion of the spiral membrane component;
separating contaminants from the raw liquid with the spiral membrane component by dead-end filtration, thereby producing a captured contaminants component and a permeate liquid;
routing the permeate liquid from the spiral membrane component to the perforated hollow pipe; and
removing the permeate liquid from at least one opening end of said perforated hollow pipe; and
stopping running for a prescribed time period and holding said spiral wound membrane module in a state sealing a liquid in said pressure vessel for the prescribed time period.

* * * * *